United States Patent [19]

Fabris et al.

[11] Patent Number: 4,516,156
[45] Date of Patent: May 7, 1985

[54] TELECONFERENCING METHOD AND SYSTEM

[75] Inventors: Alfonso V. Fabris, Oakton; Robert M. Strickland, Jr.; John T. Toth, both of McLean, all of Va.

[73] Assignee: Satellite Business Systems, McLean, Va.

[21] Appl. No.: 358,548

[22] Filed: Mar. 15, 1982

[51] Int. Cl.³ .............................................. H04N 7/14
[52] U.S. Cl. ........................................ 358/85; 358/210;
340/709; 340/712; 179/2 TV; 179/18 BC
[58] Field of Search .......................... 358/85, 86, 210;
340/709, 712; 179/2 TV, 2 TS, 18 BC

[56] References Cited

U.S. PATENT DOCUMENTS

| | | | |
|---|---|---|---|
| 3,668,312 | 6/1972 | Yamamoto et al. | 358/85 |
| 4,054,908 | 10/1977 | Poirier et al. | 358/85 |
| 4,224,615 | 9/1980 | Penz | 340/712 |
| 4,317,956 | 3/1982 | Torok et al. | 340/709 |
| 4,321,625 | 3/1982 | Smith | 358/210 |

Primary Examiner—John C. Martin
Assistant Examiner—Edward L. Coles
Attorney, Agent, or Firm—Pollock, Vande Sande & Priddy

[57] ABSTRACT

Control of teleconference is facilitated so as to allow relatively unskilled operators to implement such control. The invention includes at least a pair of teleconferencing sites, each of which includes at least a pair of controllable video sources for deriving video signals from controllable regions of the associated site, an audio source for deriving an audio signal from the associated site, at least a pair of video displays for controllably displaying either locally or remotely generated images, an audio transducer responsive to a remotely generated audio signal for generating perceptible sound, an interface for coupling digital representations of locally generated audio and video signals to a communication link linking the sites and for coupling digital representations of remotely generated audio and video signals, a control device including a digital microprocessor and controlling, among other things, a video matrix switch, the video matrix switch having plural video inputs and outputs for controllably coupling at least a locally generated video signal to the interface and for controllably coupling locally and/or remotely generated video to said displays. The control device also includes a control video display with a touch sensitive screen for controlling the video sources and video matrix switch in response to touches on the touch sensitive screen by an operator and further including, in the form of a program in said microprocessor, apparatus to interpret commands initiated by operator touches of the touch sensitive screen and for thereafter implementing the commands if elements of the command are consistent with each other and with available resources as well as message formatting which are responsive to the logic for formatting digital messages destined for the video sources and the video matrix switch.

14 Claims, 22 Drawing Figures

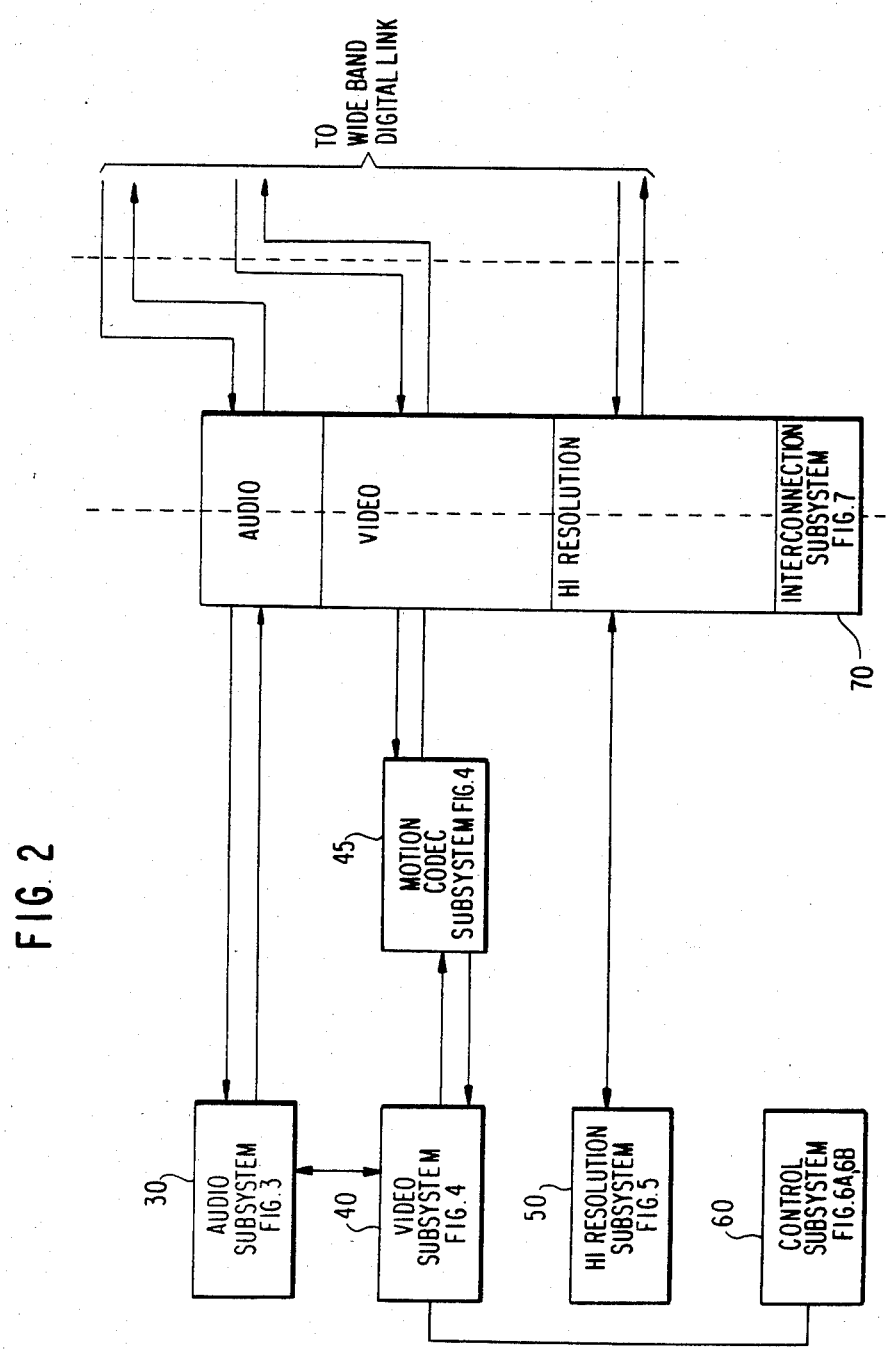

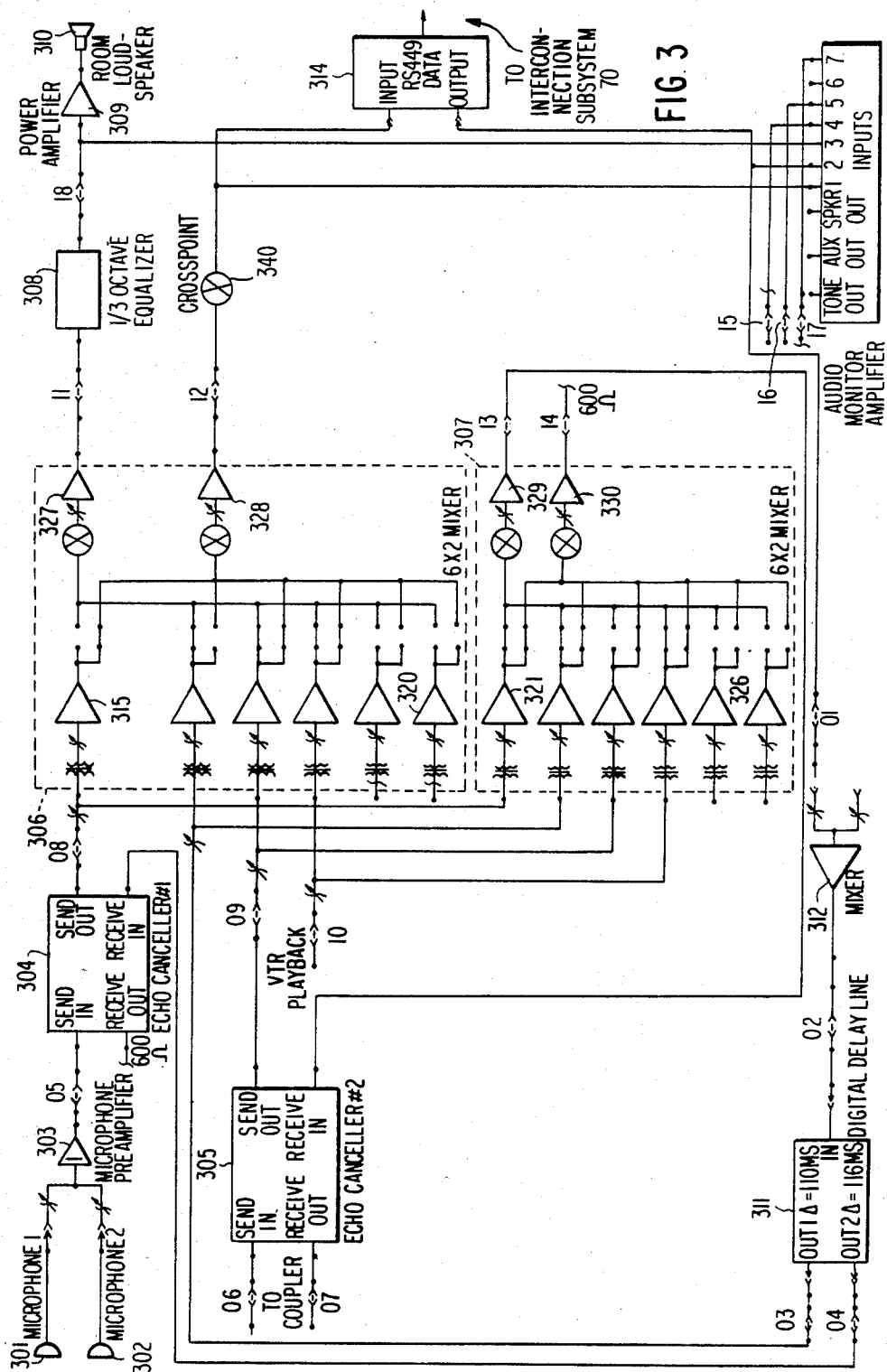

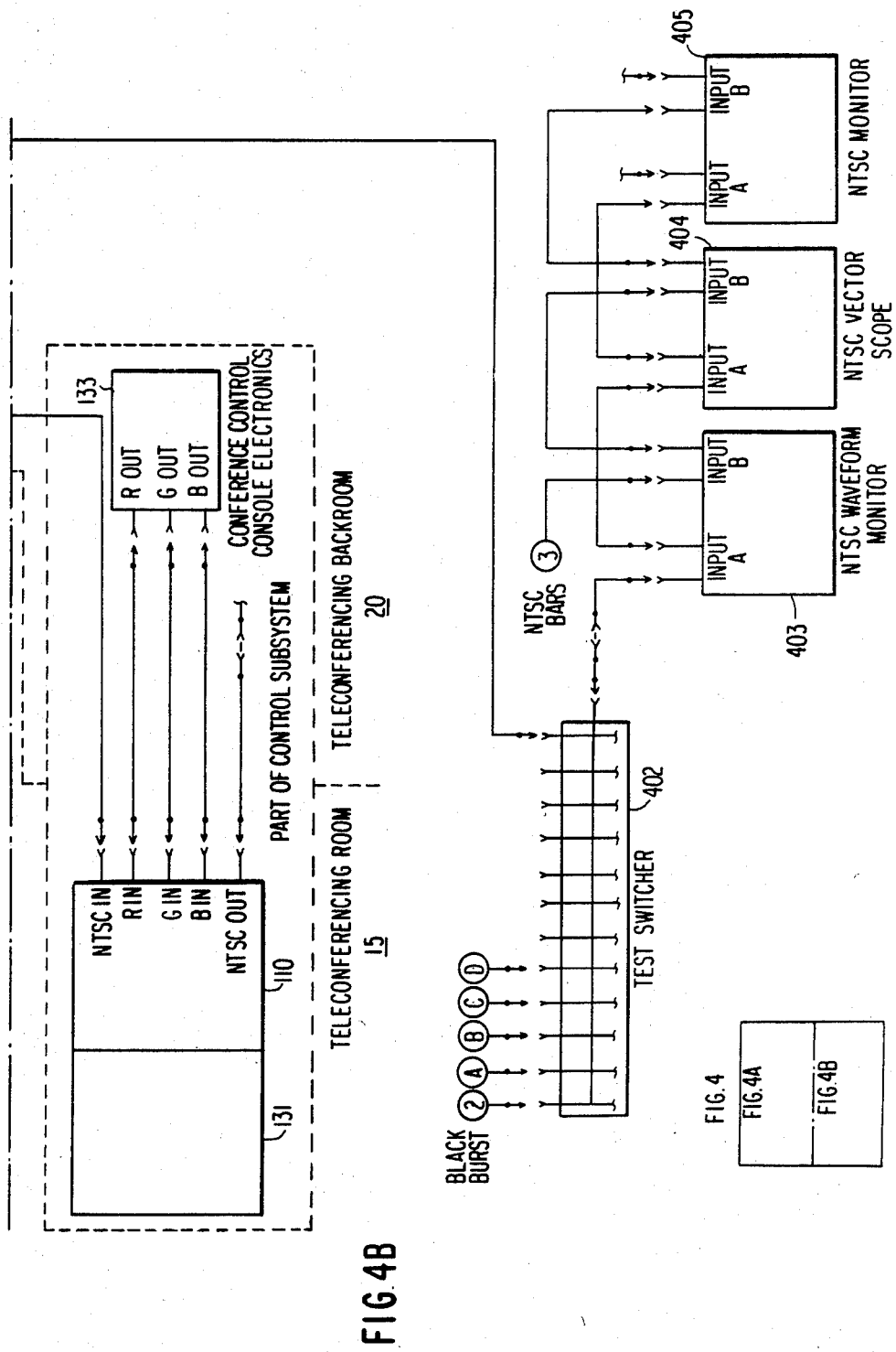

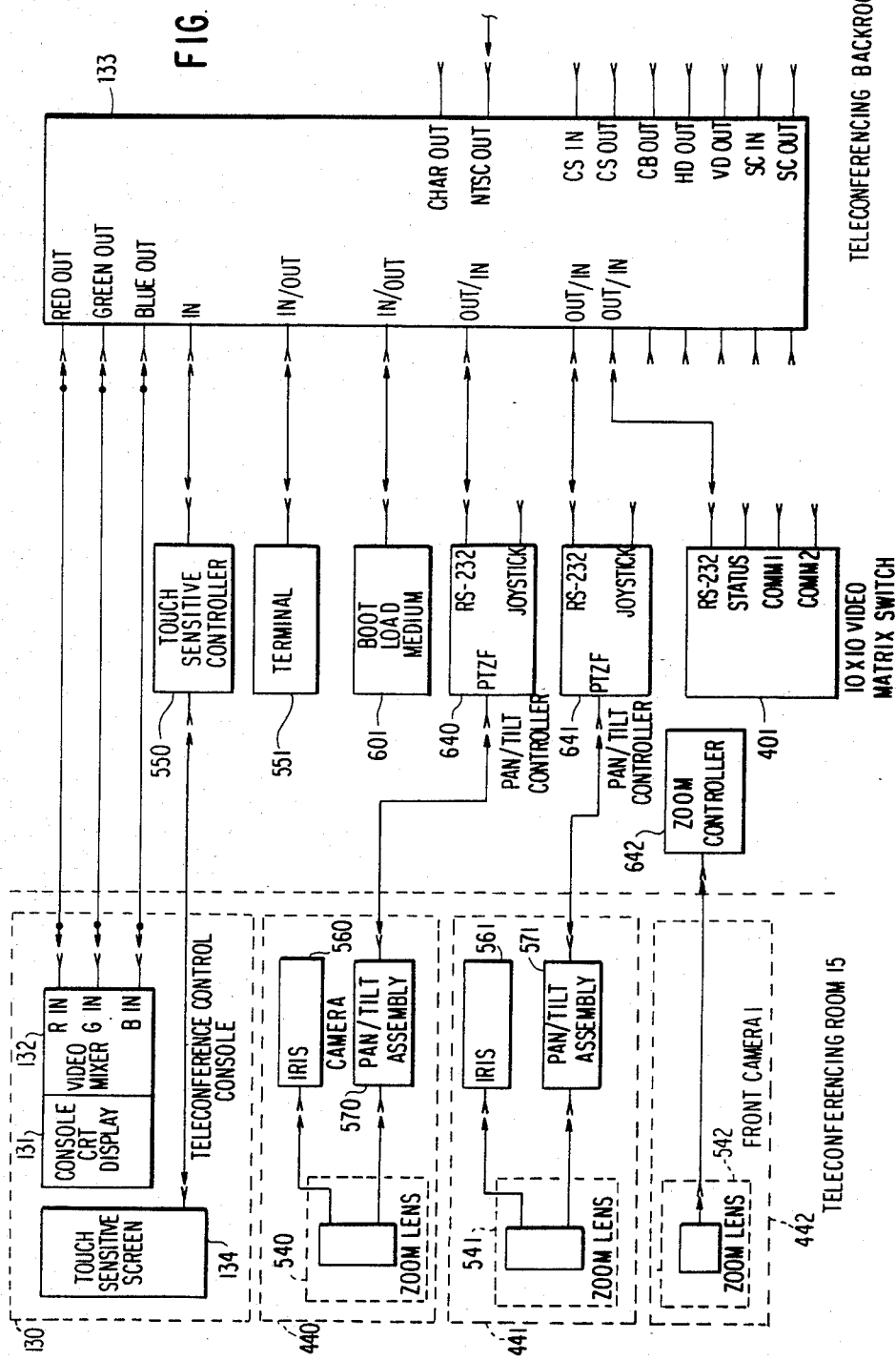

REVIEW

SYMBOLS AT THE BOTTOM OF THE DISPLAY CAUSE THE
SELECTED DEVICES TO BE ACTIVATED OR A NEW DISPLAY
TO APPEAR.

| SYMBOL | EXPLANATION |
|---|---|
| GO | TOUCH TO CONTINUE OR TO ACTIVATE DEVICES (WHITE BORDER INDICATES SELECTED DEVICES.) IF GO TURNS RED, AN ERROR HAS BEEN DETECTED. |
| CANCEL | TOUCH TO STOP A FUNCTION, TURN OFF ACTIVE DEVICES, OR CANCEL ERRORS. |
| BACK | TOUCH TO RETURN TO PREVIOUS DISPLAY. |

TO CONTINUE REVIEW    TO TERMINATE REVIEW
TOUCH                 TOUCH

[BACK]−903   [GO]−904   [CANCEL]−905

TELECONFERENCING METHOD AND SYSTEM

FIELD OF THE INVENTION

The invention relates to communication systems, and more particularly to communication systems for effecting teleconferencing functions including selective transmission and reception of audio and video information.

BACKGROUND ART

The advent of commercially available wide band digital communication links carries with it the ability to add new dimensions to the functions effected by a communication system. One aspect of these new dimensions is a teleconferencing function. In teleconferencing, conference participants are brought together via a communication link for the purpose of information interchange. The "tele" prefix to the word telecommunications implies that one or more of the participants is remotely located from other of the participants in the conference. Teleconferencing is a function which has been performed using prior art techniques and apparatus. Teleconferencing is achieved so as to give the perception that there is no distance barrier between participants who may actually be widely separated. This goal has not been achieved until the advent of this invention.

The prior art in teleconferencing can be broken down into two readily segregatible classes, those in which only audio information is interchanged, and those in which video information is interchanged as well. The first class of prior art techniques (audio information interchange only) has not been accepted as a viable alternative to bringing all the conference participants to a common site. In other words, while audio teleconferencing is a function which is carried out today, there are many instances in which it is not perceived to be an acceptable substitute to travel.

Other prior art methods and apparatus have added a video dimension to the teleconferencing function. These prior art approaches, too, have not been perceived as acceptable substitutes to actually bringing all participants to a common location. See "The Global Video Conference" by Mokhoff appearing in *IEEE Spectrum*, September 1980, pp 44–47. There appears to be two reasons for this perception. The first reason is that there has not been available to the prior art, the wide band communication facility which appears to be required for effective telecommunications. This problem appears to have been solved through the use of wide band communication links provided by domestic communication satellites and/or direct or line-of-sight microwave communication facilities. The other problem, however, still remains and it is the problem of equipment complexity. Effective telecommunication requires giving each participant the perception that there is no distance barrier between himself and each other conference participant. While this appearance was technically achievable using prior art methods and apparatus, it necessarily required plural TV cameras, each of which is capable of altering the image generated by varying parameters such as pan, tilt, zoom and focus. While the prior art could supply such equipment, that equipment necessarily required the presence of one or more equipment operators, who were technically trained to achieve the desired results. The cost associated with providing the operator(s) prohibited the widespread use of teleconferencing.

The prior art made several attempts to avoid this requirement for equipment operator(s). One attempt was by American Telephone and Telegraph Company. Their service used a combined television camera/video display unit. A user positioned himself in front of the equipment with two results. By reason of his position, the television camera generated a video image of the user which could be transmitted to other users. At the same time, the participant's presence in front of the equipment enabled him to view the video display which could produce an image of a distant user. In this regard see "Experiments with Picturephone Service" by A. D. Hall in the *Bell Laboratories Record*, April 1964, pp. 114 et seq; "New Picturephone Set 'Zooms' and Shows Graphics" in *Bell Laboratories Record*, December 1967, pp. 374 et seq. This simple level of service was inadequate where a conference included more than two users; while equipment could be provided to select the video signal to be transmitted from one user's camera to the other displays, that equipment necessarily required an operator. Other prior art, as exemplified in U.S. Pat. Nos. 3,419,674; 3,723,653; 3,601,530; 3,725,587; 3,944,736 and 4,054,908, used plural TV cameras, each associated with a different field of view, and audio-driven majority voting logic to select from the set of TV cameras, the camera associated with a region including the highest audio source level. This approach too proved ineffective for a number of reasons; in the absence of an audio signal source, the system defaulted to a single camera which might or might not be trained on the image most desired by the participants. Secondly, unintentioned sounds (such as a cough or sneeze, etc.) could well cause a change in the video image being transmitted which was undesirable. Furthermore, no simple provision was made for changing a TV camera's field of view, i.e. pan, tilt, zoom and focus were not available. Some other approaches are referred to in "Teleconferencing Communications Activities" by Noll in *Communications* (September 1976), pp. 8 et seq.

Accordingly, it is an object of the present invention to provide a teleconferencing system enabling video teleconferencing which does not require the presence of skilled equipment operators, but which nevertheless has the capability of imparting to participants in a teleconferencing situation the perception of a lack of a distance barrier between participants who may actually be separated by great distances. It is another object of the present invention to provide such a system in which a conference leader, unskilled in the operation of the associated equipment, can nevertheless readily control the various components so as to generate this perception. It is still another object of the present invention to provide such a teleconferencing system in which an unskilled conference leader can control plural TV cameras so that a video image from a selected camera will be transmitted to a remote site, and who can also control the same camera in terms of pan, tilt, zoom and focus. It is another object of the present invention to allow an unskilled operator to effect the functions necessary to carry on a teleconferencing scenario and to select locally-generated images for transmission to a remote site so as to give the remote participants the perception of no distance barrier between themselves and other remotely located site(s).

SUMMARY OF THE INVENTION

To achieve the foregoing, and other objects, the invention provides a teleconferencing system which is adapted to be connected by a wide band digital communication link, such as a domestic satellite communication system or a microwave communication system which teleconferencing system includes at least a pair of teleconferencing sites, remotely located from each other. Each of the teleconferencing sites includes resources including at least a pair of controllable TV cameras, readily controllable in terms of pan, tilt, zoom and focus, so that a video image can be transmitted from one site to another via a selected one of the cameras. The ability to select an image from among more than one camera coupled with the ability to control each camera in terms of pan, tilt, zoom and focus allows the image being transmitted to be selected as the image originating from a controllable region in the teleconferencing site. Each teleconferencing site also includes further resources such as an audio signal source, and the inventive apparatus allows a conference leader to selectively enable or disable transmission of audio from the site at which he is located to the remote site. Further resources include at least a pair of video displays under the control of the conference leader, allowing the conference leader to select the image that will be portrayed on each display from at least among a remotely-generated video image and a locally-generated video image. In accordance with this level of control, the conference leader can locate the remotely generated video signal on either display, and the locally generated video signal on the other display. Each conference site also includes audio transducers (e.g. speakers) so as to reproduce remotely generated audio signals. Each teleconferencing site also includes an interface for coupling locally generated audio and video signals to the communication link and for coupling remotely generated audio and video signals from the communication link. Inasmuch as there are plural video sources and sinks at each teleconferencing site, the interface includes a video matrix switch which is also under control of the conference leader at each site. By controlling the video matrix switch, the conference leader can selectively couple a particular video source (any of the locally generated video sources or a remotely generated video signal) to any of the local video displays. In order to enable effective control over this equipment by an unskilled operator, each teleconferencing site further includes a control means to assist the operator in achieving the desired control. The control means includes a digital processor, video display and associated touch-sensitive screen. Through this control system, the operator can manifest a command by touching the screen once or several times at different locations. The control means includes logic means for interpreting the commands and for thereafter implementing each such command if elements of said command are consistent with each other and with available resources.

Once the command has been checked for consistency (both among the various command components and with the available resources) it is implemented by the logic means passing to message formatting means information necessary to control the necessary devices in a fashion so as to implement the command.

Accordingly, in accordance with one aspect, the invention provides:

a teleconferencing system adapted to be connected by a wide band digital communication link comprising at least a pair of teleconferencing site means for communicating audio and video signals therebetween, each said site means comprising:

at least a pair of controllable video source means for deriving a video signal from controllable regions of the associated site, audio signal source means for deriving an audio signal from the associated site, at least a pair of video displays for controllably displaying either locally or remotely generated video signals, audio transducer means responsive to a remotely generated audio signal for generating perceptible sound, interface means for coupling digital representations of locally generated audio and video signals to said communication link and for coupling digital representations of remotely generated audio and video signals from said communication link, said interface means including video matrix switch means with plural video inputs and outputs for controllably coupling at least a locally generated video signal to said communication link and for controllably coupling locally and remotely generated video signals to said video displays, and control means, including a digital microprocessor, control video display and touch sensitive screen, for controlling said video source means and video matrix switch means in response to sequential touches on said touch sensitive screen by an operator, said control means including:

logic means for interpreting commands initiated by operator touches of said touch sensitive screen for thereafter implementing said commands if elements of said commands are consistent with each other and with available resources and message formatting means responsive to said logic means for formatting digital messages destined for said video source means and said video matrix switch, whereby unskilled operators can control said teleconferencing site means.

The control means, i.e. digital microprocessor, video display and touch sensitive screen provide for the display of at least one and preferably several different menus. A menu may represent some or all of the site's resources (i.e. cameras, send and receive functions, displays, etc.) along with one or more command execution elements (i.e. go, cancel, etc.). One of the main functions required of the operator is to bridge (connect) sources and sinks. A source is a camera or a receive function in that it represents a video image source. A sink is a display or a send function in that it represents a video image receptor. One type of command is to bridge a selected source with one or more sinks. This is effected on the menu by touching the selected source and sinks (in any order) and then touching the GO command element. Since such a bridge with more than one source or no source may be inconsistent with what can be implemented, the logic is arranged to check the command for this consistency prior to execution. Since bridges may be added to, however, not only is it necessary to check for internal command consistency but it is also necessary to check for consistency with the condition of the site's other resources.

In addition, another type of command is effected to selectively position a camera. In a preferred embodiment, this is effected via a different menu which allows for commands representing camera control functions such as a change in zoom, focus, pan or tilt status. This menu provides for a first set of two selected touch areas to select a particular camera (of course more than two movable cameras could be handled by increasing the number of touch areas in the first set), a second set of touch areas to provide for a change in a zoom parameter, a third set of touch areas to provide for a change in a focus parameter and a fourth set of touch areas to provide for a change in a pan/tilt parameter.

To provide the operator with feedback indicating that the commands are appropriately recognized, the various elements of the menus are displayed in selectable colors and, depending on the status of commands associated with an element, its border may be displayed as the color of the element or as a white border. Thus, as commands are entered the border and/or body color of various elements may change. For example, each source has a distinctive color, and any representation of that source in a menu takes on that color only when the source is on or operating. When a source and sink are bridged, the sink(s) takes on the color of the source.

Some commands require plural touches and a touched element included in a plural touch command is said to be pending before the command is executed. Elements associated with pending touches have their borders on (displayed as white). Once this convention is learned the operator can verify that touches are responded to, which commands have been implemented and the current status of all site resources.

Thus, the combination of simple command logic plus the added intelligence embodied in software allows the control of complex functions. The logic then:

1. Displays and maintains the various menus.
2. Interprets the coordinates of a touched location in the context of the menu presently being displayed.
3. Acknowledges operator touches.
4. Translates the operator touches into a logic sequence of functional and control operations and implements control operations.

BRIEF DESCRIPTION OF THE DRAWINGS

The present invention will now be further described so as to enable those skilled in the art to make and use the same, in the following portions of this specification when taken in conjunction with the attached drawings in which like reference characters identify identical apparatus and in which;

FIG. 2 is a block diagram of subsystem interconnection at the typical site;

FIG. 3 is a detailed block diagram of the audio subsystem;

FIGS. 4A and 4B, when assembled as shown in FIG. 4 is a detailed block diagram of the video subsystem;

FIGS. 6A and 6B are detailed block diagrams of the control subsystem;

FIGS. 9A-9I illustrate different control menus.

DETAILED DESCRIPTION OF PREFERRED EMBODIMENT

Figure 1:
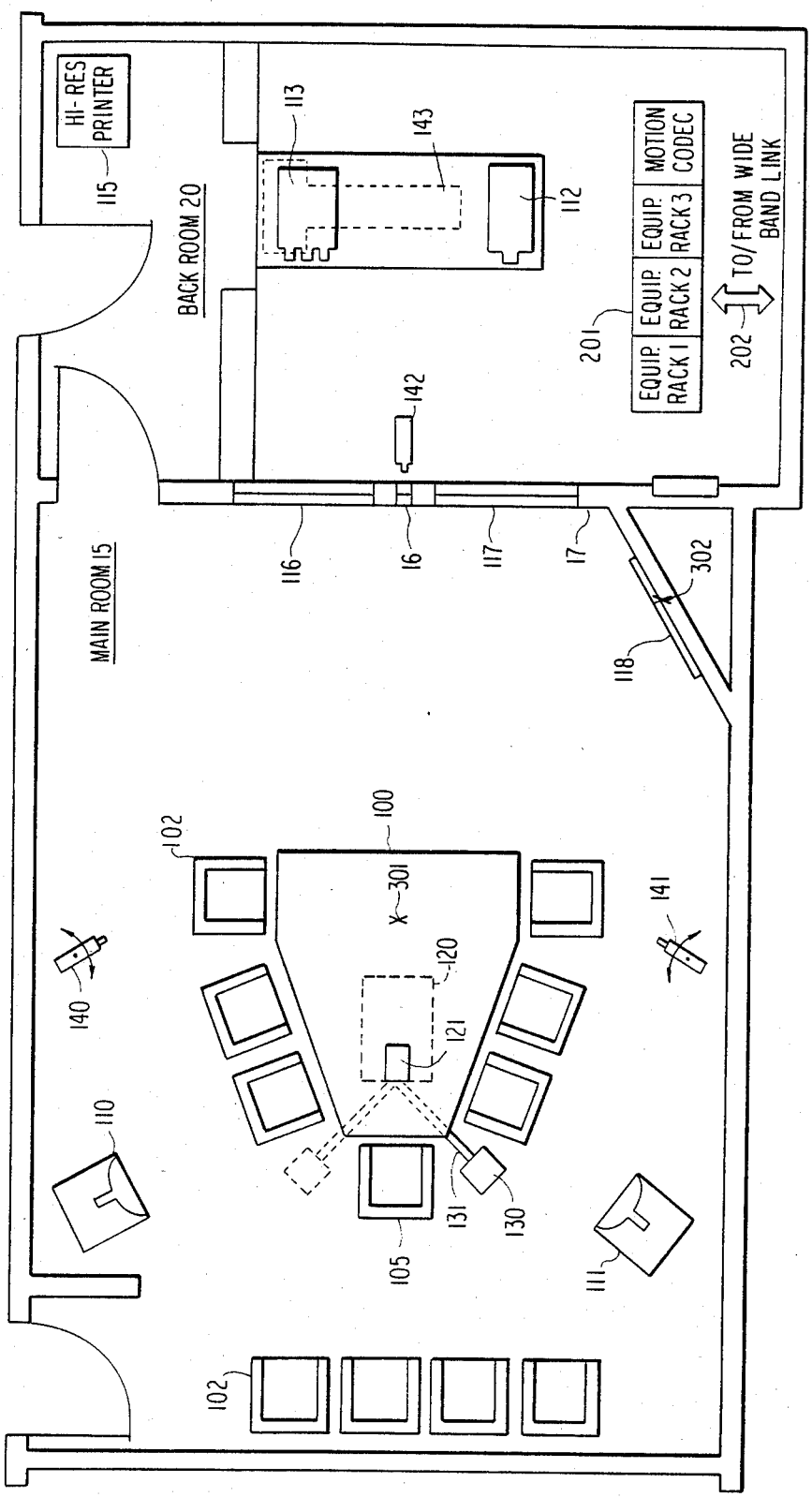
FIG. 1 is part plan part schematic illustration of a typical teleconferencing site.

FIG. 1 is a part plan part schematic illustration of a typical teleconferencing site 10. As shown in FIG. 1, the typical teleconferencing site 10 includes two separate areas, a main room 15 and a back room 20.

The main room 15 includes a conference table 100, of suitable shape for reasons which will become clear hereinafter. Conveniently located about the conference table and elsewhere in the room are chairs 102 for the use of conference participants. The conference leader is located at chair 105 where the controls for operating the teleconferencing site 10 are conveniently available. Inset into the conference table 100 is the platen 120 of a high resolution graphics scanner; associated therewith is a control panel 121 within easy reach of the conference leader at chair 105. A control console 130 is shown as supported on a pivotable boom 131a. By positioning the boom 131a, the conference leader 105 can position the control console 130 either on his right of left hand side as desired. The control elements to be operated by the conference leader at the chair 105 are located in the main on the control console 130, with the high resolution control panel 121 as a adjunct.

For generating a video image for transmission to a remote teleconferencing site, the teleconferencing site 10 includes four TV cameras. A first TV camera 142 is located in the back room 20 and views the main room 15 via a hole 16 in a front wall 17 of the main room 15. The camera 142 is located so that the image generated can encompass conference table 100 as well as each of the participants seated in the chairs 102 located about the conference table 100 as well as the conference leader at chair 105. A pair of side cameras 140 and 141 are located within the main room 15. Each of the side cameras are located on platforms (not illustrated) which enables the cameras' orientation with respect to the main room 15 to be changed in terms of pan and tilt. Furthermore, the cameras 140 and 141 have also associated with each, camera controllers which, in addition to controlling the pan and tilt of the platforms, can also control the zoom and focus of the camera lenses. Finally, a fourth camera 143 is located in the back room 20 and imaged on the screen of a slide projector and uniplexer. Through the use of the control system, the conference leader can, by manipulating the control console 130 select the image generated by any of the cameras 140–143. Once selected, the image from a camera can be either locally displayed on any of a plurality of monitors which will be described below, and/or that image can be transmitted to a remote teleconferencing site(s). Furthermore, through the use of the same control console 130 the conference leader can selectively orient the cameras 140 and 141 in terms of pan and tilt as well as controlling the zoom and focus of the camera lenses. Accordingly, through the use of the control system, the conference leader can generate a video signal corresponding to that generated by any controllable region within the main room 15. Display capability is implemented through ceiling mounted video monitors 110 and 111 as well as large screen projection video display 113 associated with screen 116 and a video display included in the control console 130. Finally, graphics can be displayed on the large screen projection video display 112 associated with screen 117.

FIG. 2 is an overall block diagram of the electrical connection of the various components. As shown in FIG. 2, the equipment can be broken down into six subsystems. Firstly an audio subsystem 30 is interconnected via an audio portion of the interconnection subsystem 70 and therethrough to a wide band digital link. Overall control of the audio subsystem is effected by the control subsystem as will be explained.

Like the audio subsystem 30, the high resolution subsystem 50 is interconnected via the high resolution portion of the interconnection subsystem 70 to the same wide band digital communication link.

FIG. 2 also shows a video subsystem 40. The video subsystem 40, which is coupled through the motion codec 45 to the video portion of the interconnection subsystem 70, and thence to the wide band digital communication link, is interconnected to the control subsystem 60.

In an embodiment of the invention which has actually been constructed, the interconnection subsystem 70 connects, at its output to the port adapter system of the SBS communications network service. This service is obtained by the use of a satellite communications controller (hereinafter SCC) which is available from Satellite Business Systems of McLean, Va. However, it should be apparent to those skilled in the art that supporting the transmission of digital signals representing audio, video, and high resolution signals at the required band width capacity is a function which does not require a satellite link. Such capacity is available through conventional facilities such as, for example, point-to-point microwave communication links, fiber-optic communications channels, etc. Accordingly, the invention should not be considered to be restricted to the use of the SBS communication network service, or any particular domestic satellite communications system or service, but rather can utilize any wide band digital link of sufficient band width.

Reference is made to FIG. 3 to illustrate the audio subsystem in detail.

As shown in FIG. 3, a pair of pressure zone microphones 301 and 302 are located in the teleconferencing main room 15. These microphones are located as shown in FIG. 1, one centrally located on the conference room table, the other near the chalkboard 118. The microphones 301 and 302 take advantage of surface wave propagation of sound across the plane surface of the table or wall to provide a highly sensitive, nearly hemispherical pick-up pattern.

The output from the microphones is coupled to a preamplifier 303, the output of which is coupled to the "send-in" terminal of echo canceller 304. The "send-out" terminal of the echo canceller 304 is coupled to an audio mixing system 306. The mixing system 306 includes a plurality of inputs and a pair of outputs, an output from amplifier 328 to the input terminal of an audio codec 314, and output from amplifier 327 to equalizer 308.

Figure 7:
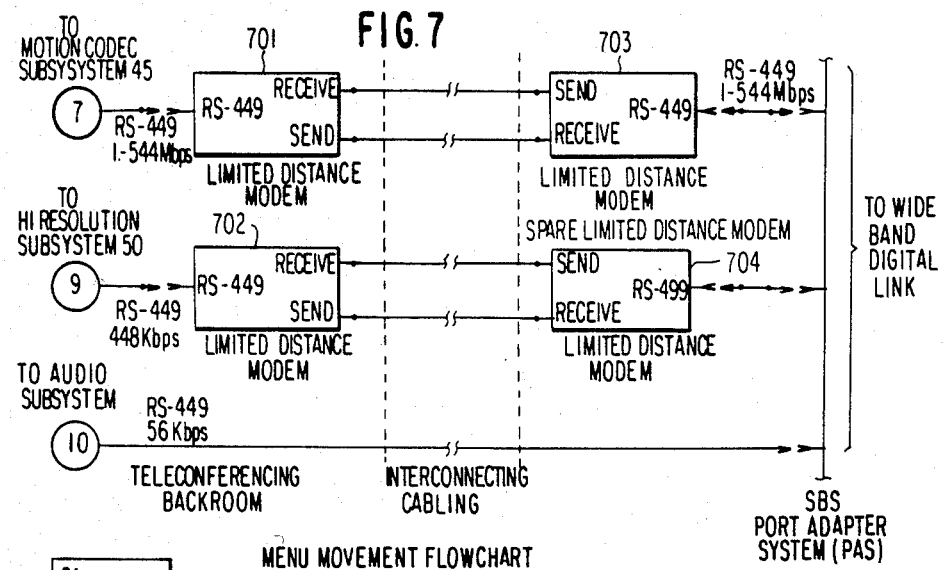
FIG. 7 is a detailed block diagram of an interconnection subsystem.

Mixer 306 includes six amplifiers 315-320, jumpered so that amplifiers 315, 317, 318 provides inputs to amplifier 328, and amplifiers 316, 317 and 318 provide inputs to amplifier 327. One output of the codec 314 is RS-449 (audio representing) data which is coupled to the interconnection system (FIG. 7). On the other hand, the output of the equalizer 308 is coupled through power amplifier 309 to a room loudspeaker (or loudspeakers) 310.

Another codec audio output is coupled to amplifier 312 and then through a digital delay line 311. The digital delay line has two outputs (with slightly different delays), one of which is coupled to the receive in terminal of the canceller 304, and the other of which provides the input to amplifier 316 in the mixer 306.

The audio subsystem also includes a second echo canceller 305 which can be used with a telephone coupler, for connection to a remotely located telephone. The "send-out" terminal of canceller 305 is connected as an input to amplifier 317 and as an input to amplifier 323. A second mixer 307 is provided which can be used for the remote audio participants (connected to the canceller 305) and/or in connection with a (video recorder) VTR. More particularly, the audio mixer 307 includes six amplifiers 321-326 and a pair of output amplifiers 329 and 330. Amplifiers 321-324 are connected to receive the same inputs as are amplifiers 315-318. The jumper arrangement in mixer 307 is slightly different so that for example the output of amplifiers 321, 322 and 324 provide inputs to both output amplifiers 329 and 300, whereas amplifier 323 provides an input to 330. The output of amplifier 329 is coupled to the "receive-in" terminal of canceller 305. The output of amplifier 330 can be used as the audio input to a VTR. If used, the audio output of the VTR is coupled as the input to amplifier 318 and 324.

In addition to the foregoing, the audio subsystem includes monitoring and testing instrumentation sufficient to support routine maintenance and first echelon trouble shooting, i.e. the audio monitor amplifier 313 connected as illustrated. In addition, the jumpering arrangements in the mixers 306, 307 allows changes in the nominal arrangement of equipment.

In view of the foregoing, it should be apparent that the audio subsystem allows audio signals generated by the microphones 301, 302 to be processed (i.e. echo cancelled and converted to digital form), and coupled to the wide band communication link. In addition, audio signal representing data, received from the remote location is converted back to audio signal form by the codec 314, amplified, provided to the echo canceller and used to drive the room loudspeaker 310. Provision is made for coupling a remotely located "telephone only" participants to the echo canceller 305 and provision is also made for VTR play-back or record of audio signals.

As shown in FIG. 2, the output from the audio subsystem 30 is to the interconnection subsystem 70. The video subsystem 40 includes a matrix switch 401 controlled by the conference leader via the control subsystem 60. The matrix switch 401 includes a first video matrix interconnecting various video inputs and outputs, and a second audio matrix interconnecting the audio output of mixer 306 and the interconnection subsystem 70. The connection to the audio plane of the switch 401 is at terminal 12. An audio crosspoint, 340, effects the connecting and disconnecting of the audio signal. Thus, the conference leader can enable the microphones 301, 302, the telephone, and the VTR playback by connecting the output to codec 314. The conference leader may also disable the microphones 301, 302 the telephone, and the VTR playback by disconnecting the output from codec 314.

The video subsystem (shown in FIGS. 4, 4A and 4B) provides three color television cameras to view conference participants and fourth camera for pick-up and display of 35 mm slides or the like.

A front camera 142 is located in the front wall 17 of the main room 15 and is provided, in an embodiment of the invention which has actually been constructed, with a (remote) manually controlled zoom lens. When "zoomed out" this camera provides an overall view of all seated conference participants. When "zoomed in", the camera provides a "close-up" view of the conference participant seated at the far end of the table, i.e. in chair 105.

The side cameras 140 and 141 are equipped with pan/tilt platforms and zoom lenses which are controlled via the control subsystem. As will be described hereinafter, these cameras are capable of being automatically positioned to view a selected one of several preset "shots" of the conference room. Generally these cameras are used to complement the overview camera by providing, when necessary, close-ups of individual participants and objects.

The 35 mm slide camera 143 is associated with a uniplexer located in the back room 20. The uniplexer is provided with a slide projector, which, in an embodiment of the invention actually constructed, is capable of storing up to 80 slides for presentation during the course of a teleconference. A hand-held wireless controller (conventional) permits the projector to be cycled "forward" or "reverse" from anywhere in the teleconferencing room.

Video images can be displayed on any of four devices in the main room 15. These are:

A large screen display 116 (in an embodiment of the invention actually constructed, four feet in width), two overhead monitors 110, 111 (in an embodiment of the invention actually constructed, each with 25-inch screens), and a video display included in the control console 130.

The selection of an image on a particular camera to be displayed on any one of the four selected devices, and the additional selection of a camera whose image is used for transmission to the remote teleconferencing site is made through the use of a video matrix switch controlled via the control console 130.

As in the audio subsystem, the video signal selected for transmission by the video matrix switch is in analog form and is converted to digital form for transmission over the wide band communication link. This transformation is accomplished by the motion codec 45.

Video signals from the remote teleconferencing site are decoded by the motion codec 45 and applied to the video matrix switch. This permits the distant room's video signal to be displayed on any of the video display devices in the main room 15.

The video subsystem includes in addition, the necessary timing generators, test instrumentation and monitoring equipment required to support routine maintenance and first echelon trouble shooting. A patching and distribution facility is provided to permit changes to the nominal equipment configuration.

Figure 4A:
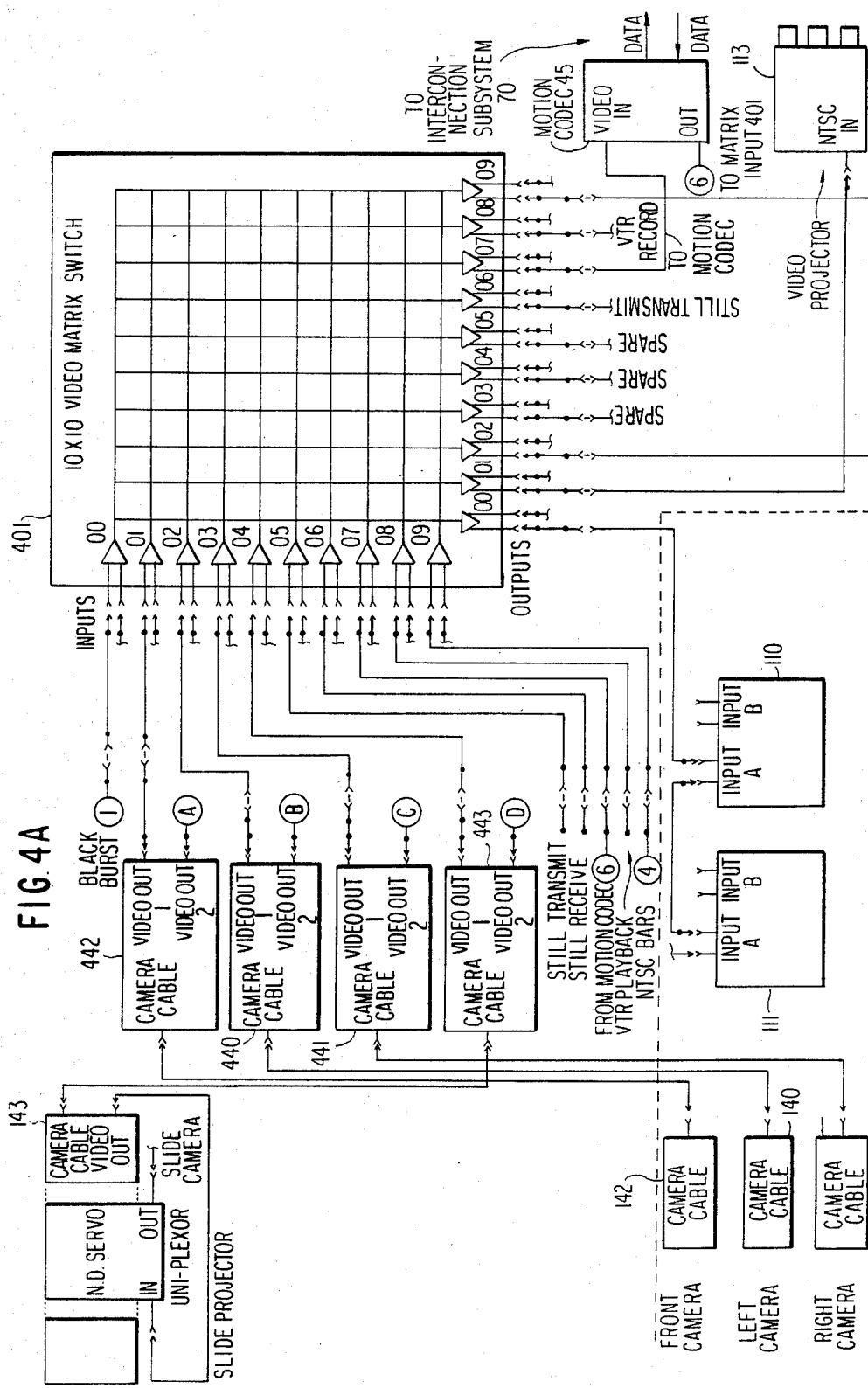

Referring in more detail to FIG. 4A, the front camera 142, side cameras 140 and 141 are identified as being coupled to associated camera control units 442, 440 and 441, respectively. In addition, the slide projector associated camera 143 is coupled to a fourth camera control unit 443. Each of these camera control units provide, as an output, a video signal which is coupled to a different one of the inputs of a 10×10 video matrix switch 401. Other inputs to the video matrix switch include a still transmit, still receive, a video output from the motion codec 45, an output from the VTR playback and, for testing and maintenance purposes, a black burst signal and NTSC bars.

A first output of the video matrix switch 401 is coupled to the side monitors 110, 111. A second output of the video matrix switch 401 is coupled to the NTSC "in" terminal of the video projector 113.

A third output of the video matrix switch 401 is coupled to the NTSC "in" terminal of the video mixer 132 which is associated with the control console 130. The fourth through sixth outputs of the video matrix switch 401 are available for other functions. The seventh output of the video matrix switch is available for still transmit. The eighth output of the video matrix switch 401 is coupled to "video in" terminal of motion codec 45. The ninth output of the video matrix switch 401 is available as a video input for a VTR recorder. Finally, the tenth output of the video matrix switch 401 is coupled to a test switcher 402. The test switcher 402 can be coupled to test and maintenance equipment including NTSC wave form monitor, NTSC vectorscope, and NTSC monitor 403-405.

The motion codec 45, in addition to encoding locally generated video signals to produce data output for connection to the wide band digital link, is also used to decode data representing remotely generated video signals, to produce a video output signal which is coupled as one of the inputs to the 10×10 video matrix switch 401. Not shown in FIG. 4A (and shown in FIG. 6A) is the control element for video matrix switch 401 which enables selective interconnection to be made between any of the ten input terminals and any of the ten output terminals. In this fashion, video matrix switch 401 can selectively route any of its input signals to any of its output terminals. For example, in this fashion a signal from any of the four local TV cameras can be coupled to any of the four display devices, i.e. the video projector 113, the side monitors 110, 111 or the control console video display 131. In the alternative, a video signal remotely generated could be coupled to any or all of the local monitors. In addition, the locally generated video signal can be coupled to the motion codec for transmission to the remote site, and the particular video signal selected for transmission can be that generated by any of four local TV cameras.

Figure 5:
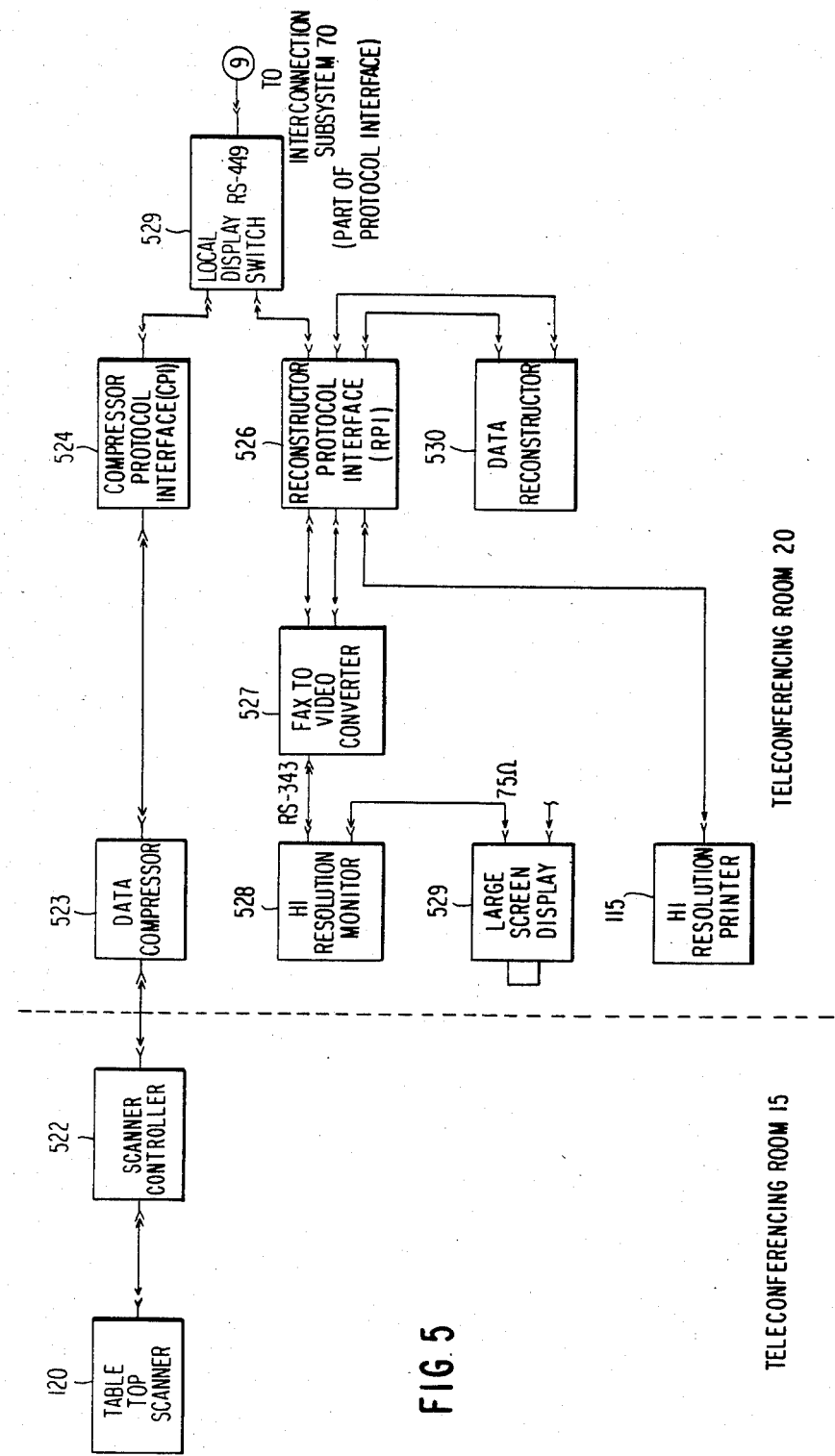
FIG. 5 is a detailed block diagram of the high resolution facsimile subsystem.

FIG. 5 is a schematic representation of the high resolution subsystem. The high resolution subsystem can transmit images which are too detailed for transmission by the NTSC television standard. Included in this category for example are letters, contracts, flow diagrams, other drawings and similar materials encountered in daily business meetings.

The high resolution subsystem is composite of facsimile and high resolution television technology. Documents to be transmitted are placed on a scanner 120 (FIG. 1) much like that of a conventional office copying machine. When a scan is initiated, by operating control 121 an $8\frac{1}{2} \times 11''$ document is scanned in approximately five seconds with a resolution of 200 lines per inch in both directions. The electrical signals generated by the scanning operation are coupled to a data compressor employing a digital data compression technique that allows signals generated during the scanning operation to be transmitted or received in less than ten seconds. The digitally compressed document is stored and buffered in a compressor protocol interface from which it is transmitted to the distance teleconference room through a 448 KBPS digital data port.

At the distant teleconferencing site the digitally compressed document is buffered in a reconstructor protocol interface and reconstructed to its original (or decompressed) form by a data reconstructor.

The document is then printed on a high speed facsimile printer located at the remote teleconferencing site and it also converted by a facsimile to video converter for projection by large screen television display. Although hard copies obtained from the printer retain the original 200-line-per-inch resolution, the projected image of the document is presented at a lesser resolution, approximately equivalent to 100 lines per inch. The television technique chosen for the large screen display is different from the American NTSC standard used for the generation and display of other video images. The images are displayed in black and white. To improve legibility the projected display may be reversed (in contrast) from the original and hard copy printout. In addition, the orientation of the displayed graphics can be electronically rotated through 90°, 180° or 270°. As shown in FIG. 5, the tabletop scanner 120 is coupled to a scanner power supply 522. This is in turn coupled to a data compressor 523 which couples through a compressor protocol interface 524 to a local display switch 525. The local display switch 525 allows locally generated data representing graphic images to be coupled to the interconnection subsystem 70. In addition, either the locally generated signals or remotely generated signals can be coupled to a reconstructor protocol interface 526 and associated data reconstructor 530. Reconstructed data can be coupled directly from the reconstructor protocol interface 526 to a high resolution printer 115. In the alternative, or in addition, locally or remotely generated data representing graphic images can be coupled to a fax-to-video converter 527. The resulting video signal can be coupled to optional high resolution monitor 528 and to a projector 529 for display on the high resolution screen 117 (FIG. 1). The fax-to-video converter 527 is the subject of Schaphorst copending application Ser. No. 252,104 filed Apr. 8, 1981 (incorporated herein by this reference) and assigned to the assignee of this application.

Accordingly, it should be apparent that the high resolution subsystem allows the transmission and/or reception of graphic images and the display of either locally generated graphic signals or remotely generated graphic signals. Although not specifically disclosed herein the high resolution subsystem could be controlled via the control subsystem 60 with suitable modifications.

The control subsystem 60 provides the interface between the conference participants and the other subsystems of the teleconferencing system. The control subsystem 60 is based on a software driven microcomputer. A user interfaces with the microcomputer through a color CRT display 131 mounted on the boom 131a. This display is equipped with a touch sensitive overlay which permits the control subsystem 60 to respond to user "touches" or commands. The microcomputer generates a series of color graphic "menus" which are displayed. These menus provide limited, logical, self-prompting choices to the user. The eliminates the need to provide for all necessary controls at one time as would otherwise be the case with a typical hardware control panel.

The user indicates his choices through a series of touches known as a control sentence. A complete control sentence generally consists of a source element (a camera, for example, although the receive function is also a source) and an action (pan, tilt, zoom, focus to a preset set of parameters) or display (selection of a particular display) element followed by a touch to the "go" or sentence end element. In the event the user constructs a sentence with inappropriate (or impossible) or incomplete grammar, an automatic error message appears on the color CRT to prompt the user.

The "master menu" has been designed to manage most of the teleconferencing functions required during a meeting. This menu provides control over camera pointing through the selection of previously preset pan, tilt, zoom and focus parameters. Six of these preset positions are defined at system installation for each of the sidewall cameras 140 and 141. Two additional presets are available for each camera through an additional menu which permits continuously variable camera pointing, zoom and focus. A user is able to:

point the sidewall camera 140 and 141 to one of six preset positions defined at installation, point a sidewall camera 140, 141 to any position within the limits of the pan, tilt, zoom and focus mechanism; and define two additional preset positions for each sidewall camera 140 and 141 which are valid only for the duration of the conference during which those presets are defined.

The master menu also permits the user to select images for transmission to the remote site, display on any of the local displays for previewing on either of the two wall monitors 110, 111 or the CRT display 131 associated with the console 130.

Selection is also possible of the slide camera 143 which can be selected for transmission or display (or both). A hand-held wireless remote control (conventional) permits the slide projector to cycle slides "forward" or "reverse" from anywhere in the main room 15.

To provide display of color menu graphics, the microcomputer controller interfaces with the conference control console CRT 131 through separate video cables. There is a composite NTSC video interface between the CRT 131 and the video matrix switch 401 to permit menu graphics to be overlaid on video generated by the teleconferencing room cameras. This is useful with a menu which overlays pan, tilt, zoom and focus touch elements over the image of the camera being controlled to permit the user to view camera pointing while it occurs.

All other interfaces between the microcomputer and control devices are made through RS-232C serial data ports. These include:

the touch sensitive screen controller 550, the pan, tilt, zoom and focus controller for side cameras 140, 141, and the video matrix switch 401.

The microcomputer also includes additional RS-232C serial data ports to interface with:

the boot loading mechanism 601 which provides the IPL when power is applied, and maintenance terminal 551 with keyboard and alpha numeric CRT.

Figure 6B:
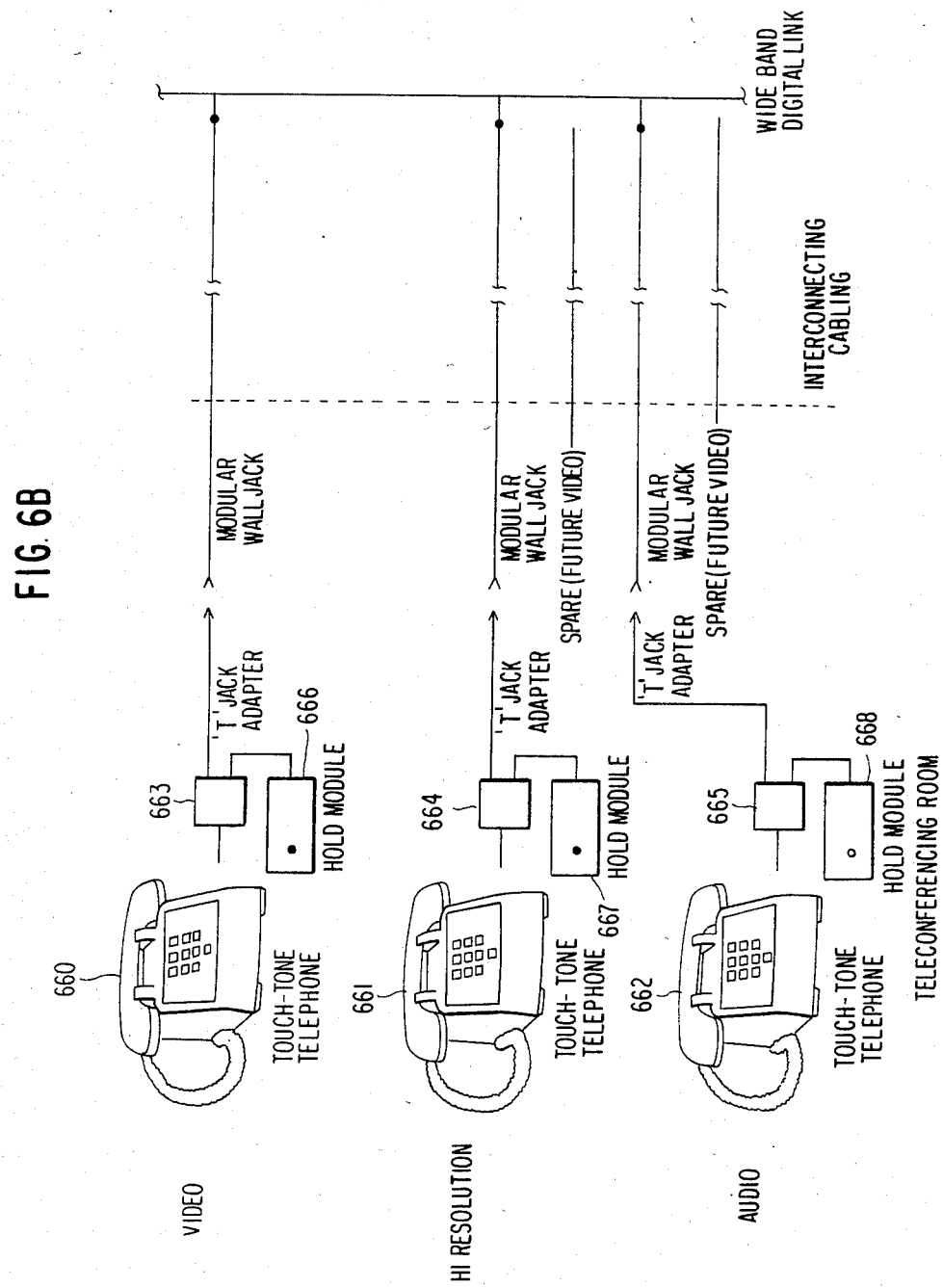

The control subsystem is shown in detail in FIGS. 6A–6C.

Referring first to FIG. 6A, the teleconference control console 130 includes a touch sensitive screen 134, console CRT display 131 and video mixer 132. Each of the side camera controllers 440 and 441 includes a zoom lens controller, iris control, and pan/tilt assembly. Associated with each camera controller is a pan/tilt/zoom/focus controller which in turn is driven via an RS-232 data link by the microcomputer 133. In this fashion, data signals representing desired pan/tilt, zoom and focus settings can be transferred from the microcomputer 133 to the appropriate controller for effecting the desired control. The front camera controller 442 also includes a zoom lens control 542 which is driven by a manually operated zoom controller 642, although those skilled in the art will be aware that providing another pan/tilt/zoom/focus controller such as 640 or 641, in place of the manual zoom controller 642, can enable control of the zoom lens of camera 142 through console 130. Interfacing between the touch sensitive screen 134 and the computer 133 is a touch sensitive controller 550. The computer 133 is also coupled through another RS-232 line with the control unit for the 10×10 video matrix switch 401. In this fashion the computer 133 can selectively connect inputs and outputs to effect the desired control. The computer 133 is also coupled to a boot load medium 601 for IPL as should be apparent to those skilled in the art. Terminal 551, the maintenance terminal, is interfaced to computer 133.

Another component of the control subsystem is illustrated in FIG. 6B which shows a trio of touch telephones 660–662. Each telephone is coupled through associated "T" jack adapter 663–665 to an associated hold module 666–668. The other output of the "T" jack adapter is coupled through interconnection cabling to the wide band digital communication link. The user merely dials a telephone-like number into one or more of the telephones 660, 661 and 662 depending on the particular resources he intends to use. For example, to enable a video conference, the video feature representing number is "dialed" on telephone 660. This signals the communication system to the requirement to allocate a video representing digital channel to the port associated with instrument 660. This port is, of course, connected to the video component of the interconnection subsystem 70. Similar remarks apply to the use of instruments 661, 662, respectively, with reference to high resolution and audio service.

FIG. 7 shows the interconnection of the motion codec 45 and high resolution subsystem to the wide band communication link uses modem pairs 701, 703 and 702, 704. This allows for limited separation between subsystem terminations and communication link terminations. Those skilled in the art will realize that provision of these modems is not at all essential to the invention.

The particular wide band digital link with which the embodiment of the invention actually constructed, interfaces, associates each data port with a voice port for the transmission of signalling information. The associated voice port is terminated at a conventional telephone, and a connection between a local and remote data port is effected by dialing a number representing the desired service as described above. It should be apparent to those skilled in the art that this particular technique of associating a voice and data port is not the only method of signalling. Furthermore, it should be apparent that any other conventional technique can be used in accordance with the present invention.

The equipment referred to herein is identified by manufacturer and model in the attached Tables I–VI; Table I (audio); Table II (video); Table III (high resolution); Table IV (control); Table V (interconnect) and Table VI correlates manufacturer designations on Tables I–V with name and location.

TABLE I

AUDIO SUBSYSTEM

| REF | MANUFACTURER | MODEL | DESCRIPTION |
|---|---|---|---|
| 303 | Altec | 1589B | Microphone Preamplifier (Mixer) |
| 312 | Altec | 1588C | Microphone Preamplifier |
| 304,305 | COMSAT | EC-4105 | Echo Canceller |
| 301,302 | Crown | PCM-6LP | Microphone |
| 313 | Di-Tech | 7001 | Audio Monitor/Amplifier |
|  |  | w/Option A |  |
|  |  | w/Option B |  |
| 311 | Eventide | CD254 | Digital Delay Line |
|  | IVIE | 5001 | Mainframe |
|  | IVIE | 5101 | Power Module |
| 308 | IVIE | 5303 | One-Third Octave Equalizer |
| 306,307 | IVIE | 5506 | 6 × 2 Mixer |
| 309 | IVIE | 5805 | Power Amplifier |
| 310 | JBL | 4301B | Room Loudspeaker |
|  | LAMBDA | LNS-P48 | 48 Volt Power Supply |
|  | w/LRA-15 Rack Adapter |  |  |
|  | (Configuration 4) |  |  |
|  | w/Digital Volt/Amp Meter |  |  |
|  | Trompeter | APC3-18 | Patch Cord, Audio |
|  | Trompeter | CH-50 | Patch Cord Holder |
|  | Trompeter | JJ-042 | Patch Jack, Audio |
|  | Trompeter | JSI-48 | Patch Panel |
| 314 | TCI |  | Audio Codec |

TABLE II

VIDEO SUBSYSTEM

| REF | MANUFACTURER | MODEL | DESCRIPTION |
|---|---|---|---|
| 110,111 | Conrac | 5222Y25 | Side Monitor |
| 142 | Cosmicar | 50FMF1.4 | 50 mm Lens |
| 401 | Dynair | AO-2165A | Output Module (Audio) |
| 401 | Dynair | CC-2118A | Power Supply Service Cable |
| 401 | Dynair | CE-2190A | Module Extender |
| 401 | Dynair | FR-2100A | 10 × 10 Matrix Frame |
| 401 | Dynair | MP-2110A | System Controller |
| 401 | Dynair | PS-2115C | Power Supply |
| 401 | Dynair | SCA-260A | Touch Pad Control |
| 401 | Dynair | SW-2150A | 10 × 10 Switch Module (Video) |
| 401 | Dynair | SW-2160A | 10 × 10 Switch Module (Audio) |
| 401 | Dynair | VO-2155B | Output Module (Video) |
| 402 | Dynair | VS-12D | Test Switcher |
|  |  | w/LK-1541A |  |
| 113 | ESP | AQUA-STAR | NTSC Projector |
|  | w/Comb Filter, horizontal shading |  |  |
|  | control and optics optimized for |  |  |
|  | 48" wide image |  |  |
| 142 | Fujinon | A12X9 | Zoom Lens, Auto Iris |
| 140,141 | Fujinon | H10X105RH | Zoom Lens |
|  | Fujinon |  | .78X Adapter (A12 × 9) |
| 140–143 | JVC | AAC2OU | AC Adapter |
| 140–143 | JVC | KY-2000CH | Camera |
| 440–443 | JVC | RS-2000U | Camera Control Unit |
| 143 | Laird-Telemedia | 4110 | Slide Projector, with 3" Lens, Single Drum |
| 143 | Laird-Telemedia | 2508 | Control |
| 143 | Laird-Telemedia | 5050 | N.D. Servo |
| 143 | Laird-Telemedia | 5135 | Uniplexer |
| 403 | Tektronix | 528 | NTSC Waveform Monitor |
|  |  | w/Option 01 |  |

TABLE II-continued

VIDEO SUBSYSTEM

| REF | MANUFACTURER | MODEL | DESCRIPTION |
|-----|--------------|-------|-------------|
| 405 | Tektronix | 650HR | NTSC Monitor |
| 404 | Textronix | 1420 w/Option 01 | NTSC Vector Scope |
|  | Trompeter | J14 | Patch Jack, Video (Normal Thru) |
|  | Trompeter | JSI-48 | Patch Panel |
|  | Trompeter | PC-18-75 | Patch Cord, Video |
|  | Dynair | CE-0052 | Module Extender |
|  | Dynair | CE-0056 | Module Extender |
|  | Dynair | DA-5960A | Video Distribution Amplifier |
|  | Dynair | DA-5966A | Subcarrier Distribution Amplifier |
|  | Dynair | FR-5900A | Frame |
|  | Dynair | PD-5941A | Pulse Distribution Amplifier |
|  | Dynair | PS-5920A | Power Supply |
|  | Tektronix | 1470 | NTSC Generator |
|  | NEC | NETEC-X1 | Motion Codec |

TABLE III

HIGH RESOLUTION SUBSYSTEM

| REF | MANUFACTURER | MODEL | DESCRIPTION |
|-----|--------------|-------|-------------|
| 117 | ESP | — | Large Screen Display |
| 131 | Conrac | QQA14/RS | High Resolution Monitor |
|  | Grinnell | 305 | Facsimile to Video Converter |
| 120 | Rapicom | HSS-44 | Table Top Scanner |
| 121 | Rapicom | HSS-44 | Scanner Controller |
|  | Rapicom | HSC-44 | Data Compressor |
|  | Rapicom | CPI-44 | Compressor Protocol Interface |
|  | Rapicom | RPI-44 | Reconstructor Protocol Interface |
|  | Rapicom | HSR-44 | Data Reconstructor |
| 115 | Rapicom | HSP-44 | High Speed Printer |

TABLE IV

CONTROL SUBSYSTEM

| REF | MANUFACTURER | MODEL | DESCRIPTION |
|-----|--------------|-------|-------------|
| 130 | ADI | TDC-051-Q | Teleconferencing Display/Controller |
|  |  |  | w/option 1  Auto-boot |
|  |  |  | w/option 2  Maintenance Terminal |
|  |  |  | w/option 3  Memory Block 32K |
|  |  |  | w/option 5  Programmable Element Generator |
|  | Creston | C-10 | Wireless Controller |
|  | SECS | — | X-Y Platform |
|  | Texas Instruments | TI785 | Portable Terminal |
|  | Racal-Vadic | 3451P | Data Modem |
|  |  | S-466023 | Line Cord |
|  |  | S-47178 | ITT Touch-Tone Telephone |
|  |  | S-480727 | CAC-625 Jack |
|  |  | LH-50 | Hold Module |
|  |  | MCI Kit | T Jack Adapter |

TABLE V

INTERCONNECTION SUBSYSTEM

| REF | MANUFACTURER | MODEL | DESCRIPTION |
|-----|--------------|-------|-------------|
|  | AVANTI | 2300 | Limited Distance Modem (448 Kbps, RS-449, SBS CNS Compatible) |
|  | AVANTI | 2300 | Limited Distance Modem (1.544 Mbps, RS-449, SBS CNS Compatible) |

TABLE VI

ADI
Applied Dynamics International
Ann Arbor, Michigan 48104

ALTEC
Altec Corporation
Anaheim, California 92803

AVANTI
Avanti
Newport, Rhode Island 02840

COMSAT
Comsat General Telesystems
Fairfax, Virginia 22031

CONRAC
Conrac Division, Conrac Corporation
Covina, California 91722

COSMICAR
See VIDEO CORPORATION OF AMERICA

CRESTON
See VIDEO CORPORATION OF AMERICA

CROWN
Crown
Elkhart, Indiana 46514

DI-TECH
DI-TECH, Inc.
North Babylon, New York 11704

DYNAIR
Dynair Electronics, Inc.
San Diego, California 92114

ESP
Electronic System Products, Inc.
Titusville, Florida 32780

EVENTIDE
Eventide Clockworks, Inc.
New York, New York 10019

FUJINON
Fujinon Optical, Inc.
Scarsdale, New York 10583

GRINNELL
See RAPICOM

IVIE
Ivie Electronics, Inc.
Orem, Utah 48057

JBL
James B. Lansing Sound, Inc.
Northridge, California 91329

JVC
Professional Video Division
US JVC Corporation
Maspeth, New York 11378

LAIRD-TELEMEDIA
Laird Telemedia, Inc.
Salt Lake City, Utah 84115

LAMBDA
Lambda Electronics
Melville, New York 11747

NEC
Broadcast Equipment Division
NEC America, Inc.
Elk Grove Village, Illinois 60007

RACAL-VADIC
Racal-Vadic
Sunnyvale, California 94086

RAPICOM
Rapicom, Inc.

TABLE VI-continued

Santa Clara, California 95050
SECS
SECS, Inc.
Long Island City, New York 11105
TEKTRONIX
Tektronix, Inc.
Beaverton, Oregon 97077
TCI
Telecommunications, Inc.
Gaithersburg, Maryland
TEXAS INSTRUMENTS
Texas Instruments, Inc.
Houston, Texas 77001
TROMPETER
Trompeter Electronics, Inc.
Chatsworth, California 91311
VIDEO CORPORATION OF AMERICA
Video Corporation of America
Edison, New Jersey 08817

Menu and Menu Sequences

Figure 8:
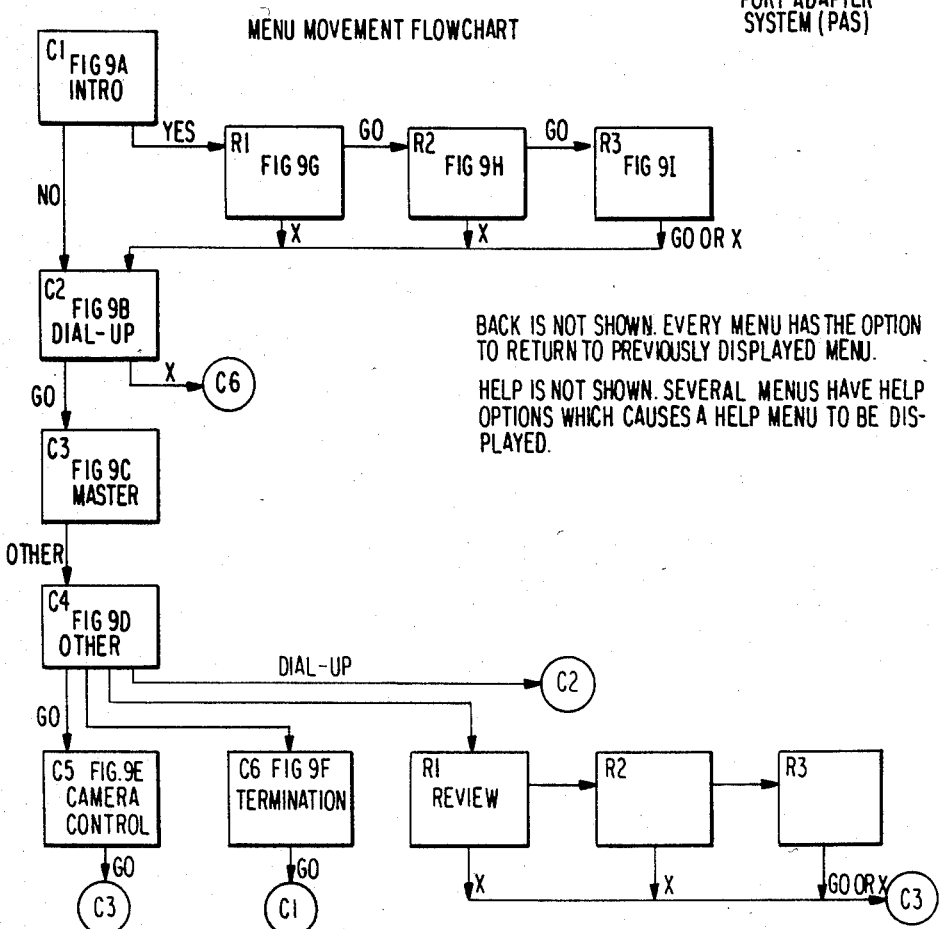
FIG. 8 is a flow chart showing control menu movement.

Control by the conference leader is effected by touches of the touch sensitive screen 134. The effect of any particular touch depends on how that touch is interpreted by the computer 133. This in turn depends on the display on the display 131 at the time the touch is effected. In order to assist the conference leader in effecting the desired functions in a manner which is realizable with the equipment available to him, the display 131 proceeds in a pre-established sequence, however, the sequence can be altered by the conference leader selecting certain functions as will now be described. FIG. 8 schematically illustrates the sequence of menus which can be displayed, and the manner in which the conference leader can select the next menu to be displayed. As shown in FIG. 8, there are nine different menus including menus C1-C6 and R1-R3. In addition, several help menus are also used, which particular help menu is displayed is determined in part by the condition of the system at the time an error is detected or help is requested.

Figure 9A:
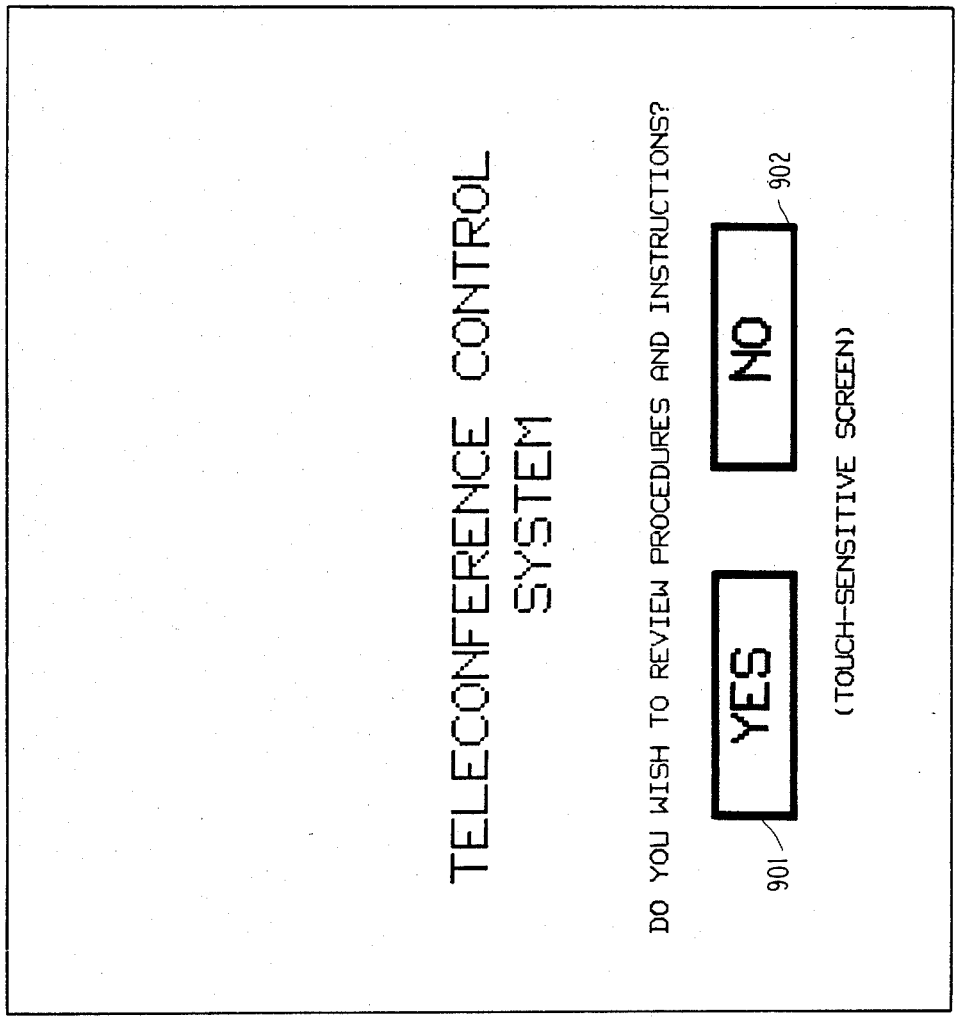

Each of the menus includes certain descriptive information to assist the conference leader in selecting the commands to be executed as well as interpreting his commands. In addition to providing the conference leader with descriptive information, the menu also defines one or more touch sensitive areas on the screen; the location of the touch sensitive area or areas, and the response produced by touching one of those areas is again determined in connection with the particular menu being displayed. Reference is now made to FIG. 9A to illustrate menu C1. This is the introduction menu; in addition to the merely descriptive information, it also identifies two touch sensitive areas on the screen, identified as 901 and 902. With menu C1 being displayed, the operator can either request review of procedures, by touching area 901, or decline to review procedures by touching area 902. If the conference leader touches area 901, the first review menu R1 is displayed (see FIG. 8).

Figure 9B:
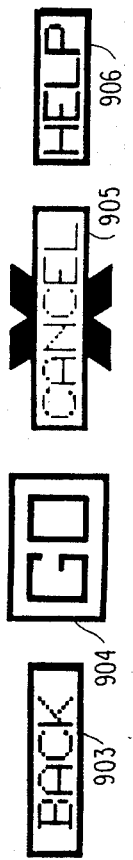
Figure 9C:
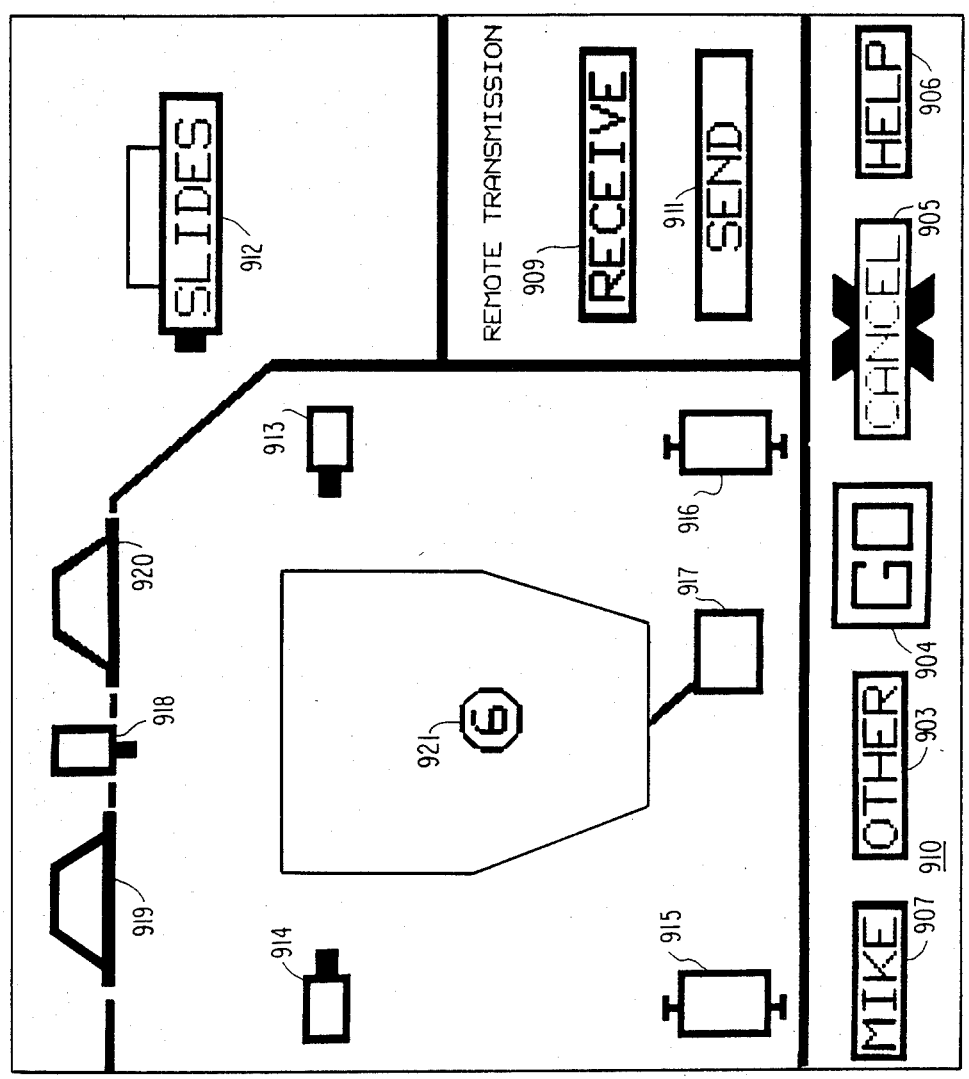
Figure 9D:
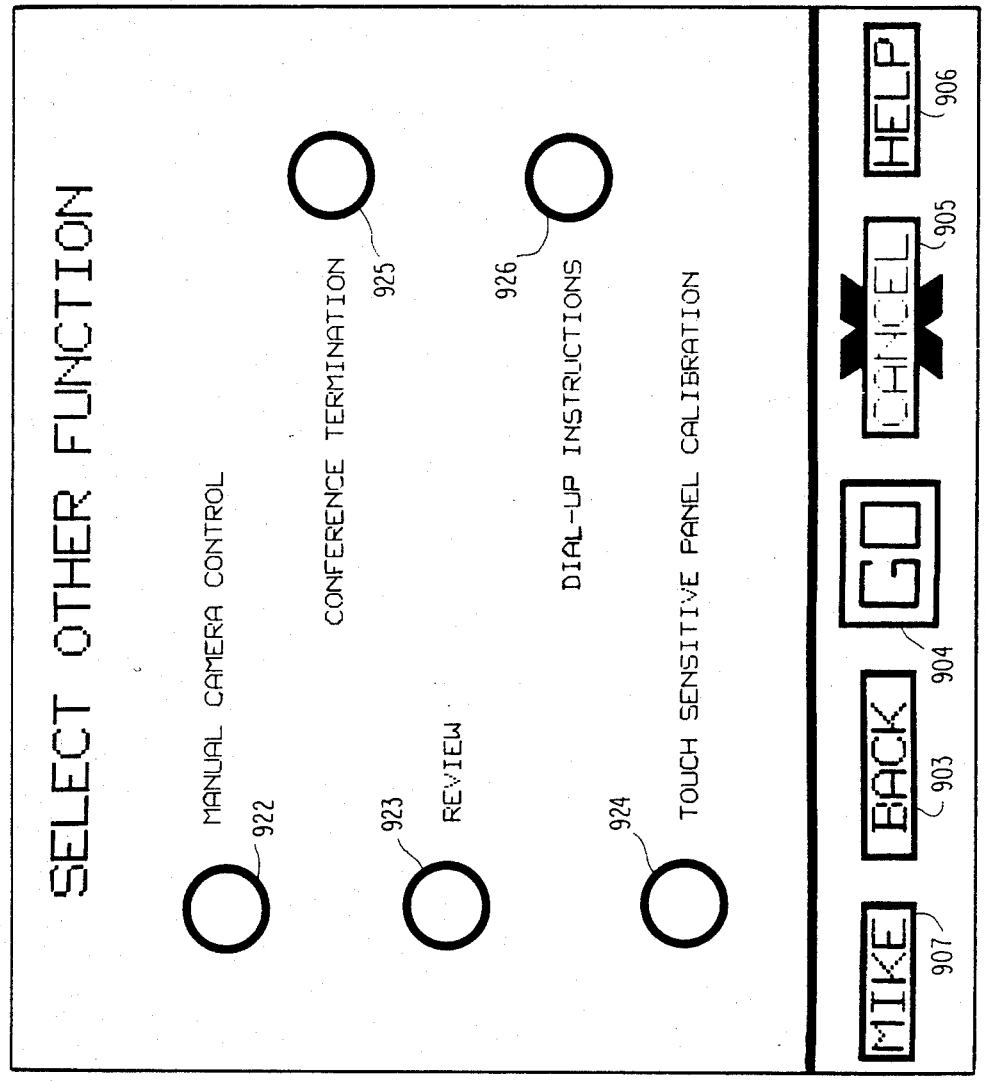
Figure 9E:
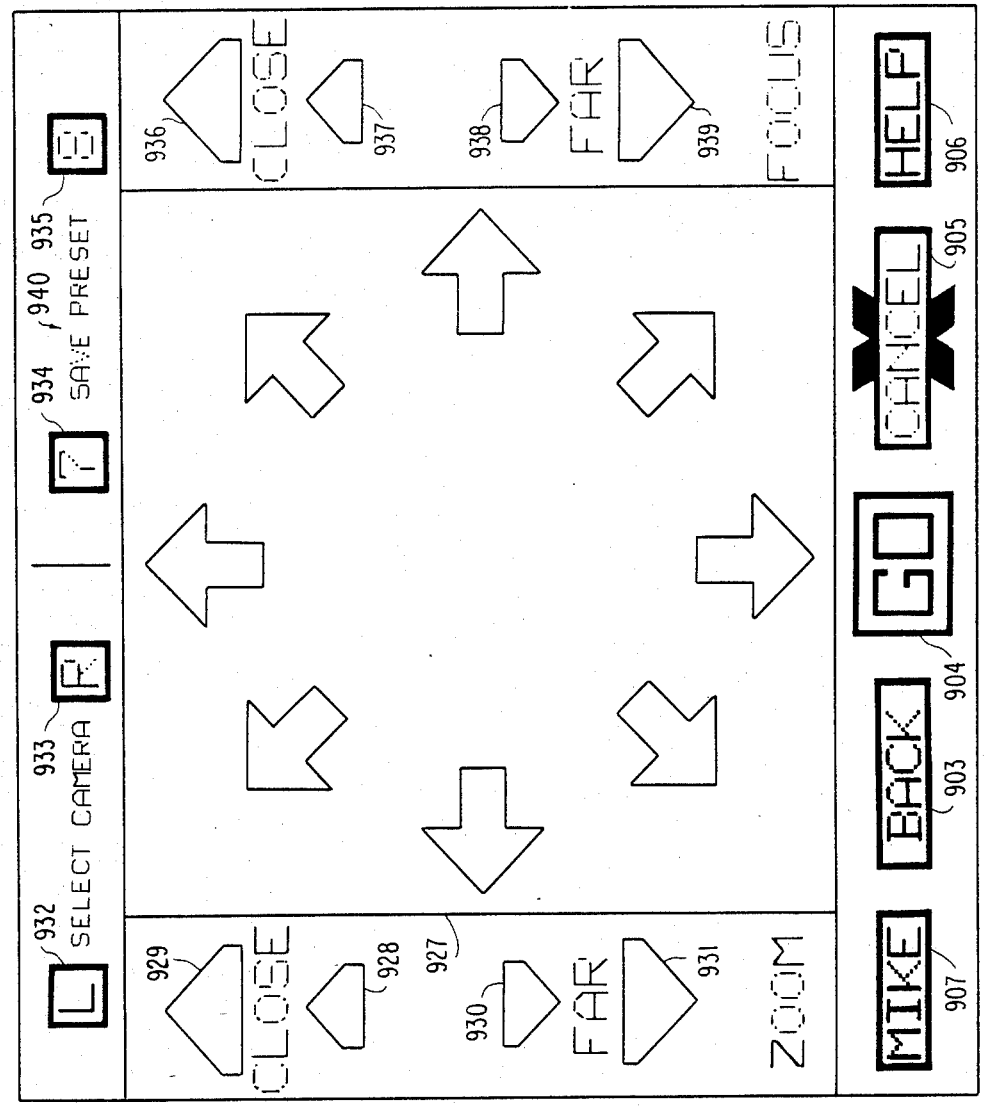
Figure 9F:
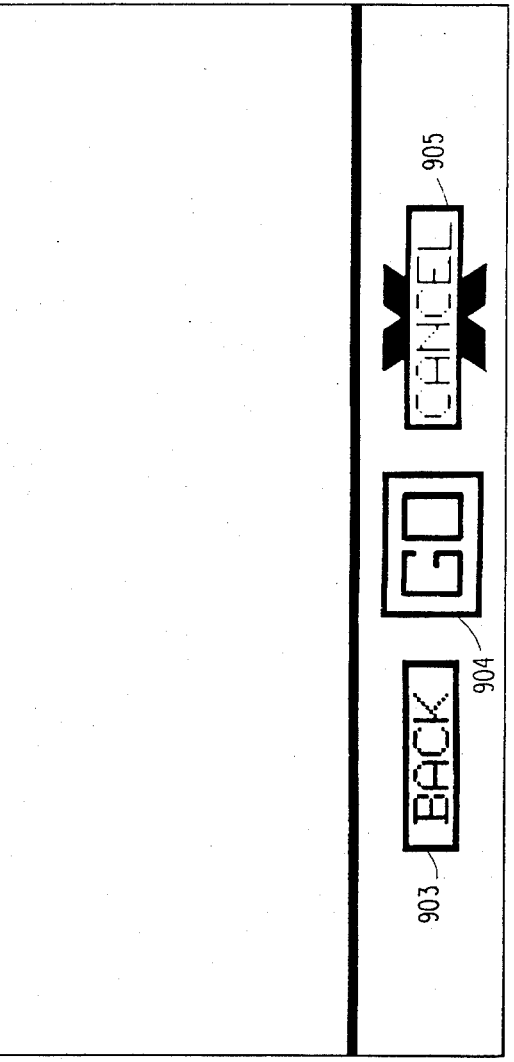
Figure 9H:
Figure 9I:
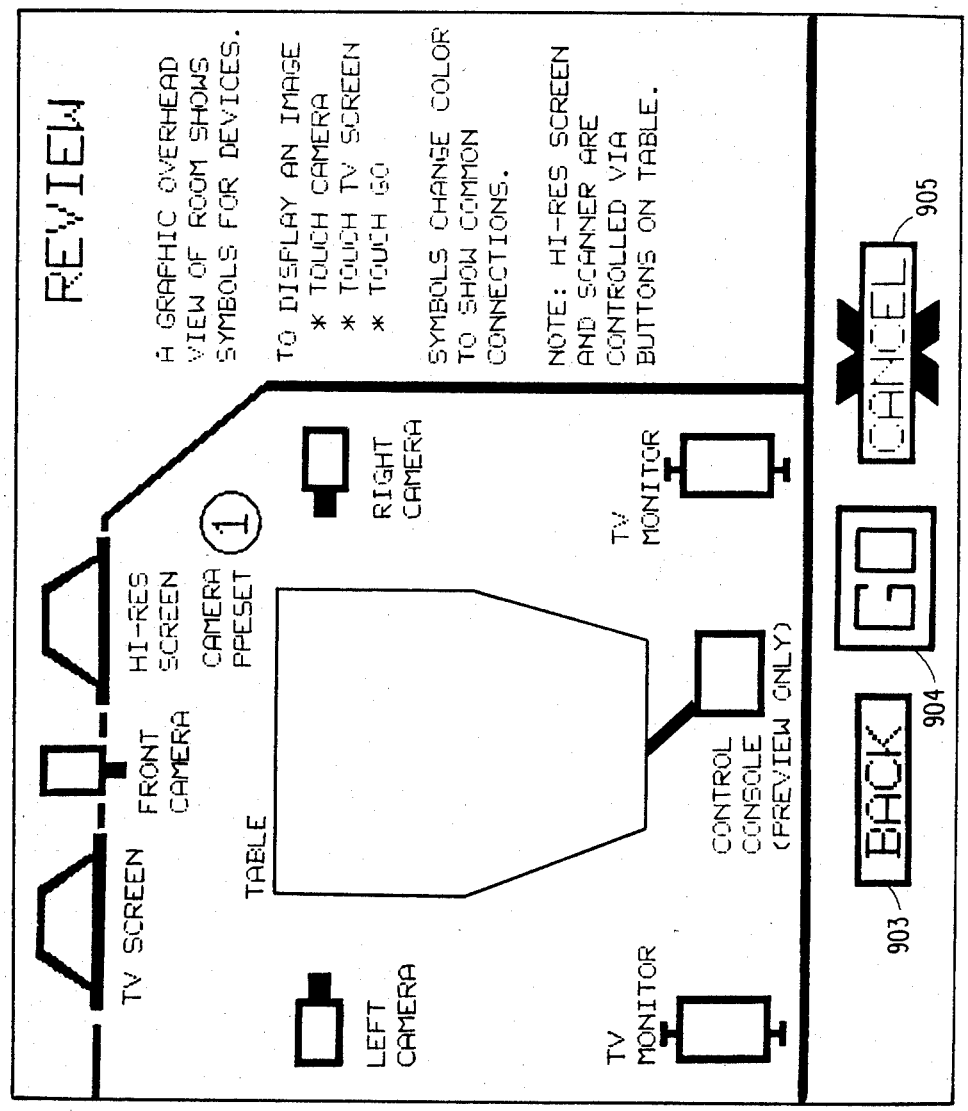

The procedure review menus include menus R1-R3 and are illustrated respectively in FIGS. 9G-9I. Referring first to FIG. 9G, the menu includes for the most part descriptive information but does define touch sensitive areas 903-905. Touch sensitive area 903 allows the conference leader to redisplay the previously displayed menu. Touching area 904 brings up the next review menu, in this case R2, while touching area 905 in any of the review menus R1-R3 will immediately bring up menu C2. The same three touch sensitive areas 903-905 are defined on each of the menus R2 and R3 with the same result except that in menu R3, touching either 904 or 905 brings up menu C2.

Referring to FIG. 9I, menu R3 (which is illustrated) is in effect a preview of the master menu C3. Depicted in the information area are representations for three of the TV cameras, the large screen TV display and high resolution display on the front wall of the room, as well as the two side monitors 110 and 111 and the control console 130. Menu R3 also illustrates a camera preset, in particular camera preset 1 (in the one o'clock position with respect to the table). Each of the movable cameras (the left and right) are presettable to one of eight preset positions or can be manually controlled to point to any other position in a manner which will be described. Of the eight presets, however, six are fixed at system installation, and two are under control of the conference leader so that he can define any position in the room as either of those two presets. It should be understood that the number of presets and the mix (how many are fixed at installation and how many are under operator control) can be varied quite readily.

Reference is now made to FIG. 9B to illustrate the first control menu C2. The touch sensitive areas defined in menu C2 are areas 903-906. In menu C2, touch sensitive area 903 has the same effect as did touch sensitive area 903 in menus R1-R3, namely it allows display of the previously displayed menu. However, areas 904 and 905 have a different effect. As described in the informative text of the display, the conference leader is prompted to dial up the functions he desires. When those functions are on-line, the conference leader can proceed by touching area 904. On the other hand, the conference leader can terminate the conference by touching 905.

Touch sensitive area 906 allows the operator to display additional information to assist him in proceeding.

Assuming the operator has proceeded beyond menu C2 by touching touch sensitive area 904, the master menu C3 is displayed; this is shown in FIG. 9C. This menu, in additional to schematically depicting the layout of the main room 15, has a large number of touch sensitive areas. At the bottom of the display, the now familiar touch sensitive areas 904-906 are displayed. In addition, touch sensitive areas 907 and 908 are also displayed. The touch sensitive area 908, if touched, causes a display of the next command menu C4. Touch sensitive area 907 provides operator control over the audio transmission function as will be explained. The operator can also control video transmission and reception through touch sensitive areas 909 and 911. If, for example, the conference leader desires to transmit video, this is effected by touching area 911. An image source must also be defined among the four image sources available, namely the slide projector 143, the front camera 142, or one of the two side cameras 140, 141. Each of these image sources is represented in the menu, i.e. the slide camera is represented at touch sensitive area 912, the front camera is represented at touch sensitive area 918, and the left and right side cameras are represented at touch sensitive areas 913, 914, respectively.

In addition, the operator can select a display. The conference room includes the wide screen TV display 116, the two side monitors 110, 111, as well as the conference control console 130, itself. Each of these displays is represented on the main menu C3; more particularly, the wide screen display is represented by touch sensitive area 919, the two side monitors are represented by touch sensitive areas 915 and 916, respectively, and the control console 130 is represented by the touch sensitive area 917. Thus by appropriate touches, the leader can selectively transmit an image from any of the sources. He can, at that time, or later, direct the same image to any of the displays. He can also direct a received image to any unused display. In addition, the high resolution large screen display 117 is represented by the touch sensitive area 920. The software described herein does not interact with the high resolution subsystem and this touch sensitive area 920 is useful for future modifications which allow control, of the control subsystem 60, over the high resolution subsystem.

Before describing the reactions to various touches and touch sequences, the color of the various items in the display is pertinent since, as touches are effected, color changes to inform the conference leader of the status of any control message at any time. The background on the entire menu is gray except for the region 910 which has a white background. All the lettering is black except for the lettering within the touch sensitive area 904 which is blue. The borders of all menu elements are black. However, elements which are "pending" (that is elements which have been selected by a touch) have white borders. Accordingly, the conference leader can readily determine from the display which touch sensitive elements are pending, by merely noting that the border is white. All inactive devices, that is the cameras not originating an image or displays not displaying an image have a gray body. If any camera is active, its body takes on a distinctive color. For example, the front camera when active is green, the left camera when active is magenta, the right camera when active is cyan, and the slide camera when active is blue. When a particular camera is activated and is coupled with a particular display, the combination is said to be bridged, and the selected display takes on the color of the associated camera; accordingly, the touch sensitive areas representing displays that is 919, 915, and 916 can take on any of these four colors if they are bridged with one of the four recited cameras. On the other hand, the receive area 909, when active becomes orange and if the remotely generated video signal is bridged to one of the displays, the display takes on the same orange color.

Some of the touch sensitive areas are altered when representing pending touches. These include all displays and all cameras as well as the receive and send touch sensitive areas 909 and 911. Pending touch elements have a border which changes from black to white on first touch and from white to black when touched again.

On the other hand, other elements are immediate. For example, in FIG. 9C, touch sensitive areas 907, 908, 904, 905, and 906 are all immediate in that touching the element causes a change to the body color or a change in the display on the control console 130. In an embodiment of the invention actually constructed, when initialized, the system comes up in a default condition in which the audio system in ON, the front camera 142 is bridged to the send function as well as to the side monitors 110, 111, and a remotely generated video signal is bridged to the wide screen 116. Accordingly, the initial display of FIG. 9C represents this condition in that, initially, the front camera bridge results in touch sensitive 918 taking on a green color as well as the TV monitor representations 915 and 916 along with the send area 911. Likewise, the touch sensitive area 919 comes up orange as is the receive area 909. The default condition described above is a function of stored data. Thus, if desired, any other condition can be defined as a default.

In response to a single touch to any touch sensitive element which requires the building of a command sentence, that element becomes pending and the border turns white; the pending status of this element is reflected in the software in that identification of the element is placed on a stack. Retouching the element turns the border black and removes the element from the stack. The foregoing statement applies to the display representation 919, the side monitors 915, 916 and the send element 911. When the control console representation element 917 is touched, the result depends on a previous touch. If no camera or remote reception had been touched, a representation of the control console display is put on a stack. If later a camera or active device is touched, the image from that device is previewed on the console and the border turns black. If an image source (a camera or reception function) had been touched, an image from that source is displayed on the control console.

In respect to the front camera, touching it turns the border white and stacks a representation in software. Any other cameras with a white border turn black and are removed from the stack. If the element 917 had been touched, an image from the front camera is displayed on the console. When retouched, the border turns black and the image is removed. The same functions are true for the side cameras 140, 141 and the slide camera 143. However, in addition, with respect to the side cameras 140, 141, touching either of these produces a display on console screen 131 the available presets for the associated camera. For example, FIG. 9C shows preset number 6 being displayed, i.e. element 921.

In the absence of any camera being active, no presets are displayed. When a camera becomes active, the associated presets are displayed. If a preset is touched, when it is visible the border turns white, the border of any other preset which had been white turns black. The camera then automatically moves to that preset via a message generated by the computer 133. If a camera is active, the preset takes on the color of the camera and any previously active preset turns gray. Retouching the preset turns the border black. If the controllable presets 7 or 8 are touched and the settings have not been stored, the area 904 becomes red and the camera does not move.

When the area 907 is touched, the audio system changes state. If it had been ON, the touch sensitive area 907 was green, and after touching it, it turns gray and the audio source is disabled. On the other hand, if the audio source had been disabled, then the touch sensitive area 907 would have been gray, when touched it becomes green and the audio source is enabled. Enabling or disabling the audio source is effected by a message transmitted by the computer 133 to the audio plane of the switch 401.

If the area 908 is touched, pending touches are not effected but the menu being displayed changes to C4.

If area 905 is touched when either the area 904 is red or an error message is being displayed, the message area is reset to again display elements 907 and 908 and/or area 904 becomes green. If none of these conditions are true, then any pending touches are deactivated.

When the help area 906 is touched, the particular menu displayed depends on the condition of the area 904. If it had been red, indicating an error, then a corresponding help menu is displayed. If the area 904 is green (indicating no previously detected error) and there are no pending touches, then a descriptive help menu is displayed. If there is at least one pending touch, then the corresponding help menu for the last item touched is displayed.

Finally, when the element 904 is touched, then all pending touches are resolved.

The resolution of pending touches is as follows. A bridge can be constructed if the pending touches:

include one and only one image source (an image source is either a camera or the receive function):

if presets are displayed, the conference leader can select or not select a preset. If no preset is selected, the current one is employed;

one or more video sinks must be touched (a video sink is considered the front screen 117, one of the side monitors 110, 111 or the send function).

The bridge is completed by touching touch sensitive area 904; the computer 133 formats a message to effect the bridge. Any device in a bridge which had existed in another bridge is removed from the old one.

Any active bridge can be expanded by the addition of another display by:

touching any active device or preset in the bridge; touching the new display;
and touching the area 904.

An active display can be removed from the bridge by: touching the display;
and then touching area 905.

A complete bridge is cancelled when either the image source is touched coupled with touching of area 905 or the last active sink in the bridge is cancelled.

Everything can be cancelled by touching all active displays and following it with a touch of area 905.

A command sentence is considered one or more pending touches followed by touching either 904 or 905. If the pending touches do not form a logical bridge, an error will occur; area 904 will become red and an error message may be displayed.

A valid sentence can be concluded by the cancel function (element 905) if all the pending touches were to active devices. If there is a pending message, it must first be cleared before cancelling anything in a stack.

A valid go sentence must include at least two pending touches, one of which is a camera or an active display, a single pending touch will result in an error message since the sentence is incomplete. While various colors are used, those skilled in the art will be aware that colors other than those specifically mentioned can be used to like effect.

As explained above, menu C4 is achieved by touching the "other" element 908 in menu C3. Menu C4 is shown in FIG. 9D. Via this menu, the conference leader can return to the dial up instruction menu C2 by touching touch sensitive area 926, can call up one or more of the review displays by touching touch sensitive area 923, can call up a conference termination menu by touching touch sensitive area 925 or can call up camera control menu C5 by touching touch sensitive area 922. For this particular menu a sentence concluded by the go terminator requires one pending touch. As described in connection with FIG. 9C, a pending touch results in stacking the element, the border of the touched element becoming white, any other white border turns black and is deleted from the stack. Accordingly, touching element 904 activates the function called for by the most previous touch. Assuming the operator has touched touch sensitive area 922, and then 904, menu C5 is displayed. Menu C5 is shown in FIG. 9E. Menu C5 includes a number of touch sensitive areas. The touch sensitive areas 907, 903, 904, 905 and 906 have already been described in connection with previous menus and they have like effect. The other touch sensitive areas, however, are new. The other touch sensitive areas in menu C5 include elements 927-940. Elements 929 through 931 control a zoom function on the active camera. Elements 936 through 939 control the focus of an active camera. Elements 932 and 933 allow selection of either the left or right cameras 140, 141 as the active camera. Elements 934 and 935 allow the saving of a particular preset in one of the two controllable preset positions for each of the movable cameras 140 and 141. With this menu on the display, the conference leader can select either the left or the right camera by touching either element 932 or 933. When touched, the touched element color changes to orange, and the other, if orange, changes to white. A re-touch of an orange element turns it to white. When a camera is selected by a touch of element 932 or 933, the image from the camera is presented on display 131 in the region 927.

Similarly, touching one of the two preset elements 934 or 935 changes the touched element to orange and if the other had been orange, changes it to white. A re-touch of an orange element changes it to white. When an element is orange it is on the stack, otherwise it is not or removed therefrom. If the save preset legend (touch sensitive area 940) is selected (by touching the same) after having selected a camera and a preset, the combination of camera and preset is saved.

If after selecting a camera, an element in the zoom or focus field is selected, the touched element changes color for a short time and then returns to its original color. Each touch initiates a message from the computer 133 to the appropriate controller which effects the mechanical change to zoom or focus. If an element in the zoom or focus field is touched in the absence of a camera selection, then the field 904 turns red.

Similarly, if a camera had been selected any of the 8 arrows in the field 927 can be touched. When touched, the element changes color and remains until either that element is retouched or another one of the 8 elements is touched. The computer 133 formats and sends a message to the appropriate pan/tilt controller causing camera movement in the selected direction. The field 927 of display 131 displays the conference room and touching any of the 8 arrows causes the selected camera to pan and/or tilt in the appropriate direction. To terminate the movement, any part of the element 927 is touched.

Touching the go element 904 changes the display to menu C3. Touching the back element 903 displays the previously displayed menu. The cancel element 905 or any other touch element can be used to terminate camera motion. It will also clear any error message or a red 904 field. Touching element 906 does not effect any pending touches but it will clear the red 904 field and/or an error message, and cause the display of an appropriate help menu.

Conference termination is effected via menu C6, which is illustrated in FIG. 9F. As shown in FIG. 9F, there are only 3 touch sensitive regions in the menu, 903-905. Touching element 903 displays the previously displayed menu. Touching area 905 can be used to reset an error message. Touching area 904 terminates the conference and re-displays menu C1. As described in the explanatory portion of the menu, the telephone connections previously made must also be broken. While this technique was used in an embodiment of the invention that has actually been constructed, there is no physical reason why touching the element 904 could not be used to formulate a message from the computer 133 to itself terminate the previously made connections to the wide band digital link by providing a port from the computer 133 appropriately connected.

While there are a plurality of help menus which can also be displayed, those menus contain only 2 touch sensitive areas corresponding to areas 903 and 905 of FIG. 9I, i.e. back and cancel. The effect of touching these elements is as already explained in respect to other menus, i.e. touching the back element causes a display of the previously displayed menu, touching the cancel element cancels the display of any error message.

SOFTWARE

The software to accomplish the foregoing functions can be defined as a message passing software system in which knowledge is isolated within discrete units. The software includes:

1. Initialization and termination software,
2. Data structures that are used by the following three classes of software,
3. An executive which performs traffic management functions. Along with a dispatcher it includes various system services,
4. A set of device handler tasks (DHT) which handle hardware device interrupts; those devices can be input-only, output-only or input and output,
5. A set of application tasks (APT) which arbitrate commands, both between APT's and between an APT and a DHT. Knowledge of device control message formats exists within the APT's,
6. A set of general utility sub-routines which perform functions such as ACSII to binary, conversion, etc.

Figure 12:
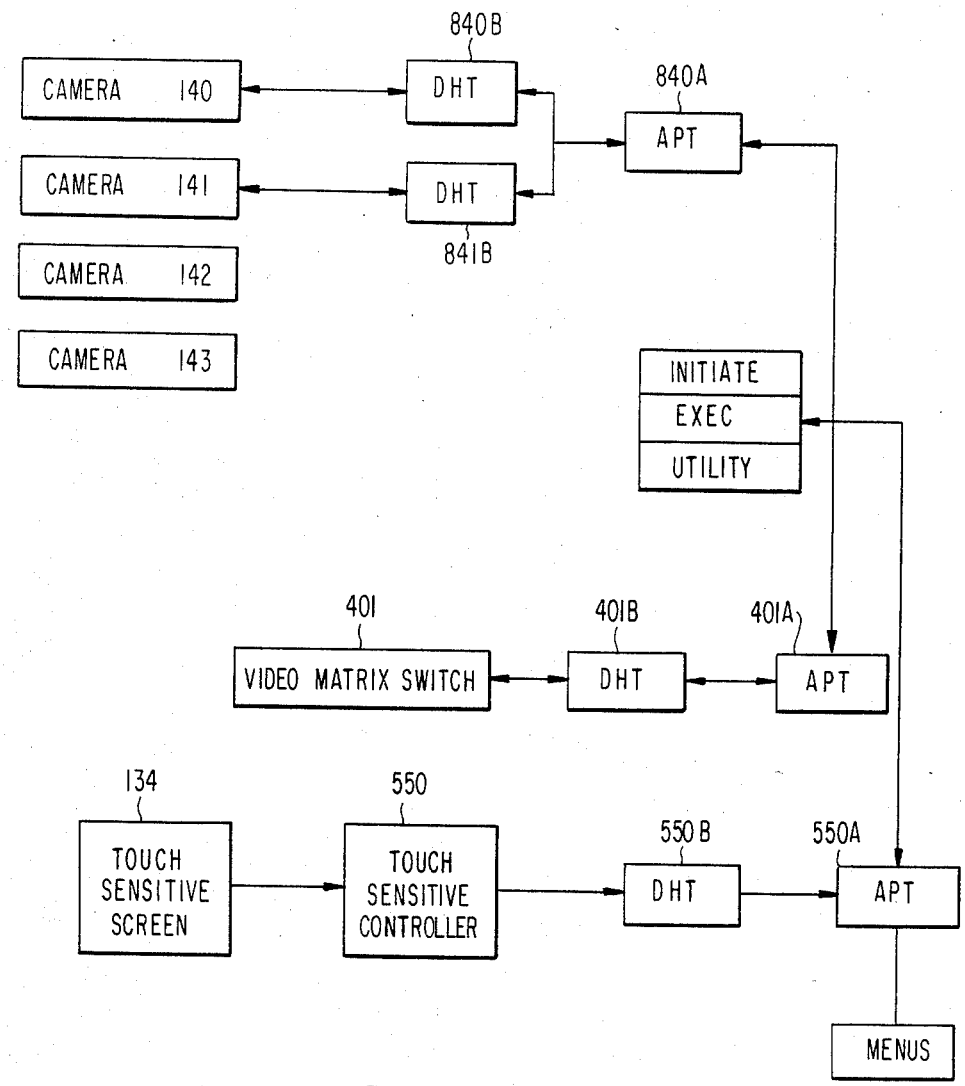
FIG. 12 shows the intialization module, an executive module and the interface between the hardware component.

FIG. 12 is a functional representation showing the interface between several of the hardware components and the software. The hardware components include the cameras 140 and 141, the left and right side cameras. In addition, the front camera 142 and the slide camera 143 is also depicted. However, since these cameras are fixed, the software interacts with the switch 401, only, relative to these cameras. Other hardware which is interfaced to the software is the video matrix switch 401. Finally, touch sensitive screen 134 communicates with the touch sensitive controller 550. Each of these devices has a dedicated device handler task. In many cases, the device handler tasks are essentially common procedures, however they are personalized for the particular devices with which they interact. Some device handler tasks are arranged for only receiving messages, for example the device handler task 550B associated with the touch sensitive controller 550 cooperates for information flow only from the touch sensitive controller 550 through the device handler task 550B to other software. On the other hand, other of the device handler tasks such as those associated with the left and right side cameras 140 and 141 as well as with the video matrix switch 401 cooperate in bidirectional communication in that they both receive information from the associated hardware devices and transmit messages thereto.

At a higher level of software is the application program task. Different application program tasks are arranged to provide for different functions. For example, a single application program task handles camera control, another application program task handles the video matrix switch and a third application program task handles the touch sensitive screen and menu display as well as interpretation of commands.

FIG. 12 also shows the initialization module, an executive module and a plurality of utility procedures.

1. Initialization and Termination

This software is responsible for configuring the software system to represent the actual conference room on system initialization, and for setting the software to room standards before each conference. This function requires several global data structures to represent the system and room configuration. However, inasmuch as the function and the data supporting it are used only for initiation, and do not take part (except in the sense that they define the conference room data) in conference leader manipulations, these functions and data structures will not be described in detail.

3. Executive

The executive is a set of control data structures, the dispatcher and those system procedures which operate on the control data structures.

The control data structures are used for purposes of task execution control, mapped memory addressing and dynamic storage allocation. They contain information such as device-specific parameters, task-specific status, etc.

The dispatcher is capable of both priority and round-robin task dispatching, with any one task being designated as being in one of the two modes. While the dispatcher searches for the next task to activate, interrupts are enabled.

The system procedures (services) consist of a set of functions that may be classified under several categories; some of the services are structured so that they should only be called from either the executive or an APT or a DHT. All services are executed with interrupts disabled.

All executive routines exist in unmapped memory and include:

A. Task dispatching—Tasks are defined as either application program tasks (APT) or device handler tasks (DHT). Since DHT's are activated directly by APT's, the task dispatcher need not activate any DHT's. In addition:

a. A DHT is given control only when necessary, i.e. an inactive DHT (one not engaged in processing) is activated when it needs notification that work is available for it.

b. An APT is dispatched in turn, according to its priority when there is work for it to do.

c. An APT can not be preempted by another APT.

d. All DHT's are higher priority than the highest priority APT.

e. DHT's transmit messages only to APT's.

When the task dispatcher is entered, it searches for an APT that has work to do and is eligible for dispatching. Since the task dispatcher is entered, by definition, when no APT is executing, the routine is not initiated by a data input. The dispatcher is entered instead as a result of the completion of processing by the last dispatched task. The dispatcher initiates a search through a task control table for the highest priority task eligible to be dispatched. If a priority ordered task is found to be eligible, it is dispatched. Otherwise, a search of round-robin tasks is initiated beginning with the task control table entry following that for the last dispatched round-robin task. The first entry encountered which reflects an eligible task causes that task to be dispatched. The search continues until interrupts/inputs to the system leading to messages to be processed by APT's cause an APT to become eligible for dispatching. In order to dispatch an APT, the dispatcher must transfer the message to the APT. If this is an initial activation, the message is found in the task input queue. If this is a reactivation, reactivation automatically returns the message. The dispatcher also maps the APT so that it is addressable. The dispatcher then executes a context switch using workspace pointer and either the entry point or the suspension address contained in the task control table entry.

The eligibility of a task for dispatching is based on both its input queue and its suspension state. Information on the suspension of a task is maintained within the task control table. A task may be suspended with either a time delay or an action delay. Another table, the action table is utilized to update the task control table whenever an action is complete. The dispatcher writes to the task control table and action control table, and initiates operation of the dispatched APT.

B. Buffer management operates on the use of a single fixed buffer size. Services are available for the dynamic allocation and release of buffers. Buffers are maintained for system usage in a buffer pool. Multiple small buffers may be linked together to form a larger structure.

C. Intertask communication—These services allow one task to communicate with another and provide for the activation of tasks which receive messages from other tasks. These services assume the existence of a dynamic storage allocation scheme.

A subset of these services (in cooperation with the dispatcher processing) allow for the transmission of a communication and either delaying the transmitting task for a time interval or until some specific action has occurred. Such a delay is accomplished via a table of predefined actions and the setting and resetting of these actions as used or unused. A common message format is used throughout the system. Since the buffer management scheme supports just one buffer size, this buffer accommodates any message or is capable of linking multiple buffers together and handling this as one unit.

D. Mapped memory management—There is a requirement to use mapped storage for different types of programs and data (with system services to provide addressability to any such storage):
 a. APT's including the "main" program, its application-unique subroutines and its local data constants/values,
 b. Large data structures, each of which is of interest to a subset of the application program tasks.

4. Device Handler Tasks

A DHT is that software which handles actual hardware interrupts. It is capable of initializing a specific device, starting output to the device, and handling both input and output interrupts. Although each device has its "own" DHT, the uniqueness of the DHT resides in the device-specific data associated with a DHT, and not in the actual procedural software which may be common to many DHT's. During a particular DHT's execution, interrupts of equal and lower level are disabled.

5. Application Program Tasks

An APT is defined to include the main application program, any application-unique subroutines and all local data variables/constants required. All APT's exist in mapped memory. The dispatcher must be able to determine where in mapped memory the APT resides in order to provide APT addressability. Each APT will be dispatched with its workspace pointer pointing to its own workspace. Upon completion of a particular dispatch, an APT simply transfers directly to the task dispatcher. Any protocol that must be implemented for a specific device is implemented within one APT that has responsibility for the communication with the DHT controlling the device.

6. Utility Subroutines

These are defined to be any procedures invoked by more than one APT. Included are conversion routines and other general utilities, i.e. graphics handling for menu drawing and text handling for displaying error messages. All utility procedures exist in unmapped memory.

The data structures (3) employed by the various processes are described below.

TOUCH-SENSITIVE PANEL INTERFACE

The software interface to the touch-sensitive controller 550 uses the RS232 protocol. All characters in the command are 8-bit ASCII. The message formats (defined below) employ only 3 fields, one field for each of the touch point coordinates (X and Y) and a further field as a message terminator (CR). In the embodiment actually constructed, an input from the touch sensitive controller 550 used 11 bytes, 4 for each coordinate parameter, 1 for a message terminator and 2 blank separator bytes.

VIDEO MATRIX SWITCH INTERFACE AND APT

The interface to the video matrix switch 401 is RS232 half duplex. The message formats (defined below) use an SRC field (to define the source device), a DES field (to define the destination device), an OUT field (to define the output number), a VID field (to define the input video number), an AUD field (to define the audio input number), a V & A field (to define the video and audio number) and finally a final field which is always zero. The signals to the switch 401 can be either single commands or blocks or multiple commands, or salvos, which are merely stored until all are received and then executed simultaneously. A salvo would be used for a bridge with more than one sink since a block has provisions for one source and one sink, only. The salvo NOP is a command that can be used to maintain the switch 401 in a salvo mode (receive but do not execute) without actually sending a real command. Salvo full indicates the switch 401 has filled its salvo storage space. The DES field (output number) defines the output port of switch 401; the SRC and AUD fields designate the video and audio input ports of switch 401, respectively. The audio output port need not be designated. Since there is only one (to the audio codec), it is implied. An input from the video matrix switch 401 may be from 1 to 7 bytes in length. The 1-byte messages allow for reset, request block, busy indication, salvo full, a negative acknowledgement, positive acknowledgement, and a tilt input. A 5-byte message indicates continuation and identifies, in its VID and AUD fields, a video and audio number. Finally, a 7-byte message is an automatic status report including in addition to message identifier (1 byte) and the VID and AUD fields, an OUT field indicating an output number. The microprocessor 133 messages to the video matrix switch 401 can be up to 7 bytes in length. The 1-byte messages allow for reset, start sequence, cancel, execute, salvo NOP, negative acknowledgement and positive acknowledgement. A 7-byte message allows an audio-video split. This message includes a 1-byte message identifier, and OUT, VID and AUD fields. Another 7-byte message is a salvo block which includes an identifier, a DES field and an SRC field with 4 required 0 byte fields. A 5-byte message allows for audio to follow video, including a message identifier, an OUT and V & A fields. Another 5-byte message is a video-only including a 1-byte message identifier, and an OUT and VID fields. The last 5-byte message is an audio-only message including a 1-byte message identifier, OUT and AUD fields. A 3-byte message allows for a status request including a 1-byte message identifier and an OUT field.

The video matrix switch APT 401A controls the video matrix switch 401 according to the functions selected by the operator. This application task is supported by a source table and a sink table which represent the configuration of the matrix switch 401 at any time. Messages to APT 401A are sent by the touch sensitive panel APT 550A and the video matrix switch DHT 401B. The input/output DHT message format is defined above. The messages received from the APT 401A are logical commands which identify the devices which must be connected to perform the function requested by the operator. These commands take on two formats. A first format corresponds to an audio command which includes a command identifier (to differentiate audio and video commands) and either a connect or disconnect identifier. The video command may have a plurality of components, one component is an identifier (distinguishing audio from video commands) and a second required component is a source identification. In addition, there is at least one sink identifier (there may actually be multiple sink identifiers). Associated with each sink identifier is an indicator to designate whether or not the particular sink should be connected or disconnected.

At system initialization, APT 401A initializes the switch 401 and receives a reply indicating that the switch is initialized and able to accept commands. Once operating, the APT 401A accepts as an input all messages from the matrix switch and matrix switching commands from other software and validates its inputs. In the case of a message from other software, this APT formats the correct switch message to perform the command and outputs them to the switch 401.

VIDEO CAMERA CONTROLLER INTERFACE AND APT

The interface (DHT's 840B and 841B and APT 840A) to the video camera platform controller (including pan, tilt, zoom and focus) uses RS232; all characters are 7-bit ASCII, the last character of each command is a carriage return (CR). The first character of each command is the device address (which can be preset at each controller). A second character of each command is a message type identifier, and the last character is the CR. Various messages include 8 different fields defined as DA (device address), PAN (pan value), TILT (tilt value), ZOOM (zoom value), FOCUS (focus value), SP (slew pan—left, right or zero), ST (slew tilt—up, down or zero) and CR. The PAN, TILT, ZOOM and FOCUS coordinates are defined in radix 10 ASCII.

The interface will accept messages from the camera controllers up to 10 bytes in length. A 10-byte message defines current PAN and TILT coordinates, includes a 1-byte device address, a 1-byte message identifier, 4 bytes defining the PAN coordinate and 3 bytes defining the TILT coordinate. A 9-byte message defines current ZOOM and FOCUS coordinates including a 1-byte device address, a 1-byte message identifier, a 3-byte ZOOM coordinate, a 3-byte FOCUS coordinate. A 2-byte message from the controller includes a device address and a carriage return indicating execution of a reset. Reset indicates that the controller has lost power and regained power again.

The interface provides for messages to the controller up to 10 bytes in length. A message specifying PAN and TILT coordinates is 10 bytes long, 1 byte for a device address, 1 byte for a message identifier, 4 bytes for PAN coordinate and 3 bytes for TILT coordinate. 6-byte messages are provided for ZOOM or FOCUS coordinate settings. Each includes a 1-byte device address, 3 bytes defining the ZOOM or FOCUS coordinate, a 1-byte message identifier. A 5-byte message is provided for starting or stopping of a PAN or TILT slew. One byte is the device address, one byte is a message identifier, one byte is provided for identifying the message as starting or stopping a PAN, and starting or stopping a TILT. Finally 3-byte messages are provided for requesting PAN and TILT coordinates or ZOOM and FOCUS coordinates. Each of the 3-byte messages include a device address, and a byte to indicate whether PAN and TILT coordinates are requested or ZOOM and FOCUS coordinates are requested.

The APT 840A provides the actions necessary to position the cameras (in all of PAN, TILT, ZOOM and FOCUS) to either preset or user specified positions; the preset positions include two optional, user defined presets per camera. This APT 840A is supported by a camera position table (defining current PAN, TILT, ZOOM and FOCUS conditions), and a camera preset table (defining for each of the presets, all of PAN, TILT, ZOOM and FOCUS conditions) for each of the cameras 140, 141. Messages to APT 840A are sent by the touch sensitive panel APT 550A and the video camera DHT 840B or 841B. The messages received from the DHT are identified above. The messages received from the touch sensitive APT 550A are described below.

The messages from the touch sensitive panel APT 550A include identifier, function code and message content portions. However, the video camera controller APT 840A accepts only a limited set of such messages. Those messages are either initiate slew, do ZOOM, do FOCUS, go to preset position, set preset position, analyze ZOOM FOCUS return, analyze PAN TILT return or do a reset response.

In connection with initiating a slew, the message identifies the specific camera, a function code for a slew initiate function, and either or both of a PAN slew and TILT slew. In the course of processing, current slew values are obtained and replaced with values given in the command, these command values are then saved. The associated DHT message is effected to do a slew.

As will be described below, when a "do slew" message is received at a camera controller, it initiates a slew (either in PAN, TILT, or both) and motion continues until the message is removed. As will be described, the message is removed by retouching a touch sensitive area. Accordingly, an initiate slew message will initiate the appropriate motion which will not be terminated until the message is removed. When a slew command terminates, pan and tilt slewing is sent; it is followed by a request for position (to determine where the camera has stopped). The reply values are used to update position tables.

The "do ZOOM" also has four components, two identify the specific camera and the particular command. A third component is the step size of the ZOOM (either large or small), and the fourth component is the direction (either in or out). In the course of processing, the change in ZOOM desired is calculated. Based on the current ZOOM value in the camera position table and the command (in or out with large or small step), a new ZOOM position is calculated, and then checked to guarantee it is valid. Assuming it is, the associated DHT message is performed requesting the ZOOM step for the specified camera of the calculated value.

The FOCUS command is essentially identical to the ZOOM command except that of course the function code identifies a FOCUS step rather than a ZOOM step.

The go to preset position command includes three components: a camera identifier, a function code identifying the command, and the parameters identifying the preset position. In the course of the processing, the preset PAN and TILT values for the particular preset are obtained and a DHT message is output transmitting those parameters. In a separate operation, a preset ZOOM value is obtained and an associated DHT message is output. Finally, a preset FOCUS value is obtained and the DHT message transmits that information to the camera controller. Of course, the preset position parameters are obtained from the camera preset table.

The set preset position message includes three similar components, i.e. camera identification, command identification and preset value. However, in the course of processing, the only output is to write to the camera preset table (i.e. no command is actually transmitted to the camera controller).

The analyze ZOOM/FOCUS return is initiated in response to a message passed by the associated DHT. This a four-component message including device identification, a function code (identifying the command as an analyze ZOOM/FOCUS), a ZOOM parameter and a FOCUS parameter. In the course of processing, these ZOOM and FOCUS values are written to the camera position table.

Similar action occurs in response to the analyze PAN/TILT return except that of course the PAN/TILT values are written to the current position table.

In response to a reset message passed by the associated DHT, the APT 840A initiates the associated DHT to get the PAN/TILT and ZOOM/FOCUS values from the camera controller.

MENU MANAGEMENT

The most significant APT in connection with the control subsystem is the menu request handler which is the principle means of communication between the operator and the remaining apparatus. When the operator or conference leader touches the touch sensitive screen 134 at the location of an element displayed on the console video display 131, the touch sensitive screen 134 and controller 550 generates a message giving coordinates of the touched point. The menu request handler 550A receives this information and must interpret it with respect to:

the element currently being displayed at or near the touch point, the status of the particular element touched, other touches made before or after this particular touch.

Ultimately, the touch or touch sequence results in one or more system function routines being invoked to satisfy the request. The touch may result in a status change for the particular element and may even cause a new menu to be displayed in which case the context for interpretation of subsequent touches is changed. Touch sequences for a particular menu are specified according to a logical "grammar" which defines valid relationships between the various classes of elements on a menu (the syntax), and the interpretations or actions to take as a result of a grammatically correct sentence (the semantics). Since the element relationships may vary from menu to menu, each menu may have its own associated grammar.

In order to implement the menu request handler, a plurality of data structures are used including:

1. A menu dictionary (MDT) which contains fixed length entries defining the general characteristics of each menu, general menu status information, grammar definition, image control block, and the address of the menu control table defining the individual elements of the menu.

2. The menu control table (MCT) which contains an entry for each element on the menu. This entry includes position, status flags, syntactic class of the element (used in determining valid touch sequences), colors associated with various status conditions, the address of the display element library entry containing the command string used to draw the element and text information, and the address of system function routines to be executed when the element is touched (immediate) or used as part of a sentence (delayed).

3. A display element library (DEL) which contains command strings used to draw elements, as well as information for sub-elements such as border and body.

4. A text library (TEL) which contains text associated with various elements.

5. Entity status (EST) table containing information about entities in the system (such as the various devices, etc.) whose status transcends the menu elements which are currently displayed. Elements on several menus may refer to the same entity.

6. Element stack which is the primary control mechanism within the menu request handler. As elements are touched, they are placed on the top of the element stack. Procedures associated with the top element on the stack cause elements to be removed, added or in the case of the lexical scan procedure, completely redefined. Upon completion of each procedure, the top of the stack is checked and any procedure which is required is executed. This procedure continues until the element stack is empty or the top element is not executable, i.e. it is a sentence element or a delayed element.

The foregoing data structures enable the microprocessor 133 to draw the first menu on system initialization. Depending on operator touches then, and based on the menu actually displayed, the system can interpret the operator touches to change the status of the menu being displayed by changing the display of one or more elements under the menu, changing the menu being displayed entirely, and/or determining and formatting messages to appropriately connected devices to change the condition of the device. For example, cameras can be turned on or off, zoom, focus, pan/tilt (this can be altered), the video matrix switch 401 can be altered so that an image from any one of the cameras can be transmitted, a received image can be directed to any one of the displays and the audio system can be enabled/disabled.

MENU ASSOCIATED SOFTWARE

The software which allows the conference leader to interface with the system, to produce the appropriate menus on the control console 130, respond to conference leader touches and properly interpret those commands to ensure compliance with grammar to effect the desired control actions including redrawing menus includes seven functional areas, specifically:
1. Initialization;
2. Touch interpreter;
3. Menu management;
4. Message management;
5. Support routines;
6. Action routines;
7. Menu Tables.

These functional areas will be described, however a general narrative is provided to link the various functional areas.

During initialization or start-up, the menu tables are set to their default values and the first menu is drawn. The software then goes to into an inactive state waiting for a touch to be received from the touch sensitive controller 550. Once a touch is received, it is converted into x-y menu coordinates and sent to the touch interpreter. This module (2) determines which menu element, if any, was touched. It completes its task by placing the touched element on an element stack (a buffer area reserved for this function) and setting its immediate action flag.

Next the element stack is processed. This processing function is described below.

After the element stack is processed, the software then returns to an inactive state waiting for the next touch.

The element stack processing performs the following functions:
1. If the element stack is empty, then go to line 5.
2. Get the element on the top of the element stack.
3. If the element immediate action flag is set, then call the appropriate immediate action routine; go to line 1.
4. If the element delayed action flag is set, then call the appropriate delayed action routine; go to line 1.
5. If the pending menu flag is set, then draw a new menu.
6. Exit.

Figure 10:
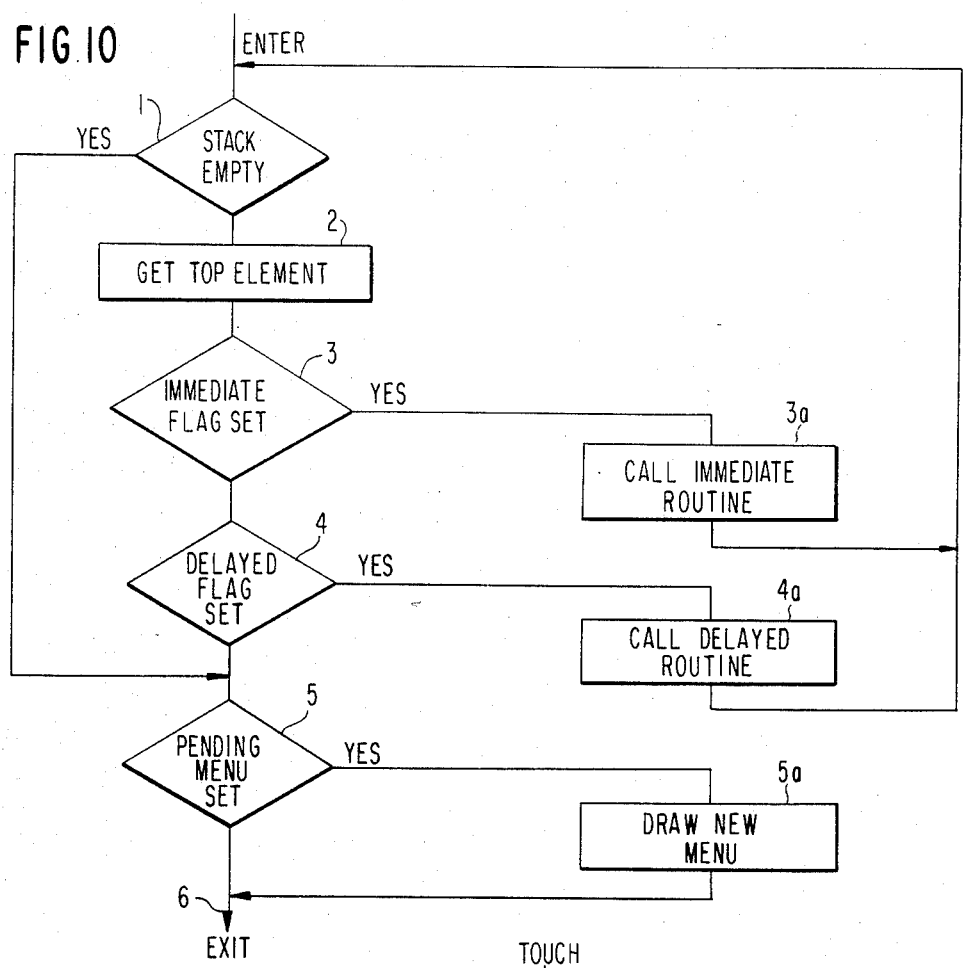
FIGS. 10 and 11 are flow diagrams of commonly used procedures.

FIG. 10 shows this processing in typical flow chart form wherein each block of the flow chart has a reference character corresponding to the appropriate line numbers 1–6. The particular routines called at functions 3a and 4a depend on the particular element placed on the stack as well as the current menu on the screen. Likewise, the particularly new menu drawn at function 5a depends on the conditions under which the pending menu flag was set, i.e. the particular menu on the screen and the circumstances under which that flag was set.

1. Initialization

This function is performed each time the first menu (i.e. the menu shown in FIG. 9A) is drawn. During this initialization, all menu tables (defined below) are reset to their default values, all active equipment is disconnected and all counters are reset. The initialization function is handled by the following procedures:
INTMHR
MINIT
SINIT

2. Touch Interpreter

All screen touches are sent to the touch interpreter module. The touches are converted to the touched element number. The touch controller 550 provides to the software the X and Y coordinates of the touch. By comparing the touch coordinates with the particular menu on the screen, the software can determine whether or not a particular element on the menu has been touched. If the touch location did not correspond to any element, the touch is ignored. If the touch corresponds to an element, but that element for some reason is considered insensitive, the touch is also ignored. Under other circumstances, the particular touched element identification is placed on the element stack. During this process, the element stack is scanned and all active action routines are called in the proper order. The touch interpreter module employs the following procedures:
CCTSPI
FINDEL

3. Menu Management

All functions concerning the drawing of the menus, changing of the individual menu element appearances (color of body and border, etc.) fall into the menu management module. The procedures employed by this module are:
DRMENU
GDELAD
LHERE
RDMENU
DREL
DELEM
CBORD
CBODY
CTEXT
ZAPOUT

4. Message Management

As described above, the software is compartmentalized and information is passed from one modular procedure to another via messages. Accordingly, one component of the software handles message management. In addition, the message management module contains a library of all messages which is displayable on the conference leader's CRT 131. This module consists of the following procedures:
GRMST
ERRDSP
ERRERS
GMSGAD
MSGDSP

5. Support Routines

The support routines are or can be used by any procedure within the software system. Generally, the criteria used for a procedure's inclusion as a support routine is that it is used by two or more procedures within different modules. The following procedures are included as support routines:

| | |
|---|---|
| SLCTME | COMPRS |
| PREVUE | GMADDR |
| STDFLT | MNEXT |
| FINDIT | TOUCH |
| EXECIT | ESTADD |
| BACK | MHRMAP |
| HELP | GACTAD |
| SRTES | GMCTAD |
| LEXSCN | GTELAD |
| RESET | CHELEM |
| ZAPCAM | REFSTK |
| LSENDS | |

6. Action Routines

The system action routines implement all of the functions provided by the menus. Each touchable menu element has associated with it an immediate action routine (to be executed immediately upon its being touched) and it may also have a delayed action routine. The delayed action routine will be executed only if its delayed action flag is set. This flag may be set by immediate action routines or by other delayed action routines. The following procedures are included in the action routine module:

IAR001–IAR008
IAR010
IAR011
IAR013–IAR028
I19A00
RSTPST
DAR001–DAR004

7. Menu Tables

The menu tables are part of the data structure with which the procedures listed above are run. The menu tables are used to describe menus (content and format), maintain current status of all menu elements and maintain status of all teleconference equipment. The menu tables are:

MDT
MCT
CIT
EST
DEL
TEL

Before describing the procedures in detail, the format and content of the six tables referred to above will first be described.

MENU DICTIONARY TABLE (MDT)

The Menu Dictionary Table contains one entry for each menu. Each element within an MDT entry is explained in the following paragraphs.

| Field | Description |
|---|---|
| MDID | Menu number. MDID contains the identification number of the menu. |
| MDPM | Previous menu number. MDPM is used to maintain a link backward to the previous menu drawn. |
| MDNM | Next menu number. This field contains the menu number (MDID) of the menu which will normally be drawn after this menu. In other words, it is the forward menu link. |
| MDNMM | Next menu modified. This field is used by the system when it needs to alter the normal menu sequence. |
| MDICB | Menu location. MDICB is not currently used by the system actually constructed but may contain a flag indicating the current location of the menu. |
| MDNEL | Number of menu elements. Field MDNEL contains the number of menu control table elements required to describe this menu. |
| MDRFFU | Menu flags. This field is not currently used by the system actually constructed. |
| MDHELP | Help menu number. MDHELP contains the menu ID (MDID) of the general help menu associated with this menu. Menu number MDHELP will be drawn when the menu help key is touched. |
| MDMCT | Menu MCT address. Field MDMCT contains the address of the first menu control table element for this menu. |

MENU CONTROL TABLE (MCT)

The Menu Control Table contains a set of elements for each menu defined in the Menu Dictionary Table. Each MCT element defines some portion of the menu to which it is assigned. Each element within an MCT entry is explained below.

| Field | Description |
|---|---|
| MCID | MCT element ID number. This field contains the element ID. |
| MCCST | Current status. MCCST is used to maintain and track the current physical attributes of the element. Each bit in MCCST corresponds to an attribute. Attributes are border, body, insensitive, inhibit and text. Each can be on or off. |
| MCNST | Next status. The system uses this field to set the next (pending) status of the element, each attribute has a bit. By comparing this field to the current status field the system knows which attributes have changed. |
| MCDST | Default status. This field contains the default (initial) status of the element. The attributes contained in the default status govern how the element will be initially drawn and treated by the system. The bits within the status byte are set or reset according to which attributes are on or off. |
| MCSC | Syntactic class. Field MCSC contains the class of the element. This field is used to determine the syntactic correctness of a string of touched elements. |
| MCDEL | Del ID number. This field contains the ID number which corresponds to the shape of this element. MCDEL is used as an entry to table DEL (Display Element Library). A brief review of FIG. 9C indicates a variety of shapes of elements which can be drawn. |
| MCRFFU | This field is not currently used by the system actually constructed and is reserved for future use. |
| MCEID | Entity ID. This field contains a number which the system uses to access this elements entity record. Generally only touchable elements have non-zero MCEID fields. |
| MCIACT | Immediate action routine. Field MCIACT contains the number of the immediate action routine to be executed immediately after this element has been touched. |
| MCDACT | Delayed action routine. Field MCDACT contains the number of the delayed action routine to be executed for this element when its delayed action flag is set. |
| MCCON | On color. MCCON contains the color which will be used to fill the element when it is on. If this field is set to black, then the color in the |

| Field | Description |
|---|---|
| | element entity record will be used as the on color. |
| MCCOFF | Off color. MCCOFF contains the color which will be used to fill the element when it is off. |
| MCCUR | Current color. This field always contains the current color of the element. |
| MCCTXT | Text color. This field contains the color in which the element's text will be drawn. |
| MCHELP | Help menu number. Field MCHELP contains the menu ID (MDID) of the menu (if any) which will provide additional information on the use or functioning of this element. |
| MCTSZE | Text size. This field governs the size of the element's textual characters. Three sizes are allowed, normal, twice normal and three times normal. |
| MCXHR | X coordinate. Field MCXHR will be the X coordinate of the upper left corner of the region in which the menu element will be drawn. |
| MCYHR | Y coordinate. Field MCYHR will be the Y coordinate of the upper left corner of the region in which the menu element will be drawn. |
| MCTEX | Text ID number. This field contains the Text Library's index of the text string for this element. |

ENTITY STATUS TABLE

The Entity Status Table (EST) maintains additional information on important menu elements. Criteria for inclusion of an element into the EST is varied. Any item (such as the mike key 907) whose status must be known across several menus should be represented by an entity. Any element which represents something physical and is capable of action should also have an entity entry. Actually, any element can be represented in this table is the user has some reason for it. This table also contains sufficient information so that conflicting touches can be recognized and corrected. Entity record elements are described below.

| Field | Description |
|---|---|
| ESID | Entity ID. This field contains a number to identify the entity. This is the number which links these records to the menu control table. |
| ESTYPE | Entity type. Field ESTYPE contains as assigned type value for this field. It is primarily used to differentiate control entities from controlled entities. |
| ESCB | Entity controlled by. ESCP is used by the system to link controller entities (a camera) to the controlled entities (a monitor). |
| ESCOLR | Active color. This field is used to assign an on color to controller entities. Entities which are controlled will assume different ESCOLRS as they are controlled by different controllers. |
| ESFON | On flag. This field contains a 1 when the entity is active (on) and a zero when it is off. |
| ESFPRE | Field ESFPRE contains a 1 when the entity is present and a zero when it is not present. When ESFPRE is off (contains a zero) the entity will not be drawn on the menu. |
| ESOFD | On flag default. This field contains the default value for the ESFON field. |
| ESPFD | Present flag default. This field contains the default value for the ESFPRE field. |
| ESFLD 1 ESFLD 2 ESFLD 3 | Entity specific values. These fields are used to maintain information specific to the entity. The user may store any values in these fields needed by the action routines to make their functions simpler. |
| ESINIT | Initialization value. This field is set from the Conference Initialization Table and is used to pre-configure the master menu (conference room). |
| ESCONF | Entity conflict word. Each controlling entity has a unique power of two conflict value. Controlled entities have conflict values equal to the sum of conflict values of their possible controllers. |

DISPLAY ELEMENT LIBRARY

The Display Element Library (DEL) contains the definition of all element shapes used in the menus. Since each DEL entry is variable in length, an element index is also maintained in the DEL. The items within each DEL entry are described below.

| Field | Description |
|---|---|
| DEXTOL | X tolerance. This value determines the X-axis extent of the touch sensitive zone surrounding an element. The touch zone is rectangular in shape and has DEXTOL points in the X direction. |
| DEYTOL | Y tolerance. This value determines the Y-axis extent of the touch sensitive zone surrounding an element. The touch zone is rectangular in shape and has DEYTOL points in the Y direction. |
| DENSE | Number of sub-elements. Each element may consist of several sub-elements. A sub-element may be a border, body or another type. This field contains the number of such sub-elements. |
| DERFFU | This field is not currently used by the system actually constructed and is reserved for future use. |
| DECLAS | Sub-element class. This field contains the sub-element class. A border is class one, a body is class two and if neither a border or body the class is set to three. |
| DEXFIL DEYFIL | X-fill, Y-fill. The point (DEXFIL, DEYFIL) is the coordinate where filling (coloring) of the element begins. These coordinates are based on the element origin being the MCT values (MCXHR, MCYHR). |
| DEXTXT DEXTYT | X text coordinate, Y text coordinate. The point (DEXTXT, DEYTXT) is the point around which the text of the element is centered horizontally. |
| DEGS | The final DEL record entry is the graphic string which describes the element's shape. |

TEXT ELEMENT LIBRARY

The Text Element Library (TEL) contains an index table (TEX) which has pointers to each text element within the table. Each text element consists of three parts which are described below.

Text Length

This field contains the length (in bytes) of the text string.

Text String

This field contains the string of text to be drawn. A pound sign imbedded within the text will cause a line feed/carriage return, thus causing the next character to be under the first character of the string. Text strings in the embodiment actually constructed must not exceed 512 characters in length.

Text String Terminator

This field must contain the command string terminator character.

CONFERENCE INITIALIZATION TABLE

The Conference Initialization Table (CIT) contains information which is specific to each teleconference installation. This information consists of camera presets (both location and number), master menu equipment defaults and a corporate logo. The fields within the CIT are described below.

Camera Presets

The first section of CIT data concerns the cameras and their presets. For each camera there is one data word containing the number of presets for this camera. After this data word follows three data words for each preset assigned to this camera. The first two words contains the menu coordinates for the preset and the third word contains the color of the background on which the preset will be drawn. After each set of presets, the next camera record appears.

Master Menu Defaults

The next set of CIT data contains the master menu default commands. These commands are entered as a string of entity ID's in the same format as if you were touching the elements.

Corporate Identification (LOGO)

Following the master menu default commands may be one DEL-like entry defining an element to be drawn on the first menu. This entry has a structure identical to any display element library entry. It is used to personalize the menu of FIG. 9A by producing user identification in the blank region.

TOUCH INTERPRETER

Figure 11:
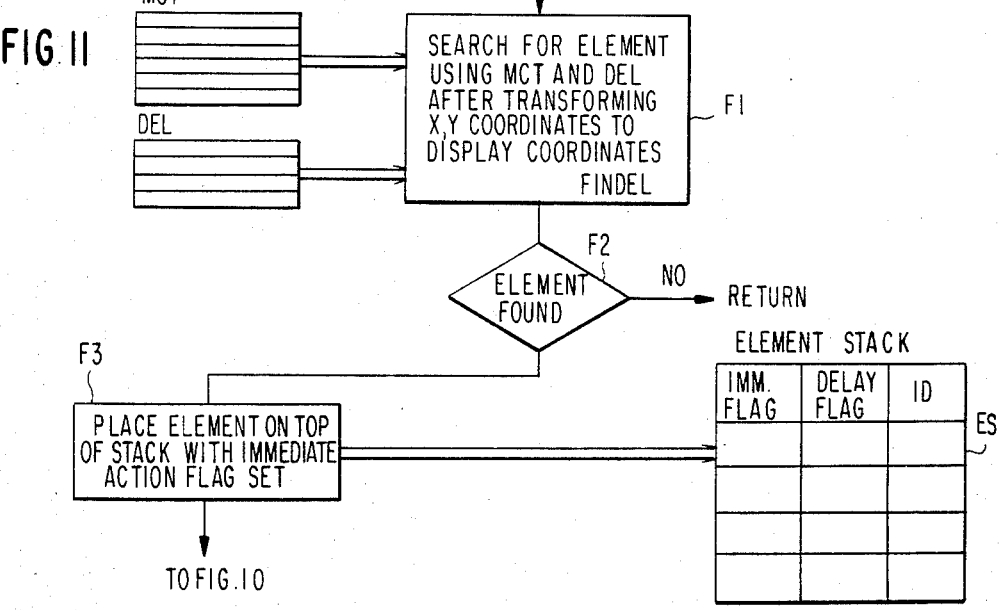

Having discussed the data structures, reference is now made to FIG. 11 which shows the system response to a touch of the touch sensitive screen. Function F1, in response to a touch, first transforms the touch coordinates (X, Y) to display coordinates and then searches for the element touched using MCT and DEL. This function is performed by a process FINDEL. By reference to the MCT and DEL, the system can determine if an element on the menu was touched by comparing the element's display coordinates (and tolerance) with the display coordinates of the touch. The data tables also determine whether the element is sensitive or insensitive to a touch. At the completion of the processing, function F2 determines if the element touched was found (the system assumes that an insensitive element was not found). Accordingly, if no touched element was found, the system returns, i.e. no response is made to the touch. On the other hand, if at function F2 it is determined that a sensitive touched element has been located, then function F3 places the element on top of an element stack ES and sets the immediate action flag. As shown in FIG. 11, the element stack may include a number of entries, each succeeding entry is placed on the top of the stack, and certain of the processes as described below will pop the stack (i.e. delete the top entry, and move every other entry up one location). Each entry in the element stack includes three important components, first the element ID and two flags, a delayed action flag and an immediate action flag. As is described in function F3, when an element is placed on the stack, its immediate action flag is set.

That terminates the processing shown in FIG. 11 and the succeeding processing has already been explained in connection with FIG. 10.

To give a few brief examples to illustrate operation of the system, let us assume that the system is initialized, and the menu being displayed is the initial menu (shown in FIG. 9A). Let us also assume that at the time the menu is displayed the operator does not desire to review procedures and therefore proceeds to touch element 902 (NO). As a result of the processing shown in FIG. 11, when the element (902) is found, it is placed on the element stack with its immediate action flag set. In the course of the processing of FIG. 10, function 3 finds the immediate flag set and therefore function 3a calls the corresponding immediate routine. That immediate action routine (IAR002) sets the parameter PDMENU as the next or second menu and the element stack is reset. Thereafter, function 5 finds the pending menu set and thus function 5a calls the process draw new menu (DRMENU, the procedure CCTSPI sets parameter RQMENU to PDMENU and then calls DRMENU). Accordingly, as a result of that touch, the next menu (shown in FIG. 9B) is drawn. At that point, assuming that the appropriate connections are established, the operator can merely touch element 904. The FIG. 11 processing proceeds just as before except now the identification of element 904 is placed on the element stack with its immediate flag set. The processing of FIG. 10 produces a call to the appropriate immediate action routine (IAR004). This procedure first pops the stack, i.e. removes the element 904 from the element stack, then checks to see if there is a pending error message. If there is, procedure GRMST is run, on the other hand the procedure MNEXT is run to get the next menu number. The parameter PDMENU is set to the next menu number. In the course of processing of FIG. 10, function 5, seeing the pending menu set, calls DRMENU to draw the new menu, i.e. the master menu shown in FIG. 9C. FIG. 9C does not show the different colors of the different elements in the menu, nor does it illustrate the manner in which the defaults affect the menu. For example, assuming that the front camera (represented at the element 918) is selected under default to send, then the color of the camera represented at 918 and the color of the send element 911 are common. Similarly, if we assume that under a default condition, the received image will be located on the front display represented at 919, then the color of the receive element 909 and the color of the front display 919 will be identical.

At this point, let us assume that the operator desires, instead, to transmit the image from the left camera (represented in the menu at 914) and to locate the image that is being transmitted on the front screen represented at 919, and at the same time display the image being received on the side displays represented at 915, 916. The operator could proceed by first cancelling the default conditions and then establishing the conditions that are desired. However, that is not necessary. He can for example, touch elements 914, 919, 911 and 904. This will, as will be explained, turn on the camera represented at 914, place its image on the display represented at 919 (and cancel the image previously present there) and transmit that image (and impliedly cancel the transmission from the camera represented at 918). He can then, in addition, touch elements 915, 916 (selecting the side monitors), the element 909 (to indicate that the received image is to be displayed on the touched monitors) and then touch element 904 to implement the command.

Following our example, when the operator touches element 914, the processing shown in FIG. 11 will be performed to place a representation of element 914 on the element stack and set its immediate action flag.

Function 3a in FIG. 10 will call the appropriate immediate action routine. The immediate action routine associated with a camera is IAR011. This procedure performs a number of functions. Firstly, it runs the procedure SLCTME. SLCTME examines the element stack to see if the element on top, i.e. the most recently touched element, conflicts (a first touch mutually exclusive of a second, i.e. two sources) with any other element on the stack. If a conflict is found, then it is deleted.

After eliminating any conflicting touches (including a retouch of the same camera), the procedure ESTADD is run. This procedure obtains the entity status table address. Thereafter, the procedure TOUCH is run. The procedure provides for changing the border of an element to reflect its now-touched status. For example, if the element border had been on and it is touched, the element border is turned off, and vice versa. Following manipulation of the border display, the procedure COMPRS is run to eliminate duplicate touches. Then, the menu is redrawn to reflect the new status.

Accordingly, a single touch of the element 914 results in placing it on the element stack with its immediate flag set, and the immediate action routine provides for eliminating any prior conflicting touches on the stack and changing the menu to reflect the touched status of the element 914.

In our example, we further assume that the operator had also touched the send element 911. The processing of FIG. 11, in response to this touch, firstly puts the send element on the top of the element stack and sets its immediate action flag. The routine called in response to this touch checks for conflict and then reverses the color of the border.

Finally, the operator touches the go element 904. The immediate action routine for this element is IAR008. The first step in the procedure is to pop the stack, i.e. remove the representation of the go key 904, leaving the previous touches in the order in which they were touched. Assuming there are no error messages and the stack is not empty, then the procedure LEXSCN is run.

This procedure first runs COMPRS. This procedure is used to remove all double touches from the stack. Thereafter, the procedure SRTES is run. The procedure sorts the element stack by the syntactic class (field MCSC) of its elements. This is done so that the lowest syntactic class element will be on the top of the stack. This is required to ensure that sources are processed first.

After running SRTES the stack is examined. The first test effected is to check if the syntactic class of the top element is 2 and the number of elements in the stack is 1. If these conditions are true, an error is detected and a particular error message is selected and a procedure (GRMST) is run to display the error.

On the other hand, if the syntactic class of the element is not 0, then a procedure ESTADD is run to obtain the entity status table address. Once determined, the field ESCB is examined. Ordinarily, a source is a camera. However, a source can be a sink if the particular sink is presently controlled by a source. In that event, the controlling source becomes the (implied) source. Accordingly, if two sinks are identified without a source, an invalid command may be declared unless at least one of the sinks is presently controlled by a source. For this reason, the CB field of EST may be checked. Assuming the LEXSCN routine does not detect any errors, i.e. it verifies the syntactic correctness of the sentence that has been constructed, then the parameter LEXRC is returned at 0. This enables IAR008 to set the delay flag of the top element of the stack. With the delay flag set, then function 4a (FIG. 10) calls the appropriate delayed action routine.

The delayed action routine, to make a source-sink connection is DAR001.

The processing in DAR001 begins by running the procedure GMSGAD. This procedure gets the message address of a specified request block message; in this case a connect message. The processing then sets a parameter SOURCE to the top menu stack element. The prior running of SRTES and COMPRS assures that first there are no conflicting elements, and more particularly in this case, there is one and only one image source. If there had been more than one source which had not been eliminated as a double touch, then the running of LEXSCN would not have indicated that the element stack was appropriate. Finally, the running of SRTES sorts the stack such that the top element is the source. The processing sets the next display condition for the border of that element as off. As described above, when the element is pending the border is on, and when the connection desired by the operator is made the border turns off. It is the processing here which assures that the border will be off after the appropriate connections have been made.

Thereafter, the processing writes the entity status for the element its status as being on. The color of the particular element is selected and then the next element in the stack is processed, by popping the first element or source off the stack.

The processing thereafter ensures that the color of the next element on the stack matches the color of the source element and ensures that its entity status table reflects its condition as on. The next condition of the body is set to off.

Thereafter, if the source element touched was a camera, then the parameter PRESET is set true if a preset was also touched, and false if it was not touched. The processing then loops through to write in the entity status table the field ESTCB, ESTFON, ESTFPRE. The procedure ZAPOUT is run to erase the image of the preset in the display. This loop is repeated for each preset that had been displayed.

At the conclusion of the processing, the procedure LSENDS is run.

This latter procedure ensures that all active sources have at least one active destination. Alternatively, the procedure ensures that all active destinations have an active source. If either of these conditions is violated, the procedure turns off the equipment and then changes the menus so that it will reflect the current state of all equipment.

With the message parameters determined, SYSREQ directs it to be sent by the appropriate DHT.

Whenever the master menu (shown in FIG. 9C) is displayed and one of the movable cameras (represented at elements 914 or 913) is touched, the associated immediate action routine (IAR011) checks the number of presets available for the camera (found in FLD1 in the camera's entity status table). This information is written into the menu control table for the camera. Thereafter, each of the presets is displayed.

Once the presets are displayed, the operator can position the camera to any selected one of the presets by merely touching the associated preset. The immediate action routine implementing touching of a preset key is IAR014. This routine allows only one preset to be touched at a time, if a second preset is touched, then the first preset is turned off. When IAR014 is run, it sends a message to the camera control to go to the selected preset. This is effected prior to the time the operator touches the sentence terminator element 904 or go key.

If the desired video image is not available by pointing the camera to any one of the presets (and in an embodiment of the invention which has actually been constructed, 6 presets are considered defaults and are always available—for each camera) the operator can manually position the camera using the teleconferencing control system. This is effected by the menu shown in FIG. 9E. This menu is reached, from the main menu (shown in FIG. 9C) by touching the other touch element 903. This tests the parameter PDMENU to the "menu of menus", and the procedure reset RESET is run to eliminate all pending touches and the element stack is reset. When the routine is completed, the "menu of menus" is provided on the display; this is shown in FIG. 9D. With this menu displayed, the operator can proceed to the manual control menu by pressing touch element 922 invoking IAR005.

That action will provide on the display the camera positioning menu shown in FIG. 9E. With this menu, the operator can select either the left or the right camera by selecting touch element 932 or 933. Once a camera is selected, the operator can alter the zoom conditions with the touch elements 928–931, vary the focus parameters with the touch elements 936–939, move the camera in pan or tilt coordinates by selecting one of the arrows in the touch field 927. When the camera is properly positioned, the operator can either leave it there or store the position as one of two available presets by selecting either the touch element 934 or 935.

When either of these two latter touch elements is touched, it is of course placed on the stack and the immediate action routine executed is IAR019. In accordance with this proceeding, the display is first altered so that all the elements shown on the display are turned off. Thereafter, any camera motion in effect is terminated. Thereafter, the touched camera is turned on and the APT 840A is initialized. Thereafter, the selected camera is connected to the control terminal display (via immediate action routine IAR019A) so that the video image produced by the camera can be checked by the operator. Then the menu is redrawn to indicate which camera is on, i.e. one of the two camera element representations 932 or 933 is illuminated in the appropriate color to indicate the camera which has been selected.

If at this point in time the operator desires to alter the zoom parameter of the camera he has selected, he operates one of touch elements 928–931. The immediate action routine associated with one of these keys is IAR023. The first function here is to check that a camera has previously been selected. If a camera has been selected then a zoom message is constructed. To construct the zoom message, the camera's present zoom parameter is checked and then a table is entered depending on the particular zoom element touched to determine the desired zoom parameter by summing the present zoom parameter and the increment. When the desired zoom parameter is determined, the message is transmitted. Finally, the menu is redrawn so that the zoom key is on. After a predetermined period, the menu is redrawn so that the zoom key is off. This provides feedback to the operator to indicate that the selected zoom step has been effected.

The operational response to selection of a focus control is essential identical to that described above except that the immediate action routine employed is IAR024.

If the operator desires to alter the camera positioning in terms of pan/or tilt, one of the arrows shown in the field 927 is touched. This calls the immediate action routine IAR025.

The processing effected here first checks if a camera has been touched; absence of a preceding camera touch is in error condition which produces a display of an error message. Otherwise, the camera slew message format is obtained. Thereafter, the system determines if the camera is already in motion and this is a stop message. If that is the case, then the off value is put into the message and sent. On the other hand, if this is the first touch, i.e. the operator desires to initiate a pan/or tilt, then the slew message value is obtained depending on the touched key, and the message is transmitted. As described, the first touch will initiate pan/tilt movement which will continue until such time as a second touch is effected.

Once camera motion has been initiated, the operator can terminate that motion by selecting any touch element on the menu. For example, if the operator selects the go element 904, camera motion will also be terminated and the next menu will be displayed. The immediate action routine effecting this is IAR026.

From the foregoing, it should be apparent that the invention provides a teleconference control system which can be used by relatively unskilled operators. The processsor 133, its associated software and the touch sensitive controller 550 provide the system with a control flexibility which cannot be duplicated by any fixed control panel. More particularly, the operator is relieved of the burden of knowing the correct sequence in which an action must be implemented, because the sequence is inherent in the menus and the menu sequence. The operator is further relieved of the burden of remembering the rules for altering camera position, bridging sources and sinks, etc. Again, these rules are inherent in the software; if the operator violates one of the rules and/or attempts to initiate an impossible or inconsistent command, the intelligence inherent in the software will prevent the attempt and in most cases indicate by means of an error message, the particular error that has occurred. To give a few brief examples, for example if the operator selects mutually exclusive devices, i.e. he touches two different sources in a single command sentence, the system will automatically eliminate the first touched source on detection of the touch of a second source. If the operator attempts to initiate a command sentence without the necessary components, at least one source, one sink and the message terminator, the system will refuse to proceed. However, the system is also flexible enough so that unnecessary exactness is not required. For example, if the operator desires to add a new sink to a previously existing bridge, he need only identify, in addition to the display sought to be added, any element of the preexisting bridge.

Not only does the processor 133 respond to appropriate touches for formatting information to control the devices (e.g., the matrix switch 401 and the movable cameras 140 and 141), but in addition provides the operator with feedback by altering the status of the display 131. Accordingly, applicants have provided, for the first time, a relatively simple teleconferencing system which is capable of use by relativley unskilled operators and yet provides effective teleconferencing in providing to the conference participants the feeling of a lack of distance separation between them, notwithstanding their actual physical separation.

We claim:

1. A teleconferencing system adapted to be connected by a wide band digital communication link for allowing relatively unskilled operators to control a teleconference; comprising at least a pair of teleconferencing site means for transmitting and receiving audio and video representing digital signals therebetween, each said site means comprising:

at least a pair of controllable video source means for deriving a video signal from controllable regions of the associated site, audio signal source means for deriving an audio signal from the associated site, at least a pair of video displays for controllably displaying either locally or remotely generated image, audio transducer means responsive to a remotely generated audio signal for generating perceptible sound, interface means for coupling digital representations of locally generated audio and video signals to said communication link and for coupling digital representations of remotely generated audio and video signals from said communication link, control means including a digital microprocessor and video matrix switch means with plural video inputs and outputs for controllably coupling at least a locally generated video signal to said interface means and for controllably coupling locally and/or remotely generated video signals to said video displays, said control means, including a control video display and touch sensitive screen for controlling said video source means and video matrix switch means in response to touches on said touch sensitive screen by an operator, said control means including:

logic means for interpreting commands initiated by operator touches of said touch sensitive screen and for thereafter implementing said commands if elements of said commands are consistent with each other and with available resources, and message formatting means responsive to said logic means for formatting digital messages destined for said video source means and said video matrix switch means, whereby unskilled operators can control said teleconferencing site means.

2. The apparatus of claim 1 wherein each of said video source means includes:

a motor driven platform for motion in pan and tilt directions, a motor driven lens controller for altering camera lens parameters in zoom and focus, a camera controller for operating said motor driven platform and lens controller in response to digital messages from said message formatting means.

3. The apparatus of claim 1 wherein said video matrix switch means includes a video switch matrix controller responsive to messages from said message formatting means for selectively making or breaking conductive connections between input and output terminals of said video matrix switch means.

4. The apparatus of claim 1 in which said logic means includes:

menu drawing means for outputting video signals to said control video display for depicting a current menu as one of a plurality of menus, menu handler means responsive to an operator touch and to data representative of a current menu and to data representative of prior touches for:

(a) initiating redrawing of said current or a different menu, and/or (b) outputting a message to one or more selected devices, selected from the group consisting of video source means, or video matrix switch means, or (c) storing data representative of said operator touch.

5. The apparatus of claim 4 in which said logic means includes:

lexical scan means initiated by a selected touch to examine stored data representative of prior touches for determining logical consistency of said prior touches and for outputting either:

(a) an error message indicating logical inconsistency, or (b) device control messages to one or more devices to control said devices to conform to a logically consistent sequence of touches.

6. The apparatus of claim 5 in which said logic means includes means for retrievably storing:

a menu dictionary table with an entry for each menu, each entry defining forward and reverse linkages to other menus, a quantity of elements within a menu and a linkage to a menu control table, a menu control table including an entry for each menu, each entry including a number of elements including said menu, each element including data definitive of element attribute current and pending status, a link to a display element library, a link to immediate and delayed action routines, data definitive of elements syntactic class and data definitive of element coordinates within said menu, an entity status table with an entry for selected menu elements, each entry including data definitive of element type and a link defining controller elements, a display element library with an entry for each elemental shape including data representing a number of sub-elements, sub-element class, coordinates representing element location and a string for element display.

7. The apparatus of claim 5 in which said logic means includes:

means for building an element stack including touch responsive means to identify a touched element and means for storing a representation of that element in a stack including means for setting an immediate action flag associated with said element on said stack, means for examining said stack for running an immediate action routine in response to a set immediate action flag associated with a top element on said stack.

8. The apparatus of claim 7 in which said logic means includes:

a set of immediate action routines associated with different system elements, said immediate action routines representing physical devices effecting removal from said stack data representative of any identical elements.

9. The system of claim 1 wherein said logic means includes:
- first means responsive to a touch on said touch sensitive screen for generating a digital signal representing coordinates of said touch,
- second means responsive to an indication of present menu display for identifying a touched element on said menu and for passing a representation thereof to an element stack means,
- element stack means for stacking in sequential order element representations passed from said second means and thereby maintaining an element stack,
- terminator touch responsive means responsive to a selected touch for scanning said element stack to:
  - eliminate doubly touched elements,
  - sort said elements into an order determined by element function,
  - and for ensuring that said stack represents no more than one video source, and at least one video sink if a video source is present,
- said message formatting means responsive to said terminator touch responsive means for formatting said messages.

10. The apparatus of claim 9 in which said logic means includes:
- bridging means to associate all elements on said element stack on successful operation of said terminator touch means, and
- menu drawing means to redraw a menu after successful operation of said terminator touch responsive means with associated element represented by a common color.

11. The apparatus of claim 1 in which said logic means includes:
- camera selection touch means responsive to a touch in one of two touch areas to select one of said cameras,
- zoom touch means responsive to a subsequent touch in one of a plurality of touch areas for determining a corresponding zoom parameter and passing said zoom parameter to said message formatting means.

12. The apparatus of claim 11 in which said logic means further includes:
- focus touch means responsive to a touch subsequent to a camera selection touch in one of a plurality of focus touch areas for determining a corresponding focus parameter and passing said touch parameter to said message formatting means.

13. The apparatus of any of claims 11 or 12 in which said logic means further includes:
- pan/tilt touch means responsive to a touch, subsequent to a camera selection touch, in one of a plurality of pan/tilt touch areas for
- determining a pan/tilt direction and passing said pan/tilt direction to said message formatting means but only if a camera selected by said camera selection touch is not in motion.

14. The apparatus of claim 13 in which said pan/tilt touch means selects a stop motion message for passing to said message formatting means, in response to a touch in any of a plurality of touch responsive areas, subsequent to a camera selection touch, and while a camera selected by said camera selection touch is in motion.

* * * * *

UNITED STATES PATENT AND TRADEMARK OFFICE
CERTIFICATE OF CORRECTION

PATENT NO. : 4,516,156
DATED : May 7, 1985
INVENTOR(S) : Fabris et al

It is certified that error appears in the above—identified patent and that said Letters Patent is hereby corrected as shown below:

On the title page, Item (75) should read:
The inventors are Alfonso V. Fabris, Oakton; Robert M. Strickland, Jr.; John T. Toth, both of McLean; Janice N. Keenan, Vienna; Thomas L. Hahler, Falls Church; Michael Rahrer; Michael Rohrer, both of Reston, all of Va.; Alan E. Vinciguerra, Germantown; Catherine A. Muir, Cabin John, both of Md.

The following paragraph should be inserted at Col. 1, between "Field of the Invention" and "Background Art":

-Appendix

Appended to the specification and incorporated by this reference is an appendix including pages A-1 to A-193, comprising a Programming Design Language (PDL) description of those portions of the software which are related to

UNITED STATES PATENT AND TRADEMARK OFFICE
CERTIFICATE OF CORRECTION

PATENT NO. : 4,516,156
DATED      : May 7, 1985
INVENTOR(S) : Fabris et al

It is certified that error appears in the above—identified patent and that said Letters Patent is hereby corrected as shown below:

operator input, menu management and display, and formatting of output commands of an embodiment of the invention actually constructed.-

The attached appendix should be appended to the patent.

Signed and Sealed this

Tenth Day of September 1985

[SEAL]

Attest:

DONALD J. QUIGG

Attesting Officer    Acting Commissioner of Patents and Trademarks - Designate

APPENDIX

```
DATA
     SCALAR  CURRMA,    [CURRENT MENU MCT ADDRESS]
             ROBID,     [ROB REQUEST NUMBER]
             MSGID,     [MESSAGE REQUEST NUMBER]
             MCADDR,    [CURRENT MENU MCT ADDRESS]
             MEADDR,    [CURRENT ELEMENT MCT ADDRESS]
             DEADDR,    [CURRENT ELEMENT DEL ADDRESS]
             ESADDR,    [CURRENT ELEMENT EST ADDRESS]
             TLADDR,    [CURRENT ELEMENT TEL ADDRESS]
             MDTLEN,    [LENGTH OF MDT ENTRY]
             MCTLEN,    [LENGTH OF MCT ENTRY]
             ESTLEN,    [LENGTH OF EST ENTRY]
             RQMENU,    [REQUESTED MENU NUMBER]
             PDMENU,    [PENDING MENU NUMBER]
             ERRMSG,    [NUMBER OF PENDING MESSAGE]
             ERRFLG,    [FLAG INDICATING ERROR PENDING]
             LEXRC,     [RETURN CODE FROM LEXICAL SCANNER]
             CAMTCH,    [TOUCHED CAMERA MCT ELEMENT ADDRESS]
             CAMLOP,    [TOUCHED CAMERA - NUMBER OF PRESETS]
             CURPRE,    [TOUCHED CAMERA - CURRENT PRESET NO.]
             PRVFLG,    [FLAG TO INDICATE PREVIEW ACTIVE]
             STKBTM,    [ADDRESS OF ELEMENT STACK BOTTOM]
             STKTOP,    [ADDRESS OF TOP ELEMENT ON STACK]
             CO3DRW,    [MENU C3 DRAWN FLAG]
             MENUAD,    [SAVE AREA FOR MENU MDT ADDRESS]
             ICB,       [CURRENT LIGHT ICB ADDRESS]
     STACK: INTEGER     [ADDRESS OF ELEMENT STACK]
```

A-1

```
MENU DICTIONARY TABLE

ARRAY    MDT (1:19) OF MDT-ENTRY
    RECORD   MDT-ENTRY           [MENU DICTIONARY TABLE]
             .ID,                [MENU IDENTIFICATION NUMBER]
             .PM,                [PREVIOUS MENU ID]
             .NM,                [NEXT MENU ID]
             .NMM,               [NEXT MENU ID (MODIFIED)]
             .ICB,               [CURRENT MENU LOCATION]
             .NEL,               [NUMBER OF ELEMENTS IN MENU]
             .HELP,              [MENU ID OF HELP MENU]
             .RFFU,              [RESERVED FOR FUTURE USE]
             .MCT: INTEGER       [MENU MCT ADDRESS]
```

A-2

```
MENU CONTROL TABLE

ARRAY   MCT (1:SUM OF MENU ELEMENTS) OF MCT-ENTRY
     RECORD  MCT-ENTRY           [MENU CONTROL TABLE]
             .ID,                [ELEMENT ID]
             .CURRENT,           [CURRENT STATUS OF ELEMENT]
                 ..BORDER        (1=ON, 0=OFF)
                 ..BODY
                 ..INSENSITIVE
                 ..INHIBIT
                 ..TEXT
             .NEXT,              [NEXT STATUS OF ELEMENT]
                 ..BORDER        (1=ON, 0=OFF)
                 ..BODY
                 ..INSENSITIVE
                 ..INHIBIT
                 ..TEXT
             .DEFAULT,           [DEFAULT STATUS OF ELEMENT]
                 ..BORDER        (1=ON, 0=OFF)
                 ..BODY
                 ..INSENSITIVE
                 ..INHIBIT
                 ..TEXT
             .SYNTAX,            [SYNTAX CLASS]
             .DEL,               [DEL ID]
             .RFFU               [RESERVED FOR FUTURE USE]
             .EID,               [ENTITY ID]
             .IACT,              [IMMEDIATE ACTION ROUTINE]
             .DACT,              [DELAYED ACTION ROUTINE]
             .COLOR,             [ASSIGNED COLORS]
                 ..ON
                 ..OFF
                 ..CURRENT
                 ..TEXT
             .HELP,              [HELP MENU ID]
             .TXTSZE,            [TEXT SIZE]
             .XHERE,             [X HERE COORDINATE]
             .YHERE,             [Y HERE COORDINATE]
             .TEXT: INTEGER      [TEL ID]
```

A-3

```
ENTITY STATUS TABLE

ARRAY    EST (1:ESTENT) OF EST-ENTRY
    RECORD   EST-ENTRY            [ENTITY STATUS TABLE]
             .ID,                 [EST ID]
             .TYPE,               [EST TYPE]
             .CB,                 [CONTROLLED BY]
             .COLR,               [COLOR]
             .ON,                 [ENTITY ON INDICATOR]
             .PRESENT,            [ENTITY PRESENT INDICATOR]
             .ONDEFAULT,          [ON FLAG DEFAULT]
             .PREDEFLT,           [PRESENT FLAG DEFAULT]
             .FIELD1,             [ENTITY SPECIFIC VALUE 1]
             .FIELD2,             [ENTITY SPECIFIC VALUE 2]
             .FIELD3,             [ENTITY SPECIFIC VALUE 3]
             .INIT,               [INITIAL DEFAULT FIELD]
             .CONFLICT: INTEGER   [CONFLICT WORD]
```

A-4

```
DISPLAY ELEMENT LIBRARY
    ARRAY    DEL (1:NUMBER OF ELEMENT SHAPES) OF DEL-ENTRY
    RECORD   DEL-ENTRY              [DISPLAY ELEMENT LIBRARY]
             .XTOL,                 [X TOLERANCE]
             .YTOL,                 [Y TOLERANCE]
             .NSE,                  [NUMBER OF SUB-ELEMENTS]
             .LENGTH: INTEGER       [LENGTH OF LIGHT STRING]
    ARRAY    DEL.SUB (1:NSE) OF DEL.SUB-ENTRY
    RECORD DEL.SUB-ENTRY            [DISPLAY ELEMENT LIBRARY]
             .CLASS,                [SUB-ELEMENT TYPE]
             .XFILL,                [X FILL OFFSET]
             .YFILL,                [Y FILL OFFSET]
             .XTEXT,                [X TEXT OFFSET]
             .YTEXT: INTEGER        [Y TEXT OFFSET]
             .TEXT: STRING(LENGTH)  [LIGHT STRING]
```

A-5

```
TEXT ELEMENT LIBRARY

ARRAY   TEL       (1:NUMBER OF TEXT STRINGS) OF TEL-ENTRY
    RECORD  TEL-ENTRY         [TEXT ELEMENT LIBRARY]
        .LENGTH: INTEGER       [LENGTH OF TEXT STRING]
        .TEXT: STRING (LENGTH) [TEXT STRING]
        .EOT: INTEGER          [END OF TEXT STRING]
```

A-6

```
MESSAGE TABLES

ARRAY    MESSAGE (1:LSTERR) OF MESSAGE-RECORD
        RECORD   MESSAGE-RECORD
                    .TEXT: STRING (VARIABLE)
                    .EOM:  INTEGER            [END OF MESSAGE]

ARRAY    RQB (1:17) OF RQB-RECORD
        RECORD   RQB-RECORD
                    .ACTION,                  [ACTION CODE]
                    .DESTINATION,             [DESTINATION APT/DHT]
                    .LENGTH,                  [LENGTH OF REMAINING RQB]
                    .MODIFIER,                [CAMERA NUMBER, IF APPLICABLE]
                    .CODE,                    [RQB CODE]
                    .PARAMETERS: INTEGER      [RQB PARAMETERS]

ARRAY    STACK (1:16) OF STACK RECORD
        RECORD   STACK-RECORD                 [SENTENCE/ELEMENT STACK]
                    .IFLAG,                   [IMMEDIATE ACTION FLAG]
                    .DFLAG,                   [DELAYED ACTION FLAG]
                    .ELEMENT: INTEGER         [ELEMENT MCT ADDRESS]
ATAD
PROC CTPAPT (ALT INPUT-MESSAGE)

DATA
                RECORD INPUT-MESSAGE
                        .TEXT(24) :STRING

SCALAR X,Y,MSG-ID,MSG-FLAG :INTEGER

CONSTANT MINUS1 := -1 :INTEGER

ATAD

<REENABLE INTERRUPTS AFTER DISPATCH>
        RUN MHRMAP (USE MINUS1)

CASE
                <TYPE OF INPUT-MESSAGE>

SELECT (FULL-INPUT-MESSAGE.HEADER.ORIG-IASK = <DHTCTP>)
                RUN DCDCTP (ALT FULL-INPUT-MESSAGE, CTPCB)
                RUN CNVCTP (ALT CTPCB)
                X := CTPCB.XL
                Y := CTPCB.YL
                RUN CCTSPT (ALT X,Y)

SELECT (INPUT-MESSAGE.TEXT(1:1) = 254)
                MSG-FLAG := INPUT-MESSAGE.TEXT(2:1)
                IF
                        INPUT-MESSAGE.TEXT(3:1) < '0'
                THEN
```

A-7

```
                    MSG-ID := INPUT-MESSAGE.TEXT(1:2)
            ELSE
                    MSG-ID := <ADDRESS OF INPUT-MESSAGE.TEXT(4:1)>
            FI
            RUN MSGDSP (USE MSG-FLAG, MSG-ID)
            RUN RELBUF (ALT FULL-INPUT-MESSAGE)
        ELSE
            RUN RELBUF (ALT FULL-INPUT-MESSAGE)
        ESAC
CORP    [ACTUALLY, BRANCH TO DISPAT]
```

A-8

```
PROC SYSREQ (USE ROB; ALT REPLY-ADDR)

DATA

RECORD INPUT-MESSAGE
                .TEXT(24) :STRING

SCALAR RC,INTVL,REPLY-ADDR :INTEGER
        SCALAR GOT-BUF :LOGICAL

ATAD

GOT-BUF := FALSE

WHILE
            NOT GOT-BUF
    DO
            RUN GETBUF (ALT FULL-INPUT-MESSAGE, GOT-BUF)
            IF
                    NOT GOT-BUF
            THEN
                    RC := RC-TIMEOUT
                    WHILE
                            RC = RC-TIMEOUT
                    DO
                            RUN WAITAC (USE <ACTBUF>; ALT RC)
                            IF
                                    RC <> RC-TIMEOUT AND RC <> RC-SUCCESS
                            THEN
                                    RUN ABORT
                            FI
                            RUN MHRMAP (USE MINUS1)
                    OD
            FI
    OD
    FULL-INPUT-MESSAGE.HEADER.DEST-TASK := ROB.DST
    INPUT-MESSAGE.TEXT(1:2) = ROB.CMD
    N := ROB.LEN / 2 - 1
    <COPY N WORDS FROM ROB.PRM TO INPUT-MESSAGE.TEXT(3:2N)>
```

A-9

```
        CASE
                RQB.AC

SELECT (RQB.AC = 0) [ORDINARY SEND]
                RUN SEND (ALT FULL-INPUT-MESSAGE)

SELECT (RQB.AC > 0) [SENDAC]
                RUN SENDAC (USE RQB.AC; ALT FULL-INPUT-MESSAGE, REPLY-ADDR, RC
                IF
                        RC <> RC-SUCCESS AND RC <> RC-TIMEOUT
                THEN
                        RUN ABORT
                FI

WHILE
                        RC = RC-TIMEOUT
                DO
                        RUN WAITAC (USE RQB.AC; ALT REPLY-ADDR, RC)

IF
                                RC <> RC-SUCCESS AND RC <> RC-TIMEOUT
                        THEN
                                RUN ABORT
                        FI

RUN MHRMAP (USE MINUS1)
                OD

SELECT (RQB.AC < 0) [SENDTM]
                INTVL := - RQB.AC * 6    [GIVEN IN .1 SEC INTERVALS]
                RUN SENDTM (USE INTVL; ALT FULL-INPUT-MESSAGE, RC)
                IF
                        RC <> RC-SUCCESS
                THEN
                        RUN ABORT
                FI

RUN MHRMAP (USE MINUS1)
        ESAC
CORP
```

A-10

```
PROC DCDCTP (ALT FULL-INPUT-MESSAGE, CTPCB)
    DATA
        RECORD INPUT-MESSAGE
            .TEXT(24) :STRING

SCALAR NUM-STRING(5) :STRING
        SCALAR NUM,LEN :INTEGER

ATAD

LEN := 5
        NUM-STRING := INPUT-MESSAGE.TEXT(1:5)
        RUN ASCBIN (USE NUM-STRING,LEN; ALT NUM,RC)
        CTPCB.XT := NUM

NUM-STRING := INPUT-MESSAGE.TEXT(6:5)
        RUN ASCBIN (USE NUM-STRING,LEN; ALT NUM,RC)
        CTPCB.YT := NUM

RUN RELBUF (ALT FULL-INPUT-MESSAGE)
CORP

PROC CNVCTP (ALT CTPCB)
    CTPCB.XL := CTPCB.XLMN + ABS(CTPCB.XT - CTPCB.XTMN) * CTPCB.DXL / CTP
    CTPCB.YL := CTPCB.YLMN + ABS(CTPCB.YT - CTPCB.YTMN) * CTPCB.DYL / CTP

CORP
```

A-11

```
PROC INTMHR                    [INITIATES THE MENU HANDLER MODULE]
    DATA
        SCALAR   CLRCCM: STRING(V)
        SCALAR   COLORS: STRING(V)
        CONSTANT FSTMEN: INTEGER          [FIRST MENU ID]
    ATAD
    ICB := <LIGHT ICB ADDRESS>
    RUN LIGHT (USE CLRCCM)                [CLEAR THE MONITOR]
    RUN LIGHT (USE COLORS)                [DEFINES THE COLORS]
    RQMENU := FSTMEN
    RUN DRMENU
CORP
```

A-12

```
PROC MINIT               [RESETS MENU HANDLER VALUES]
     DATA
          SCALAR   LOOP,
                   LOOP1,
                   ELEMENT,
                   MENU: INTEGER
          CONSTANT NUMMEN,           [NUMBER OF MENUS]
                   ESTENT: INTEGER   [NUMBER OF EST ENTRIES]
          ARRAY    DEFEST (1:ESTENT) OF DEFEST-ENTRY
          RECORD   DEFEST-ENTRY
                   .FON,
                   .FPRE: INTEGER
     ATAD
     MENU := MDT
          LOOP := NUMMEN
     WHILE                     [RESET MENU DICTIONARY TABLE]
               LOOP > 0
     DO
               <RESET MDT VALUES>
               ELEMENT := MDT(MENU).MCT
               LOOP1 := MDT(MENU).NEL
          WHILE              [RESET MENU CONTROL TABLE ELEMENTS]
                    LOOP1 > 0
          DO
                    <RESET MCT(ELEMENT) VALUES>
                    LOOP := LOOP - 1
                    ELEMENT := ELEMENT + MCTLEN
          OD
               LOOP := LOOP -1
               MENU := MENU + MDTLEN
     OD
     ESADDR := EST
     LOOP := ESTENT
     LOOP1 := 0
     WHILE                     [RESET ENTITY STATUS TABLE]
               LOOP > 0
     DO
               LOOP1 := LOOP1 + 1
               EST(ESADDR).CB := 0
               EST(ESADDR).FON := DEFEST(LOOP1).FON
               EST(ESADDR).FPRE := DEFEST(LOOP1).FPRE
               ESADDR := ESADDR + ESTLEN
               LOOP := LOOP -1
     OD
     <RESET SYSTEM PARAMETERS>
     <LOAD PRESET COORDINATES FROM CONFERENCE INITIALIZATION
               TABLE TO MENU C3 ELEMENTS>
          <PFLAG(1-2,1-2) := 0>
CCRP
```

A-13

```
PROC DRAW-MENU (USE MENU)
    DATA
        SCALAR CURR-MENU: INTEGER [CURRENT MENU DISPLAYED]
        SCALAR N-ICBS: INTEGER [NUMBER OF ICBS AVAILABLE]
        SCALAR @MCT: INTEGER
        SCALAR LOOP: INTEGER
        SCALAR POS: INTEGER
        SCALAR MIN-USAGE: INTEGER
        SCALAR LOOP-MIN: INTEGER
        SCALAR DROP-MENU: INTEGER
    ATAD
    IF
        MENU = FSTMEN
    THEN
        RUN MINIT
    FI
    IF
        CURR-MENU = MENU
    THEN
        RUN REDRAW-MENU (USE MENU)
    FI
    IF
        MENU-DICT (MENU).FLAGS.ICB <> 0
    THEN
        RUN SWAP-MENU (USE MENU)
    FI
    POS := 0
    LOOP := 0
    LOOP-MIN := 1
    MIN-USAGE := 999
    DO
        LOOP := LOOP + 1
        IF
            IMAGE-ARRAY (LOOP).MENU-ID = 0 [EMPTY ICB]
        THEN
            POS := LOOP
        ELSE
            IF
                IMAGE-ARRAY (LOOP).USAGE < MIN-USAGE
            THEN
                MIN-USAGE := IMAGE-ARRAY (LOOP).USAGE
                LOOP-MIN := LOOP
            FI
        FI
    UNTIL
        POS <> 0 OR LOOP = N-ICBS
    OD
    IF
        POS = 0 [NO EMPTY SLOTS]
    THEN
        POS := LOOP-MIN
        DROP-MENU := IMAGE-ARRAY(POS).MENU-ID
        MENU-DICT(DROP-MENU).FLAGS.ICB := 0
```

A-14

```
        @MCT := MENU-DICT(CURR-MENU).MCT
        LOOP := 0
        WHILE
                LOOP =< MENU-DICT (CURR-MENU).N-MCT-ELEMENTS
        DO
                LOOP := LOOP + 1
                @MCT-->MCT(LOOP).CURR-STATUS := 0
        OD
FI
MENU-DICT(MENU).FLAGS.ICB := POS
MENU-DICT(MENU).PREV-MENU := CURR-MENU
IMAGE-ARRAY(POS).MENU-ID := MENU
IMAGE-ARRAY(POS).USAGE := 1
RUN LIGHT [< SET ICB NUMBER, IMAGE-ARRAY(POS).ICB-NO>]
LOOP := 0
WHILE
        LOOP =< MENU-DICT(MENU).N-MCT-ELEMENTS
DO
        LOOP := LOOP + 1
        RUN DRAW-ELEMENT (USE MENU, LOOP)
OD
CURR-MENU := MENU
FI
        MENU = C03MNU AND C03DRW = 0
THEN
        RUN SIDFLT
        C03DRW := C03DRW + 1
FI
RUN LIGHT [< SET ICB  TO DISPLAY>]
CCRP
```

A-15

```
PROC GMADDR (USE MENUID)            [GET MDT ADDRESS]
        DATA
        ATAL
        MENUAL := (MENUID - 1) * MDTLEN + MDT
CORP
```

A-16

```
PROC MNEXT (ALT PDMENU)            [GET NEXT MENU ID]
        DATA
        ATAD
        IF
                MDT(CURRMA).NMM <> 0
        THEN
                PDMENU := MDT(CURRMA).NMM
                MDT(CURRMA).NMM := 0
        ELSE
                PDMENU := MDT(CURRMA).NM
        FI
CORP
```

A-17

```
PROC ESTADD (USE HEADER, ALT ESADDR)
     DATA
           SCALAR ID: INTEGER
     ATAD
     ID := MCT(HEADDR).EID
     ESADDR := (ID -1) * ESTLEN + ES1
CORP
```

A-18

```
PROC REDRAW-MENU (USE MENU)
      DATA
            SCALAR CURR-MENU: INTEGER
            SCALAR LOOP: INTEGER
      ATAD
      LOOP := 0
      WHILE
            LOOP =< MENU-DICT(MENU).N-MCT-ELEMENTS
      DO
            LOOP := LOOP + 1
            RUN DRAW-ELEMENT (USE MENU, LOOP)
      OD
CORP
```

A-19

```
PROC SWAP-MENU (USE MENU)
     DATA
          SCALAR CURR-MENU: INTEGER
          SCALAR IMAGE-LOC: INTEGER
          SCALAR CURR-ICB: INTEGER [CURRENT ICB IN DISPLAY]
          SCALAR LOOP: INTEGER
     ATAD
     MENU-DICT(MENU).PREV-MENU := CURR-MENU
     IMAGE-LOC := MENU-DICT(MENU).FLAGS.ICB
     IMAGE-ARRAY(IMAGE-LOC).USAGE := IMAGE-ARRAY(IMAGE-LOC).USAGE + 1
     RUN LIGHT [<SET DRAW ICB TO IMAGE-LOC>]
     LOOP := 0
     WHILE
          LOOP =< MENU-DICT(MENU).N-MCT-ELEMENTS
     DO
          LOOP := LOOP + 1
          RUN DRAW-ELEMENT (USE MENU, LOOP)
     OD
     CURR-ICB := IMAGE-LOC
     CURR-MENU := MENU
     RUN LIGHT [<SET CURR-ICB TO DISPLAY>]
CCRP
```

A-20

```
PROC DRAW-ELEMENT (USE MENU, ELEM)
    DATA
        SCALAR @MCT: INTEGER
        SCALAR EST-ENTRY: INTEGER

@MCT := MENU-DICT(MENU).MCT [@MCT WILL BE USED AS MCT]
    EST-ENTRY := @MCT-->MCT(ELEM).ENTITY.ID
    IF   EST-ENTRY <> 0
    THEN
         @MCT-->MCT(ELEM).NEXT-STATUS.BODY := EST(EST-ENTRY).FLAGS.ON
         @MCT-->MCT(ELEM).NEXT-STATUS.INHIBIT-DRAW := ES1(EST-ENTRY).FLAGS.PRESENT
    FI
    IF   @MCT-->MCT(ELEM).CURR-STATUS <> @MCT-->MCT(ELEM).NEXT-STATUS
    THEN
         IF   @MCT-->MCT(ELEM).CURR-STATUS.BORDER <> @MCT-->MCT(ELEM).NEXT-STATUS.BORDER
         THEN RUN CHANGE-BORDER (USE @MCT,ELEM)
         FI
         IF   @MCT-->MCT(ELEM).CURR-STATUS.BODY <> @MCT-->MCT(ELEM).NEXT-STATUS.BODY
         THEN RUN CHANGE-BODY (USE @MCT,ELEM)
         FI
         IF   @MCT-->MCT(ELEM).CURR-STATUS.TEXT <> @MCT-->MCT(ELEM).NEXT-STATUS.TEXT
         THEN RUN CHANGE-TEXT (USE @MCT-->MCT(ELEM).ELEM)
         FI
         IF   @MCT-->MCT(ELEM).CURR-STATUS.INHIBIT-DRAW <>
              @MCT-->MCT(ELEM).NEXT-STATUS.INHIBIT-DRAW
         THEN RUN ZAP-OUT (USE @MCT,ELEM)
         FI
         @MCT-->MCT(ELEM).CURR-STATUS := @MCT-->MCT(ELEM).NEXT-STATUS
CORP
```

A-21

```
PROC CHANGE-BORDER (USE @MCT,ELEM)
    DATA
        SCALAR  @DEL: INTEGER
        SCALAR  @ELEM: INTEGER
        SCALAR  COLOR: INTEGER  [COLOR TO CHANGE BORDER]
        SCALAR  T-COLOR: INTEGER  [DEFAULT TOUCHED COLOR]
        SCALAR  UT-COLOR: INTEGER  [DEFAULT UNTOUCHED COLOR]
        SCALAR  LOOP: INTEGER
    DATA
    COLOR := T-COLOR
    IF      @MCT-->MCT(ELEMENT).NEXT-STATUS.BORDER = 0
    THEN
            COLOR := UT-COLOR
    FI
    @DEL := @MCT-->MCT(ELEM).DEL-ID
    @ELEM := @DEL-->DEL.SUB-ELEMENT
    RUN LIGHT [< SET 'HERE' COORDINATES TO @MCT.HERE>]
    LOOP := 0
    DO      LOOP := LOOP + 1
    UNTIL   LOOP > @DEL-->DEL.NO-SUB-ELEMENTS OR (@ELEM-->SUB-ELEMENT(LOOP).CLASS = 1
    OD
    IF      LOOP > @DEL-->DEL.NO-SUB-ELEMENTS
    THEN    RUN ERROR < PERFORM ERROR HANDLING >
    ELSE    < CONSTRUCT LIGHT STRING USING @ELEM-->SUB-ELEMENT(LOOP).FILL.OFFSET
              AND COLOR>
            RUN LIGHT [< USING CONSTRUCTED LIGHT STRING >]
    FI
CORP
```

A-22

```
PROC CHANGE-BODY (USE @MCT,ELEM)
    DATA
        SCALAR @DEL: INTEGER
        SCALAR @ELEM: INTEGER
        SCALAR COLOR: INTEGER
        SCALAR EST-ENTRY: INTEGER
        SCALAR CONTROLLER: INTEGER
    ATAD
    @DEL := @MCT-->MCT(ELEM).DEL-ID
    @ELEM := @DEL-->DEL.SUB-ELEMENT
    EST-ENTRY := @MCT-->MCT(ELEM).ENTITY.ID
    COLOR := @MCT-->MCT(ELEM).COLOR.BASE
    IF
        @MCT-->MCT(ELEM).NEXT-STATUS.BODY = 1 [ACTIVE]
    THEN
        IF
            EST(EST-ENTRY).TYPE = 0 [CONTROLLED]
        THEN
            CONTROLLER := EST(EST-ENTRY).CONTROLLED-BY
            COLOR := EST(CONTROLLER).COLOR
            EST(EST-ENTRY).COLOR := COLOR
        ELSE
            COLOR := EST(EST-ENTRY).COLOR [NOT CONTROLLED]
        FI
    FI
    RUN LIGHT [< SET 'HERE' COORDINATES TO @MCT.HERE >]
    LOOP := 0
    WHILE
        LOOP =< @DEL-->DEL.NO-SUB-ELEMENTS
    DO
        LOOP := LOOP + 1
        IF
            @ELEM-->SUB-ELEMENT(LOOP).CLASS = 2
        THEN
            < CONSTRUCT LIGHT STRING WITH COLOR AND
              @DEL.SUB-ELEMENT(LOOP).FILL-OFFSETS >
            RUN LIGHT [< USE CONSTRUCTED STRING >]
        FI
    OD
    @MCT-->MCT(ELEMENT).COLOR.CURRENT := COLOR
```

A-23

```
PROC CHANGE-TEXT (USE @MCT,ELEMENT)
    DATA
        SCALAR @DEL: INTEGER
        SCALAR @TEXT: INTEGER
        SCALAR @ELEM: INTEGER
        SCALAR LOOP: INTEGER
        SCALAR CHARACTER-WIDTH: INTEGER
        SCALAR CHARACTER-HEIGHT: INTEGER
    ATAD
    @DEL  := @MCT-->MCT(ELEMENT).DEL-ID
    @TEXT := @MCT-->MCT(ELEMENT).TEXT-ID
    @ELEM := @DEL-->DEL.SUB-ELEMENT
    LOOP  := 0
    DO
        LOOP := LOOP + 1
    UNTIL
        @ELEM-->SUB-ELEMENT(LOOP).CLASS = 2 [BODY]
    OR LOOP > @DEL-->DEL.NO-SUB-ELEMENTS
    OD
    Y.POS := (@TEXT-->TEXT.LENGTH/2) * CHARACTER.WIDTH
    Y.POS := @ELEM-->SUB-ELEMENT(LOOP).TEXT-OFFSET.Y - Y-POS
    RUN LIGHT [< SET 'HERE' COORDINATES TO @MCT-->MCT(ELEMENT).HERE >]
    IF
        @MCT-->MCT(ELEMENT).NEXT-STATUS.TEXT = 0 [NO TEXT]
    THEN
        <CONSTRUCT LIGHT STRING TO ZAP TEXT AREA
         COORDINATES FOR ZAP ARE @ELEM-->SUB-ELEMENT(LOOP).TEXT-OFFSET.X,
         Y-POS, TEXT-HEIGHT AND @TEXT-->TEXT.LENGTH * CHARACTER-WIDTH.
         GET COLOR FROM @MCT-->MCT(ELEMENT).COLOR.CURRENT>
        RUN LIGHT [< USING CONSTRUCTED SENTENCE >]
    ELSE
        < CONSTRUCT LIGHT STRING FOR TEXT, COORDINATES
          ARE @ELEM-->SUB-ELEMENT(LOOP).TEXT-OFFSET.X AND Y-POS.
          COLOR WILL BE @MCT-->MCT(ELEMENT).TEXT-COLOR >
        RUN LIGHT [< USING CONSTRUCTED SENTENCE >.]
    FI
CORP
```

```
PROC ZAP-OUT (USE @MCT,ELEM)
        DATA
                SCALAR @DEL: INTEGER
        ATAD
        RUN LIGHT [< SET 'HERE' TO @MCT-->MCT(ELEM).HERE >]
        @DEL := @MCT-->MCT(ELEM).DEL-ID
        <CONSTRUCT LIGHT STRING TO ZAP AREA,
        COORDINATES ONE 0,0,@DEL.TOLERANCE.X AND
        @DEL-->DEL.TOLERANCE,Y. COLOR WILL BE @MCT-->MCT(ELEM).COLOR.BASE >
        RUN LIGHT [< USE CONSTRUCTED SENTENCE >]
CORP
```

A-25

```
PROC TOUCH (USE ELEMENT; OUT:RC)
    DATA
        SCALAR RC, ELEMENT: INTEGER
        SCALAR @MCT: INTEGER
    ATAD
    @MCT := MENU-DICT(CURR-MENU).MCT
    RC := @MCT-->MCT(ELEMENT).CURR-STATUS.BORDER
    IF
        RC = 0
    THEN
        @MCT-->MCT(ELEMENT).NEXT-STATUS.BORDER := 1
    ELSE
        @MCT-->MCT(ELEMENT).NEXT-STATUS.BORDER := 0
    FI
    RUN DRAW-ELEMENT (USE @MCT,ELEMENT)
CORP
```

A-26

```
PROC CCTSPI              [TOUCH INTERPRETER]
    DATA
        SCALAR    ON: INTEGER
                  MORE: LOGICAL
    ATAD
    ON := 1
    RUN FINDEL (ALT MEADDR)    [LOCATE TOUCHED ELEMENT]
    IF
            <ELEMENT FOUND>
    THEN
            RUN COMPRS
    FI
    <STACK ELEMENT>
    STACK(TOP).IFLAG := ON
    MORE := TRUE
    WHILE
            MORE
    DO
            IF
                    <STACK EMPTY>
            THEN
                    MORE := FALSE
            ELSE
                    IF
                            STACK(TOP).IFLAG = ON
                    THEN
                            RUN <IMMEDIATE ACTION ROUTINE>
                    ELSE
                            IF
                                    STACK(TOP).DFLAG = ON
                            THEN
                                    RUN <DELAYED ACTION ROUTINE>
                            ELSE
                                    MORE := FALSE
                            FI
                    FI
            FI
            IF
                    NOT MORE
            THEN
                    RUN MNEXT (ALT PDMENU)
                    RQMENU := PDMENU
                    RUN DRMENU (USE RQMENU)
            FI
    OD
CORP
```

A-27

```
PROC GACTAD (USE ACTION.RTN, ALT ACTION.ADDR)    [MAP ACTION ROUTINES]
    DATA
        SCALAR  ORIGIN,
                MMS.NUMBER,
                MMR.NUMBER: INTEGER
    ATAD
    IF
        ACTION.RTN <> 0
    THEN
        ORIGIN := MMSTAB(ACTION.RTN)
        MMS.NUMBER := MMSTAB(ACTION.RTN + 1)
        BLOCKS := MMSTAB(ACTION.RTN + 2)
        MMR.NUMBER := ORIGIN/512 - 64
        WHILE
            BLOCKS > 0
        DO
            RUN MRHMAP (USE MMS.NUMBER, MMR.NUMBER)
            MMS.NUMBER := MMS.NUMBER + 1
            MMR.NUMBER := MMR.NUMBER + 1
            BLOCKS := BLOCKS - 1
        OD
    FI
CORP
PROC FINDEL (USE X.TOUCH, Y.TOUCH)      [FIND THE TOUCHED ELEMENT]
    DATA
        SCALAR  LOOP,
                X,
                Y,
                X.TOUCH,
                Y.TOUCH: INTEGER
        SCALAR  FOUND: LOGICAL
    ATAD
    LOOP := MDT(CURRMA).NEL
    FOUND := FALSE
    MEADDR := MDT(CURRMA).MCT - MCTLEN
    WHILE
        LOOP > 0 AND NOT FOUND
    DO
        MEADDR := MEADDR + MCTLEN
        IF
            MCT(MEADDR).DEL <> 0      [HAS A DEL ENTRY]
        THEN
            IF
                MCT(MEADDR).CURRENT.INSENSITIVE = <OFF> AND
                MCT(MEADDR).CURRENT.INHIBIT = <OFF>
            THEN
                X := X.TOUCH - MCT(MEADDR).XHERE
                Y := Y.TOUCH - MCT(MEADDR).XHERE
                IF
                    X >= 0 AND Y >= 0
                THEN
                    RUN GDELAD (USE MEADDR, ALT DEADDR)
                    IF
```

A-28

```
                                                    X =< DEL(DEADDR).XTOL
                                                AND Y =< DEL(DEADDR).YTOL
                                    THEN
                                            FOUND := TRUE
                                    FI
                            FI
                    FI
            FI
            LOOP := LOOP - 1
        OD
    IF
            NOT FOUND
        THEN
            MEADDR := 0
    FI
CORP
```

A-29

```
PROC LEXSCN        (LEXICAL SCANNER ROUTINE)
    DATA
            SCALAR LEXRC,
                    ELEMENT: INTEGER
            SCALAR FOUND: LOGICAL
    ATAD
    LEXRC := 0
    RUN COMPRS
    IF
            <STACK EMPTY>
    THEN
            LEXRC := 1
    ELSE
            RUN SRTES
            ELEMENT := STACK(TOP).ELEMENT
            IF
                    MCT(ELEMENT).SC = 2 AND <NUMBER STACKED = 1>
            THEN
                    LEXRC := 2
                    ERRMSG := 7
                    RUN GRMST
            ELSE
                IF
                        MCT(ELEMENT).SC <> 0
                    THEN
                        RUN ESTADD (USE ELEMENT, ALT ESADDR)
                        IF
                            EST(ESADDR).CB <> 0
                        THEN
                            FOUND := FALSE
                            MEADDR := MDT(CURRMA).MCT
                            WHILE
                                    (NOT FOUND) AND (<MORE ELEMENTS>)
                            DO
                                IF
                                        MCT(MEADDR).ESID = EST(ESADDR).ID
                                THEN
                                        <STACK ELEMENT>
                                        FOUND := TRUE
                                ELSE
                                        MEADDR := MEADDR + MCTLEN
                                FI
                            OD
                        ELSE
                                LEXRC := 2
                                ERRMSG := 8
                                RUN GRMST
                        FI
                FI
            FI
    FI
CORP
                          A-30
```

```
PROC COMPRS              (COMPRESS SENTENCE STACK)
    DATA
        SCALAR  ELEMENT,
                TOP,
                PTR,
                PTR2: INTEGER
        SCALAR  MORE,
                MATCH: LOGICAL
    ATAD
    TOP := MDT(CURRMA).ELST
    MORE := TRUE
    WHILE
            MORE
    DO
            ELEMENT := STACK(TOP).ELEMENT
            PTR := TOP
            MATCH := FALSE
            WHILE
                    PTR > MDT(CURRMA).ESTK  OR  NOT MATCH
            DO
                    PTR := PTR - 1
                    IF
                            ELEMENT = STACK(PTR).ELEMENT
                    THEN
                            STACK(PTR).IFLAG = <DELETE>
                            STACK(TOP).IFLAG = <DELETE>
                            MATCH := TRUE
                    FI
            OD
            TOP := TOP - 1
            WHILE
                    STACK(TOP).IFLAG = <DELETE>  AND
                    MORE
            DO
                    TOP := TOP - 1
                    IF
                            TOP = MDT(CURRMA).ESTK
                    THEN
                            MORE := FALSE
                    FI
            OD
    OD
    PTR := MDT(CURRMA).ESTK
    PTR2 := 0
    TOP := MDT(CURRMA).ELST
    WHILE
            PTR =< TOP
    DO
            IF
                    STACK(PTR).IFLAG <> <DELETE>
            THEN
                    PTR2 := PTR2 + 1
                    STACK(PTR2).IFLAG := STACK(PTR).IFLAG
```

A-31

```
                    STACK(PTR2).DFLAG   := STACK(PTR).DFLAG
                    STACK(PTR2).ELEMENT := STACK(PTR).ELEMENT
            IF
            PTR := PTR + 1
        OD
        MCT(CURRMA).ELS1 := PTR2
CORP
```

A-32

```
PROC SRTES                    [SORT SENTENCE STACK]
    DATA
            ARRAY TEMP.STACK(1:10)
            SCALAR I,SC,PTR: INTEGER
    ATAD
    I := 0
    SC := 0
    WHILE
            SC < 5
    DO
            PTR := STACK.BOTTOM
            WHILE
                    PTR < STACK.TOP
            DO
                    MEADDR := STACK(TOP).ELEMENT
                    IF
                            MCT(MEADDR).SC = SC
                    THEN
                            I := I + 1
                            TEMP.STACK(I) := STACK(PTR)
                    FI
                    PTR := PTR + 1
            OD
            SC := SC + 1
    OD
    PTR := 0
    WHILE
            PTR <= I
    DO
            STACK(PTR) := TEMP.STACK(PTR)
            PTR := PTR + 1
    OD
CORP
```

A-33

```
PROC GDELAD (USE MEADDR)          [GET DISPLAY ELEMENT ADDRESS AND MAP DEL]
    DATA
        SCALAR  DEL.ID,
                DEL.INDEX,
                MMS.NUMBER,
                DEL.ORIGIN,
                MAP.ORIGIN,
                SDEL,             [LOCATION OF DEX AND DEL]
                MMR.NUMBER: INTEGER
        ARRAY   DEX (1:NUMBER OF DEL ENTRIES) OF DEX-RECORD
        RECORD  DEX-RECORD
                .ADDRESS: INTEGER
    ATAD
    DEL.ID = MCT(MEADDR).DEL
    IF
        DEL.ID = 1
    THEN
        DEADDR = LOGO.ADDR        [FROM CONF INIT TABLE]
    ELSE
        DEADDR := 0
        MMS.NUMBER := SDEL(2)
        MMR.NUMBER := MAPDEL/512 - 64
        RUN MMRMAP (USE MMS.NUMBER, MMR.NUMBER)
        MAP.ORIGIN := MOD(DEX,512) + MAPDEL
        DEL.INDEX  := DEL.ID * 2 + MAP.ORIGIN
        DEADDR := DEX(DEL.INDEX).ADDRESS
        DEL.ORIGIN := MMSTAB(SDEL + 1)
        MMS.NUMBER := (DEADDR - DEL.ORIGIN)/512 + MMS.NUMBER
        MMR.NUMBER := MAPDEL/512 - 64
        RUN MMRMAP (USE MMS.NUMBER, MMR.NUMBER)
        MMS.NUMBER := MMS.NUMBER + 1
        MMR.NUMBER := MMR.NUMBER + 1
        RUN MMRMAP (USE MMS.NUMBER, MMR.NUMBER)
        DEADDR := MOD(DEADDR,512) + MAPDEL
    FI
CORP
```

A-34

```
PROC GTELAD (USE MEADDR)          [GET TEXT ELEMENT ADDRESS AND MAP TEL]
    DATA
        SCALAR  TEL.ID,
                TEL.INDEX,
                MMS.NUMBER,
                TEL.ORIGIN,
                MAP.ORIGIN,
                STEL,             [LOCATION OF TEX AND TEL]
                MMR.NUMBER: INTEGER
        ARRAY   TEX (1:NUMBER OF TEL ENTRIES) OF TEX-RECORD
        RECORD  TEX-RECORD
                .ADDRESS: INTEGER
    ATAD

TLADDR := 0
    MMS.NUMBER := STEL(2)
    MMR.NUMBER := MAPTEL/512 - 64
    RUN MMRMAP (USE MMS.NUMBER, MMR.NUMBER)
    MAP.ORIGIN := MOD(TEX,512) + MAPTEL
    TEL.ID := MCT(MEADDR).TEL
    TEL.INDEX := TEL.ID * 2 + MAP.ORIGIN
    TLADDR := TEX(TEL.INDEX).ADDRESS
    TEL.ORIGIN := MMSTAB(STEL + 1)
    MMS.NUMBER := (TLADDR - TEL.ORIGIN)/512 + MMS.NUMBER
    MMR.NUMBER := MAPTEL/512 - 64
    RUN MMRMAP (USE MMS.NUMBER, MMR.NUMBER)
    MMS.NUMBER := MMS.NUMBER + 1
    MMR.NUMBER := MMR.NUMBER + 1
    RUN MMRMAP (USE MMS.NUMBER, MMR.NUMBER)
    TLADDR := MOD(TLADDR,512) + MAPTEL
CORP
```

A-35

```
PROC GMCTAD (USE MCADDR)          [DO MCT MAPPING AND COMPUTE ADDRESSES]
    DATA
        SCALAR  MCT.ORIGIN,
                MMS.NUMBER,
                MMR.NUMBER,
                SMCTF,            [MCT MAPPED LOCATION FROM LINKER]
                LOOP: INTEGER
    ATAD
        MCT.ORIGIN := MMSTAB(SMCTF)
        MMS.NUMBER := MMSTAB(SMCTF+1)
        MMS.NUMBER := (MCADDR - MCT.ORIGIN)/512 + MMS.NUMBER
        MMR.NUMBER := MAPMCT/512 - 64
        LOOP := 4
        WHILE
            LOOP > 0
        DO
            RUN MMRMAP (USE MMS.NUMBER, MMR.NUMBER)
            MMS.NUMBER := MMS.NUMBER + 1
            MMR.NUMBER := MMR.NUMBER + 1
            LOOP := LOOP - 1
        OD
        MCADDR := MOD(MCADDR,512) + MAPMCT
CORP
```

A-36

```
PROC MMRMAP (USE MMS, MMR)        [PERFORM MEMORY MAPPING]
    DATA
        SCALAR  LOOP: INTEGER
        ARRAY   MAPTAB (1:32) OF MAPTAB-ENTRY
        RECORD  MAPTAB-ENTRY
                .MMS
    ATAD
    IF
        MMS <> 0
    THEN
        MMS := (MMS/8)*16 + MOD(MMS,8)
        MMS := INVERT(MMS)              [1'S COMPLIMENT]
        >F002 := MMR
        >F004 := MMS
        MAPTAB(MMR).MMS := MMS
    ELSE
        LOOP := 0
        WHILE
            LOOP < 32
        DO
            IF
                MAPTAB(LOOP).MMS <> 0
            THEN
                >F002 := LOOP
                >F004 := MAPTAB(LOOP).MMS
            FI
            LOOP := LOOP + 1
        OD
    FI
CORP
```

A-37

```
PROC GREST (USE FLAG, ERR.NO)
    DATA
            SCALAR  ERR.NO,
                    SAVEGO: INTEGER
    ATAD
    IF
            ERRMSG <> 0  OR  ERR.NO <> 0
    THEN
            <LOCATE GO KEY ELEMENT IN MENU>
            SAVEGO := <MCT ADDRESS OF GO KEY>
            IF
                    FLAG = <RESET>
            THEN
                    IF
                            MCT(SAVEGO).NEXT.BODY <> <OFF>
                    THEN
                            MCT(SAVEGO).NEXT.BODY = <OFF>
                            RUN CBODY (USE SAVEGO)
                            MCT(SAVEGO).CURRENT := MCT(SAVEGO).NEXT
                    ELSE
                            RUN ERRERS        [ERASE ERROR MSG]
                            ERRMSG := 0
                    FI
            ELSE
                    ERRMSG := MSG.NO
                    IF
                            <GO INDICATOR IS OFF>
                    THEN
                            <SET GO INDICATOR>
                    FI
                    IF
                            <A MSG ALREADY DISPLAYED>
                    THEN
                            RUN ERRERS
                    FI
            FI
    FI
CORP
```

A-38

```
PROC ERRDSP              [DISPLAY A MESSAGE]
    DATA
        SCALAR CBOX: INTEGER
    ATAD
    <FIND CONTROL KEY BOX IN MENU>
    CBOX := <CONTROL BOX MCT ADDRESS>
    RUN LIGHT (USE RECTAN)           [ZAP AREA FOR MESSAGE]
    <CONVERT ERRMSG NUMBER TO ERROR TEXT ADDRESS>
    RUN LTEXT (USE <TEXT ADDRESS>)
    ERRFLG := ERRMSG                 [INDICATE THAT MESSAGE IS DISPLAYED]
    <SET INSENSITIVITY BIT FOR EACH MENU ELEMENT WHERE
        MESSAGE IS DISPLAYED>
CORP
```

A-39

```
PROC ERRERS              [ERASE A DISPLAYED MESSAGE]
    DATA
        SCALAR  LOOP: INTEGER
                FOUND: LOGICAL
    ATAD
    IF
        ERRFLG <> 0
    THEN
        RUN LIGHT (USE RECTAN)              [ZAP MESSAGE AREA]
        LOOP := 3
        ELEMENT := CBOX
        FOUND := FALSE
        WHILE
            LOOP >0  OR  NOT FOUND
        DO
            ELEMENT := ELEMENT + MCTLEN
            IF
                IF
                    MCT(ELEMENT).CEL = GOKEY
                THEN
                    FOUND := TRUE
                ELSE
                    MCT(ELEMENT).CURRENT := 0
                    MCT(ELEMENT).NEXT := MCT(ELEMENT).DEFAULT
                    RUN DREL (USE ELEMENT)   [REDRAW ELEMENT]
                FI
            LOOP := LOOP - 1
        OD
        ERRFLG := 0
    FI
CORP
```

A-40

```
PROC GMSGAD (USE RQBID, ALT RQB)         GET RQB MESSAGE ADDRESS
    DATA
        SCALAR INDEX: INTEGER
    ATAD
    INDEX := RQBID * 2 + RQBLKS
    RQB := RQBREC(INDEX)
CORP
```

A-41

```
PROC MSGDSP (USE FLAG, MSG.NO)
    DATA
        SCALAR  MSG.NO,
                MSG.ADDR,
                POS: INTEGER
        SCALAR  MSG024: STRING(66)
        SCALAR  FINISHED: LOGICAL
    ATAD
    IF
        MSG.NO > 4000                  [MSG.NO IS AN ADDRESS]
        THEN
            MSG.ADDR := MSG.NO
            MSG.NO := 024
    POS := 0
    NUM.CHAR := 0
    FINISHED := FALSE
    WHILE
        NOT FINISHED
        DO
            MSG024(POS) := MSG.ADDR(POS)
            IF
                MSG024(POS) = 0  OR
                POS > 66
                THEN
                    FINISHED := TRUE
                ELSE
                    POS := POS + 1
            FI
        OD
    FI
    IF
        FLAG <> 0
        THEN
            RUN GRHST (USE 1)
        ELSE
            RUN ERRDSP
    FI
CORP
```

A-42

```
PROC RESET                    [GENERAL CANCEL FUNCTION]]
      DATA
              SCALAR  PTR: INTEGER
      ATAD
      PTR := MDT(CURRMA).ELST        [TOP ELEMENT ON STACK]
      WHILE
              PTR <> MDT(CURRMA).ESTK
      DO
              MEADDR := STACK(PTR).ELEMENT    [GET STACKED ELEMENT]
              IF
                      MCT(MEADDR).CURRENT.BORDER = <ON>
              THEN
                      RUN TOUCH (USE MEADDR)
              FI
              PTR := PTR - 1
      OD
      IF
              CAMTCH = 0              [CAMERA IN LAST SENTENCE?]
      THEN
              MEADDR = CAMTCH + MCTLEN        [POINT TO FIRST PRESET]
              WHILE
                      CAMLOP > 0
              DO
                      IF
                              MCT(MEADDR).CURRENT.BODY = <OFF>
                      THEN
                              RUN ESTADD (USE MEADDR, ALT ESADDR)
                              EST(ESADDR).ON := <OFF>
                              EST(ESADDR).PRE := <OFF>
                              EST(ESADDR).CE := 0
                              RUN GDELAD (USE MEADDR, ALT DEADDR)
                              RUN ZAPOUT (USE DEADDR)
                              MCT(MEADDR).NEXT := MCT(MEADDR).DEFAULT
                              MCT(MEADDR).CURRENT := MCT(MEADDR).DEFAULT
                      FI
                      CAMLOP := CAMLOP - 1
              OD
      FI
      CAMTCH := 0
      CURPRE := 0
      STACK.TOP := STACK.BOTTOM
      RUN GRMST (USE 0)       [ERASE MESSAGES]
CORP
```

A-43

```
PROC PREVUE
    DATA
            SCALAR PTR, PREVIEW.ID: INTEGER
    ATAD
    PTR := STACK.TOP
    PREVIEW.ID := 0
    WHILE
            (PTR > STACK.BOTTOM) AND (PREVIEW.ID = 0)
    DO
            MEADDR := STACK(PTR).ELEMENT
            RUN ESTADD (USE MEADDR, ALT ESADDR)
            IF
                    ESADDR <> 0
            THEN
                    IF
                            EST(ESADDR).TYPE = 1
                    THEN
                            PREVIEW.ID := EST(ESADDR).ID
                    ELSE
                            IF
                                    EST(ESADDR).CB <> 0
                            THEN
                                    PREVIEW.ID := EST(ESADDR).CB
                            FI
                    FI
            FI
    OD
    IF
            PREVIEW.ID <> 0
    THEN
            <SEND PREVIEW MESSAGE>
            PREVIEW.FLAG := OFF
    FI
CORP
```

A-44

```
PROC SLCTME (USE MEADDR)      (SELECT MUTUALLY EXCLUSIVE)
     DATA
          SCALAR CONFLICT, PTR: INTEGER
     ATAD
     RUN ESTADD (USE MEADDR, ALT ESADDR)
     CONFLICT := EST(ESADDR).CONF
     IF
          CONFLICT <> 0
     THEN
          PTR := STACK.BOTTOM
          WHILE
               PTR <= STACK.TOP
          DO
               ELEMENT := STACK(PTR).ELEMENT
               RUN ESTADD (USE ELEMENT, ALT ESADDR)
               IF
                    CONFLICT <> EST(ESADDR).CONF
               THEN
                    RUN TOUCH (USE ELEMENT) (RETOUCH KEY IN CONFLICT)
                    STACK(PTR).IFLAG := >FF
               FI
               PTR := PTR + 1
          OD
     FI
     IF
          PREVIEW.FLAG = ON
     THEN
          RUN PREVUE
     FI
CORP
```

A-45

```
PROC STDFLT                [SET MASTER MENU DEFAULTS]
    DATA
            SCALAR SENTENCE, I, J, PTR: INTEGER
            SCALAR FOUND, MORE: LOGICAL
    ATAD
    SENTENCE := 0
    MORE := TRUE
    WHILE
            MORE
    DO
            SENTENCE := SENTENCE + 10
            I := SENTENCE
            J := 0
            FOUND := FALSE
            WHILE
                    (J <= 9) OR (NOT FOUND)
            DO
                    I = I + J
                    PTR := 0
                    WHILE
                            (PTR <= ESTENT) AND (NOT FOUND)
                    DO
                            IF
                                    EST(PTR).INIT = I
                            THEN
                                    RUN FINDIT (USE EST(PTR).ID)
                                    IF
                                            FOUND
                                    THEN
                                            <STACK ELEMENT>
                                            STACK(TOP).IFLAG := ON
                                            RUN EXECIT
                                    FI
                            ELSE
                                    PTR := PTR + 1
                            FI
                    OD
                    J := J + 1
            OD
            IF
                    J > 1
            THEN
                    RUN FINDIT (USE 0)
                    RUN EXECIT
            ELSE
                    MORE := FALSE
            FI
    OD
CORP
```

A-46

```
PROC LSENDS            [DISCONNECT LOOSE ENDS]
    DATA
            SCALAR SOURCE: INTEGER
    ATAD
    ESADDR := 0
    WHILE
            ESADDR <= ESTENT  [THIS LOOP DISCONNECTS ALL SINKS]
                              [WHOSE SOURCE HAS BEEN DISCONNECTED, AND]
                              [DISCONNECTS ALL SOURCES WHICH HAVE NO SINKS]
    DO
            IF
                    EST(ESADDR).TYPE = 1
            THEN
                    SOURCE := EST(ESADDR).ID
                    IF
                            EST(ESADDR).FCN = <ON>
                    THEN
                            <LOOP THROUGH THE EST LOOKING FOR A SINK
                             WHICH IS CONTROLLED BY THIS SOURCE. IF NO
                             SINKS ARE FOUND, THEN SET EST(ESADDR).FCN
                             TO <OFF>>
                    FI
                    IF
                            EST(ESADDR).FCN = <OFF>
                    THEN
                            <LOOP THROUGH THE EST LOOKING FOR ANY SINK
                             WHICH IS CONTROLLED BY THIS SOURCE. WHEN
                             FOUND, SET EST FIELDS FCN, CB, COLOR TO OFF
                             AND SEND THE DISCONNECT MESSAGE>
                    FI
            FI
            ESADDR := ESADDR + 1
    OD
CORP
```

A-47

```
PROC BACK                    [BACK KEY, ALL MENUS]
     DATA
            SCALAR SAVE: INTEGER
     ATAD
     RUN RESET
     RQMENU := MDT(CURRMA).PM            [RQMENU = PREVIOUS MENU]
     RUN GMADDR (USE RQMENU, ALT MENUAD) [GET NEW MENU MDT ADDRESS]
     SAVE := MDT(MENUAD).PM              [SAVE NEW MENU PREVIOUS MENU]

<TO PRE     DRMENU ALWAYS SETS THE NEW MENUS "PREVIOUS MENU" FIELD TO>
     <BE THE MENU ID OF THE LAST MENU DRAWN.  TO AVOID GETTING>
     <INTO A MENU LOOP WHEN THE BACK KEY IS USED, WE LET THE   >
     <MENU WHICH WE ARE GOING BACK TO KEEP ITS EXISTING PREVIOUS>
     <MENU FIELD.>

RUN DRMENU
     MDT(MENUAD).PM := SAVE
CORP
```

A-48

```
PROC HELP                 [HELP KEY, ALL MENUS]
     DATA
     ATAD
     <POP THE STACK>
     IF
          ERRMSG <> 0     AND
          ERRMSG <> ERRFLG
     THEN
          RUN ERRDSP
     ELSE
          IF
               <STACK IS EMPTY>
          THEN
               PDMENU := MDT(CURRMA).HELP
          ELSE
               PDMENU := MCT(MEADDR).HELP
          FI
          IF
               PDMENU = 0
          THEN
               <DISPLAY NO HELP AVAILABLE MSG>
          ELSE
               RUN GRMST (USE 0)
          FI
     FI
CORP
```

A-49

```
PROC FINDIT (USE ID)    [FIND MCT ELEMENT WITH ESID OF ID]
    DATA
            SCALAR FOUND: LOGICAL
            SCALAR ID: INTEGER
    ATAC
    MEADDR := MDT(C03MNU).MCT
    FOUND := FALSE
    WHILE
            <MORE ELEMENTS> AND (NOT FOUND)
    DO
            IF
                    ID = 0
            THEN
                    IF
                            MCT(MEADDR).DEL = <GO KEY>
                    THEN
                            FOUND := TRUE
                    ELSE
                            MEADDR := MEADDR + MCTLEN
                    FI
            ELSE
                    IF
                            MCT(MEADDR).ESID = ID
                    THEN
                            FOUND := TRUE
                    FI
            FI
    OD
CORP
```

A-50

```
PROC EXECIT              [EXECUTE DEFAULT STACK]
    DATA
        SCALAR MORE: LOGICAL
    ATAD
    MORE := TRUE
    WHILE
        MORE
    DO
        MORE := FALSE
        IF
            STACK(TOP).IFLAG = <ON>
        THEN
            RUN <IMMEDIATE ACTION ROUTINE>
            MORE := TRUE
        ELSE
            IF
                STACK(TOP).DFLAG = <ON>
            THEN
                RUN <DELAYED ACTION ROUTINE>
                MORE := TRUE
            FI
        FI
    OD
CORP
```

A-51

```
PROC ZAPCAM (USE FLAG)     [ERASE A TOUCHED OR ACTIVE CAMERA]
    DATA
            SCALAR   FLAG:   LOGICAL
            SCALAR   LOOP:   INTEGER
            SCALAR   ELEM:   INTEGER
    ATAD
    IF
            CAMTCH = 0
    THEN
            <RETURN>
    CURPRE := 0                [SET CURRENT PRESET OFF]
    IF
            CAMTCH < 5000      [CAMERA IS NOT AN ADDRESS]
    THEN
            RUN FINDIT (USE CAMTCH, MEADDR)
            <POP STACK>
    FI
    RUN COMPRS
    RUN ESTADD     (USE MEADDR, ALT ESADDR)
    IF
            FLAG = 1
    THEN
            EST(ESADDR).FON := 0
    FI
    LOOP := EST(ESADDR).FLD2       [GET NUMBER OF CAMERA PRESETS]
    ELEM := CAMTCH
    WHILE
            LOOP > 0
    DO
            IF
                    MCT(ELEM).CURRENT.BORDER = <ON>
            THEN
                    MCT(ELEM).CURRENT.BORDER := <OFF>
                    RUN REFSTK (USE ELEM)
            FI
            ELEM := ELEM + MCTLEN
            IF
                    LOOP <> 0
            THEN
                    RUN ESTADD (USE ELEM, ALT ESADDR)
                    IF
                            FLAG = 1 OR EST(ESADDR).FON = 0
                    THEN
                            EST.(ESADDR).FON := 0
                            EST.(ESADDR).FPRE := 0
                            EST.(ESADDR).CB := 0
                            EST.(ESADDR).COLOR := 0
                            MCT(ELEM).NEXT.INSENSITIVE := <ON>
                    FI
            FI
            LOOP := LOOP - 1
    OD
    RUN CAMBTN
```

A-52

```
         CAMTCH := 0
         CAMLUP := 0
   CORP
```

A-53

```
PROC CAMRTN    [RETURN CAMERA TO LAST ACTIVE PRESET]
    DATA
        SCALAR LOOP: INTEGER
        SCALAR ELEM: INTEGER
    ATAD
    IF
        CAMTCH <> 0
    THEN
        LOOP := CAMLUP
        ELEM := CAMTCH
        WHILE
            LOOP > 0
        DO
            ELEM := ELEM + MCTLEN
            IF
                MCT(ELEM).CURRENT.BODY = <OFF>
            THEN
                LOOP := LOOP - 1
            ELSE
                RUN ESTADD (USE ELEM, ALT ESADDR)
                RQBNO := 5
                RUN GMSGAD (USE RQBNO, ALT RQB)
                RQB(7) := EST(ESADDR).FLD1
                RUN ESTADD (USE CAMTCH, ALT ESADDR)
                RQB(4) := EST(ESADDR).FLD1
                RUN SYSREQ (USE RQB)
            FI
        OD
    FI
CCRP
```

A-54

```
PROC REFSTK (USE ELEM)     [REMOVE ELEM FROM STACK]
    DATA
        SCALAR  PTR: INTEGER
    ATAD
    PTR := STACK.BOTTOM
    WHILE
        PTR <> STACK.TOP
    DO
        PTR := PTR - 4
        IF
            STACK(PTR).ELEMENT = ELEM
        THEN
            STACK(PTR).IMMEDIATE := <DELETE>
            PTR := STACK.TOP
        FI
    OD
CORP
```

A-55

```
PROC CHELEM     [CHANGE SINGLE MENU ELEMENT]
     RUN DRED2 (USE CHELM)
CORP
```

A-56

```
PROC 1AR001      [YES KEY, MENU C1]
    PDMENU := ROTMNU       [PENDING MENU = FIRST MENU]
    STACK.TOP := STACK.BOTTOM     [RESET STACK]
CORP
```

A-57

```
PROC IAR002      [NO KEY, MENU C1]
     PDMENU := CO2MNU           [PENDING MENU = SECOND CONTROL MENU]
     STACK.TOP := STACK.BOTTOM           [RESET STACK]
CORP
```

A-58

```
PROC IAR003     [BACK KEY, GENERAL MENUS]
        <POP STACK>
        RUN BACK
CORP
```

A-59

```
PROC 1AR004      [GO KEY, MENUS C2,R1,R2 AND R3]
        <POP STACK>
        IF
                ERRMSG = <OR>    [ERROR PENDING]
        THEN
                RUN GRMST        [RESET ERROR]
        FI
        RUN MNEXT                [GET NEXT MENU NUMBER]
        IF
                C03DRW <> 0
        THEN
                IF
                        PDMENU = R03MNU
                THEN
                        PDMENU := C03MNU    [SET TO MASTER MENU]
                FI
        FI
CORP
```

A-60

```
PROC LAR005      [TOUCH ELEMENT KEY]
    MEADDR := STACK(STACK.TOP).ELEMENT
    RUN SLCTME       [DO MUTUAL EXCLUSIVE TEST]
    RUN TOUCH (USE MEADDR)  [TOUCH ELEMENT]
    STACK(STACK.TOP).TFLAG := <OFF>
CCRP
```

A-61

```
PROC 1AR006      [X (CANCEL) KEY, MENU C2]
     IF          ERRMSG = <ON>   [ERROR PENDING]
     THEN
                 <POP STACK>
     ELSE
                 PDMENU := C06MNU [GO TO MENU C6]
                 STACK.TOP := STACK.BOTTOM
     FI
CORP
```

```
PROC 1AR007    [HELP KEY, GENERAL MENUS]
    <POP STACK>
    RUN HELP
CORP
```

A-63

```
PROC 1AR008      [GO KEY, MENUS C3 AND C4]
     <POP STACK>
     IF
              ERRMSG = <ON>
     THEN
              RUN GRMST (USE 0)        [RESET ERROR]
     FI
     IF
              <STACK IS NOT EMPTY>
     THEN
              RUN LEXSCN
              IF
                       LEXRC = 0
              THEN
                       STACK(STACK.TOP).DFLAG := <ON>
              FI
     ELSE
              IF
                       <MENU = C03MNU>
              THEN
                       R1 := 6          [SET ERROR NUMBER]
                       R0 := 1
                       RUN GRMST (USE R0,R1)   [INDICATE ERROR]
              ELSE
                       R1 := 10         [SET ERROR NUMBER]
                       R0 := 1
                       RUN GRMST (USE R0,R1)   [INDICATE ERROR]
              FI
     FI
CORP
```

A-64

```
PROC IAR009      [X KEY, MENUS R1, R2 AND R3]
    <POP STACK>
    IF
            ERRMSG = <ON>    [ERROR PENDING]
    THEN
            RUN GRMST (USE 0)       [RESET ERROR]
    ELSE
            STACK.TOP := STACK.BOTTOM    [RESET STACK]
            IF
                    C03DRW = <OFF>  [MENU C3 HAS NOT BEEN DISPLAYED]
            THEN
                    PDMENU := C02MNU
            ELSE
                    PDMENU := C03MNU
            FI
    FI
CORP
```

A-65

```
PROC IAR010     [X KEY, MENUS C4, C5, C6 AND ALL HELPS]
    <POP STACK>
    IF
        ERRMSG = <ON>    [ERROR IS PENDING]
    THEN
        RUN GRMST (USE 0)    [RESET ERROR]
    FI
CORP
```

A-66

```
PROC IAR011      [FRONT, LEFT AND RIGHT CAMERAS]
     DATA
          SCALAR LOOP,
                 PRESET,
                 CONTROL: INTEGER
     ATAD
     RUN SLCTME        [ELIMINATE MUTUALLY EXCLUSIVE TOUCHES]
     MEADDR := STACK(STACK.TOP).ELEMENT
     IF
          MEADDR = CAMTCH       [A RE-TOUCH]
     THEN
          RUN ZAPCAM            [ERASE THIS CAMERA]
          RUN RCMENU            [REDRAW THE MENU]
          <RETURN>
     FI
     RUN ESTADD (USE MEADDR, ALT ESADDR)
     LOOP := EST(ESADDR).FLD1   [GET NUMBER OF CAMERA PRESETS]
     CAMLOP := LOOP             [SAVE NUMBER OF PRESETS]
     CONTROL := EST(ESADDR).ID
     RUN TOUCH (USE MEADDR)
     WHILE
          LOOP > 0               [MORE PRESETS]
     DO
          MEADDR := MEADDR + MCTLEN       [POINT TO NEXT PRESET]
          RUN ESTADD (USE MEADDR, ALT ESADDR)
          IF
               EST(ESADDR).FLD2 <> 0      [PRESET HAS BEEN SET]
          THEN
               EST(ESADDR).PRESENT := <ON>
               EST(ESADDR).CB := CONTROL
          FI
          LOOP := LOOP - 1
     OD
     RUN RCMENU        [REDRAW THE MENU]
CORP
```

A-67

```
PROC 1AR013      [CCM KEY(PREVIEW), MENU C03]
    STACK(STACK.TOP).IFLAG := <OFF>
    MEADDR := STACK(STACK.TOP).ELEMENT
    RUN TOUCH (USE MEADDR)
    IF
            PRVFLG = <ON>     [PREVIEW IS ALREADY ON]
    THEN
            PRVFLG := <OFF>
    ELSE
            PRVFLG := MEADDR
            RUN PREVUE
    FI
CCRP
```

A-68

```
PROC IAR014            [CAMERA PRESETS, MENU C03]
    RUN SLCTME         [CHECK FOR MUTUAL EXCLUSIVITY]
    MEADDR := STACK(STACK.TOP).ELEMENT
    STACK(STACK.TOP).IFLAG := <OFF>
    RUN TOUCH (USE MEADDR)
    FOUND := FALSE
    IF
        MCT(MEADDR).CURRENT.BORDER = <OFF>
    THEN
        CURPRE := 0
        RUN CAMRTN     [RETURN CAMERA TO OLD PRESET]
    ELSE
        IF
            CURPRE <> 0    [THERE IS A CURRENT PRESET]
        THEN
            RUN TOUCH (USE CURPRE)   [RE-TOUCH OLD PRESET]
            RUN REFSTK (USE CURPRE)  [REMOVE CURPRE FROM STACK]
        FI
        CURPRE := MEADDR
        IF
            CAMTCH <> 0    [A CAMERA HAS BEEN TOUCHED]
        THEN
            RUN ESTADD (USE CAMTCH, ALT ESADDR)
            ROBID := 5     [CAMERA GO TO PRESET MESSAGE]
            RUN GMSGAD (USE ROBID, ALT ROB)
            ROB(4) := EST(ESADDR).FLD1    [CAM   TO MSG]
            RUN ESTADD (USE CURPRE, ALT ESADDR)
            ROB(7) := EST(ESADDR).FLD1    [PRESET TO MSG]
            RUN SYSREQ (USE ROB)
        FI
        IF
            PRVFLG = <ON>  [PREVIEW FLAG ON]
        THEN
            RUN PREVUE
        FI
    FI
CORP
```

A-69

```
PROC IAR015        [OVERHEAD TV MONITORS, MENU C03]
    IF      <STACK IS FULL>
    THEN
            RUN COMPRS
    FI
    MEADDR := STACK(STACK.TOP).ELEMENT
    STACK(STACK.TOP).IFLAG := <OFF>
    RUN TOUCH (USE MEADDR)
    IF      MCT(MEADDR).ID <> 27    [LEFT MONITOR IS 27]
    THEN
            MEADDR := MEADDR - MCTLEN       [POINT TO LEFT TV MONITOR]
    ELSE
            MEADDR := MEADDR + MCTLEN       [POINT TO RIGHT TV MONITOR]
    FI
    RUN TOUCH (USE MEADDR)
    STACK.TOP := STACK.TOP - 4
    STACK(STACK.TOP).ELEMENT := MEADDR      [STACK OTHER MONITOR]
    STACK(STACK.TOP).IFLAG := <OFF>
    STACK(STACK.TOP).DFLAG := <OFF>
CORP
```

A-70

```
PROC IAKUIN              [AUDIO KEY]
    DATA
        SCALAR VALUE: INTEGER
    ATAD
    MEADDR := STACK(STACK.TOP).ELEMENT
    RQBID := 7               [AUDIO MESSAGE ID]
    RUN GMSGAD (USE RQBID, ALT RQB)      [GET AUDIO MESSAGE]
    IF
        MCT(MEADDR).CURRENT.BODY = <ON>      [AUDIO ON?]
    THEN                                     [YES]
        VALUE := 0
        RQB(RQBID).PARAMETERS := -1
    ELSE
        VALUE := 1
        RQB(RQBID).PARAMETERS := 1
    FI
    RUN SYSREQ               [SEND MESSAGE]
    RUN ESTADD (USE MEADDR, ALT ESADDR)
    EST(ESADDR).ON := VALUE
    RUN RDMENU               [RE-DRAW THE MENU]
CORP
```

A-71

```
PROC IAR01X        [X (CANCEL) KEY, MENU C03]
     DATA
              SCALAR PTR: INTEGER
              SCALAR ELEM: INTEGER
     ATAC
     STACK.TOP := STACK.TOP + 4      [POP X KEY FROM STACK]
     IF
              ERRMSG = <ON>                   [ERROR PENDING]
     THEN
              RUN GRMST (USE 0)              [RESET ERROR]
     ELSE
              RUN COMPRS                     [COMPRESS STACK]
              IF
                       <STACK IS EMPTY>
              THEN
                       ERRMSG := 4
                       RUN GRMST (USE ERRMSG)
              ELSE
                       RUN SRTES              [SORT STACK]
                       IF
                                <HI-RES ELEMENT IS ON STACK>
                       THEN
                                ERRMSG := 2
                                RUN GRMST (USE ERRMSG)
                       ELSE
                                ERRMSG := 0
                                PTR := STACK.BOTTOM
                                WHILE
                                         PTR <= STACK.TOP AND ERRMSG = 0
                                DO
                                         ELEM := STACK(PTR).ELEMENT
                                         RUN ESTADD (USE ELEM, ALT ESADDR)
                                         IF
                                                  EST(ESADDR).ON = <OFF>
                                         THEN
                                                  ERRMSG := 5
                                                  RUN GRMST (USE ERRMSG)
                                         FI
                                         PTR := PTR - 4   [POINT TO NEXT ELEMENT]
                                OD
                                IF
                                         ERRMSG = 0
                                THEN
                                         PTR := STACK.BOTTOM
                                         WHILE
                                                  PTR <= STACK.TOP
                                         DO
                                                  ELEM := STACK(PTR).ELEMENT
                                                  RUN ESTADD (USE ELEM, ALT ESADDR)
                                                  RUN TOUCH (USE ELEM)
                                                  EST(ESADDR).ON := <OFF>
                                                  <SEND DISCONNECT MESSAGE>
                                                  PTR := PTR - 4
```

A-72

```
                                            UD
                                            RUN LSENDS
                                            RUN RCMENU
                                  FI
                        FI
              FI
        FI
CCRP
```

A-73

```
PROC 1AR017      [OTHER KEY, MENU C03]
    PDMENU := C04MNU          [PENDING MENU = MENU OF MENUS]
    RUN RESET                 [ELIMINATE ALL MENU TOUCHES]
    STACK.TOP := STACK.BOTTOM     [RESET STACK]
CORP
```

A-74

```
PROC IAR019       (CAMERA KEY, MENU C05)
    DATA
        SCALAR  CAMERA,
                CAM.ID,
                CAM.NO: INTEGER
    ATAD
    STACK.TOP := STACK.BOTTOM        [RESET STACK]
    MEADDR := STACK(STACK.TOP).ELEMENT
    STACK.TOP := STACK.BOTTOM        [RESET STACK]
    IF
        <CAMERA IS ON>
    THEN
        RUN IAR027       [TURN OFF CAMERA MOTION]
        RUN IAR19A       [DISCONNECT THIS CAMERA]
    FI
    RUN ESTADD (USE MEADDR, ALT ESADDR)
    IF
        MEADDR = CAMERA             [A RE-TOUCH]
    THEN
        CAMERA := 0
    ELSE
        EST(ESADDR).ON := <ON>
        CAMERA := MEADDR
        CAM.NO := EST(ESADDR).FLD1
        CAM.ID := EST(ESADDR).FLD2
        ROBID := 0
        RUN GSGAD (USE ROBID, ALT ROB)
        ROB(4) := CAM.NO
        RUN SYSREQ (USE ROB)
        RUN IAR19A       [CONNECT CAMERA]
    FI
    RUN REMENU
CORP
```

A-75

```
PROC IAR19A (USE SWITCH)        [CONNECT/DISCONNECT CAMERA TO CCM]
    IF          <CAMERA IS ON>
    THEN
        IF          <SWITCH = DISCONNECT>
        THEN
            ROBID := 6          [DISCONNECT MESSAGE]
            RUN GMSGAD (USE ROBID, ALT ROB)
            ROB(6) := <EST ID OF CCM>
            RUN ESTADD (USE CAMERA, ALT ESADDR)
            EST(ESADDR).ON := <OFF>
            RUN SYSREQ (USE ROB)
        ELSE
            ROBID := 9          [CONNECT MESSAGE]
            RUN GMSGAD (USE ROBID, ALT ROB)
            ROB(2) := 6         [SET LENGTH OF MESSAGE]
            ROB(6) := CAM.ID
            ROB(8) := <EST ID OF CCM>
            RUN SYSREQ (USE ROB)
        FI
    FI
CORP
```

A-76

```
PROC IAR020      [BACK KEY, MENU C05]
     STACK.TOP := STACK.BOTTOM        [RESET STACK]
     RUN IAR027                       [STOP CAMERA MOTION]
     RUN IAR19A (USE DISCONNECT)      [DISCONNECT CAMERA]
     CAMERA := 0
     RUN BACK
CORP
```

A-77

```
PROC IAR021        [HELP KEY, MENU C05]
    IF          <ERROR PENDING AND ERROR NOT DISPLAYED>
    THEN
                STACK.TOP := STACK.TOP + 4          [POP STACK]
                RUN ERRDSP                          [DISPLAY ERROR]
    ELSE
                RUN IAR027                          [STOP CAMERA MOTION]
                RUN IAR19A (USE DISCONNECT)         [DISCONNECT CAMERA]
                CAMERA := 0
                RUN HELP
    FI
CORP
```

```
PROC IAR022          [CAMERA PRESET KEYS, CAMERA POSITIONING MENU]
    DATA
            SCALAR ELEM: INTEGER
    ATAD
    ELEM := STACK(STACK.TOP).ELEMENT
    STACK.TOP := STACK.BOTTOM        [RESET STACK]
    IF
            <CAMERA NOT ON>
    THEN
            ERRMSG := 12
            RUN GRMST (USE ERRMSG)
    ELSE
            PRESET := ELEM
            RUN IAR027          [STOP CAMERA MOTION]
            RUN ESTADD (USE ELEM, ALT ESADDR)
            EST(ESADDR).ON := 1
            RUN RDMENU
            RQBID := 4
            RUN GMSGAD (USE RQBID, ALT RQB)
            RQB(4) := CAM.NO
            RQB(6) := EST(ESADDR).FLD1
            RUN SYSREQ (USE RQB)
            EST(ESADDR).ON := <OFF>
            RUN LIGHT (USE WAIT)
            RUN RDMENU
            <DETERMINE EST ID OF TOUCHED PRESET KEY>
            EST(ESADDR).FLD2 := -1   [INDICATE THAT PRESET IS SET]
    FI
CCRP
```

A-79

```
PROC IAR023                [ZOOM KEYS, CAMERA POSITIONING MENU]
     DATA
              SCALAR   INDEX,
                       CAMERA: INTEGER
              ARRAY    ZOOM (1:4) OF ZOOM-ENTRY
              RECORD   ZOOM-ENTRY
                       .STEP,
                       .DIRECTION: INTEGER
     ATAD
              MEADDR := STACK(STACK.TOP).ELEMENT
              STACK.TOP := STACK.BOTTOM
     IF
              CAMERA = 0
     THEN
              ERRMSG := 12
              RUN GRMST (USE ERRMSG)
     ELSE
              RQBID := 2                    [ZOOM MESSAGE]
              RUN GMSGAD (USE RQBID, ALT RQB)
              RQB(RQBID).MODIFIER := CAMERA.NUMBER
              MCT(MEADDR).NEXT.BODY := <ON>
              RUN SYSREQ (USE RQB)
              RUN RDMENU
              INDEX := (MCT(MEADDR).ID - 21)
              RQB(RQBID).PARAMETERS := ZOOM(INDEX).STEP
              RQB(RQBID).PARAMETERS(2) := ZOOM(INDEX).DIRECTION
              MCT(MEADDR).NEXT.BODY := <OFF>
              RUN RDMENU
     FI
CORP
```

A-80

```
PROC IAR024              [FOCUS KEYS, CAMERA POSITIONING MENU]
     DATA
          SCALAR  INDEX,
                  CAMERA: INTEGER
          ARRAY   FOCUS (1:4) OF FOCUS-ENTRY
          RECORD  FOCUS-ENTRY
                    .STEP,
                    .DIRECTION: INTEGER
     ATAD
     MEADDR := STACK(STACK.TOP).ELEMENT
     STACK.TOP := STACK.BOTTOM
     IF
          CAMERA = 0
     THEN
          ERRMSG := 12
          RUN GRMST (USE ERRMSG)
     ELSE
          RQBID := 3                    [FOCUS MESSAGE]
          RUN GMSGAD (USE RQBID, ALT RQB)
          RQB(RQBID).MODIFIER := CAMERA.NUMBER
          MCT(MEADDR).NEXT.BODY := <ON>
          RUN SYSREQ (USE RQB)
          RUN RDMENU
          INDEX := (MCT(MEADDR).ID - 25)
          RQB(RQBID).PARAMETERS := FOCUS(INDEX).STEP
          RQB(RQBID).PARAMETERS(2) := FOCUS(INDEX).DIRECTION
          MCT(MEADDR).NEXT.BODY := <OFF>
          RUN RDMENU
     FI
CCRP
```

A-81

```
PROC IAR025                 [PAN/TILT, CAMERA POSITIONING MENU]
    DATA
            SCALAR   CAMERA,
                     SLEW.TOUCH,
                     INDEX: INTEGER
            ARRAY    SLEW (1:8) OF SLEW-ENTRY
            RECORD   SLEW-ENTRY
                         .PAN,
                         .TILT: INTEGER
    ATAD
    MEADDR := STACK(STACK.TOP).ELEMENT
    STACK.TOP := STACK.BOTTOM
    IF
            CAMERA = 0
        THEN
            ERRMSG := 12
            RUN GRMST (USE ERRMSG)
        ELSE
            ROBID := 1              [SLEW MESSAGE]
            RUN GMSGAD (USE ROBID, ALT RQB)
            RQB(ROBID).MODIFIER := CAMERA.NUMBER
            IF
                    MEADDR = SLEW.TOUCH       (A RE-TOUCH?)
                THEN                          [YES]
                    RQB(ROBID).PARAMETERS := <OFF>        [PAN]
                    RQB(ROBID).PARAMETERS(2) := <OFF>     [TILT]
                    RUN SYSREQ (USE RQB)
                ELSE
                    IF
                            SLEW.TOUCH <> 0        [ANOTHER SLEW ON?]
                        THEN                       [YES]
                            MCT(SLEW.TOUCH).NEXT.BODY := <OFF>
                            RQB(ROBID).PARAMETERS := <OFF>
                            RQB(ROBID).PARAMETERS(2) := <OFF>
                            RUN SYSREQ (USE RQB)
                    FI
                    MCT(MEADDR).NEXT.BODY := <ON>
                    INDEX := (MCT(MEADDR).ID - 29)
                    RQB(ROBID).PARAMETERS := SLEW(INDEX).PAN
                    RQB(ROBID).PARAMETERS(2) := SLEW(INDEX).TILT
                    RUN SYSREQ (USE RQB)
            FI
    FI
    RUN RDMENU
CORP

A-82
```

```
PROC 1AR026      [GO KEY, MENU C05]
    RUN 1AR027      [STOP CAMERA MOTION]
    RUN 1AR19A (USE DISCONNECT)
    CAMERA := 0
    RUN MNEXT       [GET NEXT MENU NUMBER]
    RUN GRMST (USE 0)      [RESET ANY PENDING ERRORS]
CORP
```

A-83

```
PROC 1AR027      [STOP SLEW CAMERA MOTION]
    DATA
            SCALAR  CAMERA,
                    SLEW.TOUCH,
                    PRESET: INTEGER
    ATAD
    IF
            <CAMERA ON AND SLEW ON>
    THEN
            MCT(SLEW.TOUCH).NEXT.BODY := <OFF>
            RQBID := 1
            RUN GMSGAD (USE RQBID, ALT RQB)
            RQB(6) := <OFF>
            RUN SYSREQ (USE RQB)
            SLEW.TOUCH := 0
            RQBID := 9
            RUN GMSGAD (USE RQBID, ALT RQB)
            RUN SYSREQ (USE RQB)      [DO A WAIT TIME]
            RUN RDMENU
    FI
CORP
```

A-84

```
PROC RSTPST        [RESET MASTER MENU ACTIVE PRESETS]
    DATA
            SCALAR  LEFT,
                    PTR,
                    TYPE:   INTEGER
    ATAD
    IF
            <CAMERA TOUCHED>
    THEN
            RUN ESTADD (USE CAMERA, ALT ESADDR)
            IF
                    EST(ESADDR) = <LEFT CAMERA>
            THEN
                    PTR := <LEFT CAMERA PRESET 1 EST ID>
                    TYPE := >0400
            ELSE
                    PTR := <RIGHT CAMERA PRESET 1 EST ID>
                    TYPE := >0500
            FI
            FOUND := FALSE
            WHILE
                    EST(PTR).TYPE = TYPE AND NOT FOUND
            DO
                    PTR := PTR + ESTLEN
                    IF
                            EST(PTR).ON = 1            [PRESET IS ON]
                    THEN
                            FOUND := TRUE
                            EST(PTR).ON := <OFF>
                            EST(PTR).COLOR := 0
                            EST(PTR).CB := 0
                            EST(PTR).PRESENT := 0
                    FI
            OD
    FI
CORP
```

A-85

```
PROC DAR001        [SOURCE - SINK CONNECTION]
    DATA
        SCALAR  SOURCE,
                CONTROLLER,
                COLOR,
                PTR,
                LOOP: INTEGER
        SCALAR  KEEP,
                PRESET: LOGICAL
    ATAD

ROBID := 8    [CONNECT MESSAGE]
    RUN GMSGAD (USE ROBID, ALT ROB)
    MEADDR := STACK(STACK.TOP).ELEMENT
    SOURCE := MEADDR
    MCT(MEADDR).NEXT.BORDER := <OFF>
    RUN ESTADD (USE MEADDR, ALT ESADDR)
    ROB(ROBID).PARAMETERS := SOURCE
    EST(ESADDR).FON := <ON>
    CONTROLLER := EST(ESADDR).ID
    COLOR := EST(ESADDR).COLOR
    WHILE
        <STACK NOT EMPTY>
    DO
        RUN POP-ELEM (ALT MEADDR)
        MCT(MEADDR).NEXT.BORDER := <OFF>
        RUN ESTADD (USE MEADDR, ALT ESADDR)
        IF
            MEADDR = <STILL FRAME>  OR
            MEADDR = <AUTO TRANSMIT>
        THEN
            <DETERMINE WHICH KEY WILL GO
             ON AND WHICH WILL GO OFF, BASED
             ON PREVIOUS STATE>
        FI
        ROB(ROBID).PARAMETERS(2) := EST(ESADDR).ID
        IF
            EST(ESADDR).COLOR <> COLOR  OR
            EST(ESADDR).FON = <OFF>
        THEN
            IF
                EST(ESADDR).TYPE =< 1
            THEN
                IF
                    EST(ESADDR).FON <> 0
                THEN
                    ROB(ROBID).PARAMETERS := EST(ESADDR).CB
                    ROB(ROBID).PARAMETERS(2) := EST(ESADDR).ID
                    RUN SYSREQ (USE ROB)
                    ROB(ROBID).PARAMETERS := SOURCE
                    ROB(ROBID).PARAMETERS(2) := EST(ESADDR).ID
                FI
                RUN SYSREQ (USE ROB)
```

```
                    FI
                    EST(ESADDR).CB := CONTROL
                    EST(ESADDR).COLOR := COLOR
                    EST(ESADDR).FCN := <ON>
                    MCT(MEADDR).NEXT.BODY := <OFF>
                    MCT(MEADDR).CURRENT.BODY := <OFF>
            FI
        OD
        IF
                SOURCE = CAMTCH            [SOURCE WAS A TOUCHED CAMERA]
        THEN
                PRESET := <TRUE IF A PRESET WAS TOUCHED,
                          FALSE IF A PRESET WAS NOT TOUCHED>
            PTR := CAMTCH
            WHILE
                    CAMLOP > 0
            DO
                    PTR := PTR + MC1LEN
                    KEEP := FALSE
                    IF
                            (PRESET AND MCT(PTR).CURRENT.BORDER = <OFF>)
                            OR
                            (NOT PRESET AND MCT(PTR).CURRENT.BODY = <OFF>)
                    THEN
                            RUN ESTADD (USE PTR, ALT ESADDR)
                            EST(ESADDR).CB := 0
                            EST(ESADDR).FCN := <OFF>
                            EST(ESADDR).FPRE := <OFF>
                            RUN ZAPOUT (USE PTR)    [ERASE PRESET]
                            MCT(PTR).CURRENT := MCT(PTR).NEXT
                    FI
                    CAMLOP := CAMLOP - 1
            OD
            CAMTCH := 0
        FI
        RUN LSENDS
CORP
```

```
PROC DAR002  (SELECT OTHER FUNCTION MENU KEYS) MEADDR := STACK(STACK.TOP).ELEMENT RUN ESTADD (USE MEADDR
ALT ESADDR)     PDMENU := EST(ESADDR).FLD1 RUN RESET CURP
```

```
PROC DAR003     (HI-RES SCREEN)
    STACK(STACK.TOP).DFLAG := <OFF>
    ERRMSG := 2
    RUN GRMST (USE ERRMSG)
CORP
```

A-89

```
PROC DAR004      [PREVIEW WITH NO SOURCE]
     STACK(STACK.TOP).DFLAG := <OFF>
     ERRMSG := 3
     RUN GRMST (USR ERRMSG)
CORP
```

A-90

```
*================================================================
*PROC = CCTSPI
*
*    PROCEDURE NAME: CCTSPI
*
*    CCTSPI RECEIVES X AND Y TOUCH COORDINATES FROM THE
*    TOUCH SENSITIVE PANEL CONTROLLER.  IT LOCATES THE
*    ELEMENT TOUCHED (IF ANY), STACKS IT AND SETS ITS
*    IMMEDIATE FLAG ON.  THE NEXT PHASE OF THIS PROCEDURE
*    CONTINUALLY CHECKS THE TOP ELEMENT ON THE STACK TO
*    DETERMINE IF AN IMMEDIATE OR DELAYED ACTION SHOULD BE
*    CALLED.  AFTER EXECUTION OF AN ACTION ROUTINE, THE
*    TOP OF THE STACK IS AGAIN EXAMINED.  IF THE STACK IS
*    EMPTY OR BOTH FLAGS ARE OFF, THE PROCEDURE RETURNS TO
*    THE CALLER.
*
*    INPUT: R0 CONTAINS THE X COORDINATE
*           R1 CONTAINS THE Y COORDINATE
*    OUTPUT: NONE
*    RESULT: VARIABLE BASED ON ELEMENT STACKED
*    TO CALL: BL @CCTSPI
*
*================================================================
```

A-91

```
*================================================================
*PROC = GACTAD
*
*    PROCEDURE NAME: GACTAD
*
*    GACTAD WILL DERIVE THE ADDRESS OF A ACTION ROUTINE.
*
*    INPUT: R3 CONTAINS THE ACTION ROUTINE ADDRESS
*    OUTPUT: R3 CONTAINS THE MAPPED ADDRESS
*    RESULT: NONE
*    TO CALL: BL @GACTAD
*
*================================================================
```

A-92

```
*===================================================================
*PROC = FINDEL
*
*   PROCEDURE NAME: FINDEL
*
*   FINDEL LOOPS THROUGH THE CURRENT MENU'S MCT TABLE TO
*   DETERMINE WHICH MENU ELEMENT WAS TOUCHED.  FIRST, THE
*   HERE COORDINATES IN THE MCT ARE SUBTRACTED FROM THE
*   COORDINATES SUPPLIED BY THE TOUCH SENSITIVE PANEL.  IF
*   EITHER X OR Y VALUE IS MADE NEGATIVE BY THE SUBTRACTION,
*   THEN THIS WAS NOT THE ELEMENT TOUCHED.  NEXT, THE
*   ELEMENT'S DISPLAY ELEMENT LIBRARY (DEL) ENTRY IS
*   FOUND.  IF THE COORDINATES ARE BOTH LESS THAN THE
*   X AND Y TOLERANCES FOUND IN THE DEL, THEN THIS IS THE
*   TOUCHED ELEMENT.  IF NOT, THE SEARCH CONTINUES UNTIL
*   ALL ELEMENTS ARE EXAMINED.  IF AN ELEMENT DOES NOT
*   HAVE A DEL ENTRY, OR ITS INSENSITIVE OR INHIBIT MCT
*   BITS ARE ON, THEN DO NOT TEST THIS ELEMENT.
*
*   INPUT: R0 CONTAINS X COORDINATE
*          R1 CONTAINS Y COORDINATE
*   OUTPUT: R2 CONTAINS THE TOUCHED ELEMENTS MCT ADDRESS,
*           OR ZERO IF NO ELEMENT IS FOUND.
*   RESULT: TOUCHED ELEMENT IS LOCATED IN THE MCT.
*   TO CALL: BL @FINDEL
*
*===================================================================
```

A-93

```
*================================================================
*PROC = LEXSCN
*
*    PROCEDDURE NAME: LEXSCN
*
*    LEXSCN EXAMINES THE ELEMENT STACK TO DETERMINE IF ENOUGH
*    INFORMATION HAS BEEN GIVEN IN A CORRECT MANNER SO
*    THAT SUBSEQUENT ROUTINE ACTIONS WILL BE SUCCESSFUL.
*
*    BASIC REQUIRMENTS ARE SIMPLE.  EACH SENTENCE MUST
*    INCLUDE A SOURCE (CAMERA, SLIDE CAMERA, RECEIVE) AND
*    ONE OR MORE DESTINATIONS (TV SCREEN, OVERHEAD MONITORS,
*    SEND).  IF THE ELEMENT STACK DOES NOT INCLUDE A SOURCE
*    BUT DOES HAVE AN ACTIVE DESTINATION (A DESTINATION
*    WHICH IS CURRENTLY LINKED TO A SOURCE), THE SOURCE FOR
*    THAT DESTINATION IS PLACED ON THE STACK.
*
*    IF LEXSCN DETECTS AN ERROR, IT SETS LEXRC TO TWO (2)
*    AND INDICATES THE APPROPRIATE ERROR.
*
*    INPUT: ELEMENT STACK
*    OUTPUT: NONE
*    RESULT: ELEMENTS EITHER PASS OR FAIL SCAN
*    TO CALL: BL @LEXSCN
*
*================================================================
```

A-94

```
*================================================================
*PROC = COMPRS
*
*   PROCEDURE NAME: COMPRS
*
*   COMPRS EXAMINES THE CURRENT SENTENCE STACK AND DELETES
*   ALL DOUBLE TOUCHES FROM THE STACK. THIS PROCEDURE
*   PROCEEDS IN TWO PHASES.  FIRST, STORE THE TOP STACK
*   ELEMENT AND THEN SCAN THROUGH THE REST OF THE STACK
*   TO FIND AN IDENTICAL ELEMENT.
*   IF A MATCH IS FOUND, STASH >FF INTO THE
*   IMMEDIATE FLAG AREA OF BOTH ELEMENTS ON THE STACK.
*   NOW, POINT TO THE NEXT ELEMENT ON THE STACK WHICH HAS
*   NOT BEEN FLAGGED FOR DELETION, AND TRY TO FIND A MATCH
*   FOR IT.  THIS PROCEDURE CONTINUES UNTIL ALL ELEMENTS
*   HAVE BEEN EXAMINED.
*
*   THE SECOND PHASE OF COMPRS STARTS FROM THE BOTTOM OF
*   THE STACK AND PROCEEDS UPWARD.  ALL ELEMENTS WHICH
*   HAVE NOT BEEN FLAGGED FOR DELETION ARE COPIED DOWN
*   ONTO THE STACK, OVER WRITING ELEMENTS WHICH HAVE BEEN
*   FLAGGED FOR DELETION.
*
*   INPUT: CURRENT SENTENCE STACK
*   OUTPUT: COMPRESSED STACK
*   RESULT: DUPLICATE TOUCHES ARE ELIMINATED FROM THE STACK
*   TO CALL: BL @COMPRS
*
*================================================================
```

A-95

```
*================================================================
*PROC = SRTES
*
*    PROCEDURE NAME: SRTES
*
*    SRTES SORTS THE ELEMENT STACK BY THE SYNTACTIC CLASS OF
*    ITS ELEMENTS.  THE LOWEST CLASS IS SORTED TO THE TOP OF
*    THE STACK.  THE SORT IS DONE SIMPLY BY USING THE SYNTAX
*    CLASS OF EACH ELEMENT.
*
*    INPUT: SENTENCE STACK
*    OUTPUT: SORTED STACK
*    RESULT: STACK IS SORTED BY SYNTAX CLASS
*    TO CALL: BL @SRTES
*
*================================================================
```

A-96

```
*================================================================
*MOD = MHANDLER
*
*    MODULE MHANDLER CONTAINS THE MENU HANDLER ROUTINES.
*    ALL ROUTINES WHICH CREATE, MODIFY OR DELETE THE MENUS
*    IS CONTAINED HERE.
*
*================================================================
```

```
*==================================================================
*DATA
*
*     MODULE MHANDLER DATA FIELDS
*
*==================================================================
```

A-98

```
*===================================================================
*PROC = DRMENU
*
*  PROCEDURE NAME: DRMENU
*
*  DRMENU IS THE ROUTINE WHICH MANAGES THE DRAWING OF
*  MENUS.  IF THE REQUESTED MENU IS THE CURRENT MENU, THEN
*  DRMENU CALLS RDMENU (RE-DRAW MENU).  IF THE REQUESTED
*  MENU IS NOT THE CURRENT MENU, DRMENU CHECKS TO SEE IF
*  THE REQUESTED MENU IS IN IMAGE MEMORY.  IF THIS IS THE
*  CASE, SWMENU (SWAP MENU) IS CALLED.  IF THE REQUESTED
*  MENU IS NOT THE CURRENT MENU AND IT IS NOT IN IMAGE
*  MEMORY, DRMENU WILL DRAW THE MENU.
*
*  DRMENU LOOPS THROUGH EACH MENU ELEMENT CONTAINED IN
*  THE MENU CONTROL TABLE (MCT) FOR THIS MENU.  IF THE
*  ELEMENT HAS NOT BEEN DISPLAYED BEFORE, THE DEFAULT
*  STATUS IS MOVED INTO THE NEXT STATUS FIELD.  IF THIS
*  MENU HAS BEEN DISPLAYED BEFORE, THEN SIMPLY CLEAR THE
*  CURRENT STATUS FIELD.
*
*  THE SUBSEQUENT MENU HANDLER ROUTINES KNOW WHAT FUNCTIONS
*  THEY MUST PERFORM BY THE CURRENT AND NEXT STATUS FIELDS.
*  EACH BIT IN THESE BYTES CORRESPONDS TO PART OF THE MENU
*  ELEMENT.  IF THE CORRESPONDING BITS IN THE CURRENT
*  STATUS EQUAL THE BITS IN THE NEXT STATUS, THEN THE
*  STATUS OF THIS PORTION OF THE ELEMENT IS UNCHANGED,
*  AND THE MENU ROUTINES RESPONSIBLE WILL DO NOTHING.
*  IF THE CORRESPONDING BITS ARE DIFFERENT,
*  THEN THE ASSOCIATED MENU ROUTINE WILL MAKE
*  THE ELEMENT CHANGES AND WILL UPDATE THE CURRENT STATUS.
*  IF A BIT IS ON (ONE) THEN IT SIGNALS THAT THE FEATURE IT
*  CORRESPONDS TO IS ON.  IF A BIT IS OFF (ZERO) THEN THIS
*  SIGNALS THAT THE FEATURE IS OFF.  WHEN THE BITS IN
*  THE TWO STATUS FIELDS DIFFER, THE NEXT STATUS BITS
*  DETERMINE WHAT WILL BE DONE.  THE CURRENT STATUS BITS
*  INDICATE HOW THE ELEMENT APPEARS CURRENTLY.
*
*  THE FOLLOWING CHART SHOWS THE FEATURES ASSOCIATED WITH
*  EACH BIT POSITION.  THESE BITS VALUES ARE IN THE
*  CURRENT, NEXT AND DEFAULT STATUS FIELDS OF THE MCT FILE.
*
*     BIT    HEX VALUE    ASSOCIATED FEATURE
*     ===    =========    ==================================
*      1        >80       ELEMENT BORDER ON/OFF
*      2        >40       ELEMENT BODY ON/OFF
*      3        >20       ELEMENT INSENSITIVITY ON/OFF
*      4        >10       ELEMENT INHIBIT ON/OFF
*      5        >08       ELEMENT TEXT ON/OFF
*      6        >04       RESERVED FOR FUTURE USE
*      7        >02       RESERVED FOR FUTURE USE
*      8        >01       NOT DRAWN ON/OFF (ONLY IN NEXT)
*
*  BIT 1--IF THIS BIT IS ON, THEN ELEMENT BORDER IS WHITE.
*     IF IT IS OFF, THE BORDER IS BLACK. IF BIT 1 IS OFF
```

A-99

```
*       IN THE CURRENT STATUS AND ON IN THE NEXT STATUS,
*       ROUTINE CBORD WILL TURN THE BORDER ON (TO WHITE).
*       IF IT IS ON IN THE CURRENT STATUS AND OFF IN THE
*       NEXT STATUS, THEN CBORD WILL TURN THE BORDER OFF.
*
*   BIT 2--IF THIS BIT IS ON, THEN THE ELEMENT BODY IS ON.
*       THE ON COLOR IS DICTATED EITHER BY MCT FIELD MCCON
*       OR BY THE ENTITY STATUS TABLE (EXPLAINED IN PROCEDURE
*       ESTACD). IF BIT 2 IS OFF, THEN THE ELEMENT BODY IS
*       OFF.  THE OFF COLOR IS ALWAYS INDICATED BY MCT FIELD
*       MCCOFF.  THE ROUTINE CBODY HANDLES THE BODY.
*
*   BIT 3--IF BIT 3 IS ON, THEN THE ELEMENT IS INSENSITIVE
*       TO THE TOUCH.  IF BIT 3 IS OFF, THEN IT IS SENSITIVE
*       AND IS THEREFORE A VALID SENTENCE ELEMENT.
*
*   BIT 4--IF BIT 4 IS ON, THEN THE DRAWING OF THE ELEMENT
*       IS INHIBITED, IT WILL NOT APPEAR ON THE MENU.  IF
*       IT IS OFF, THEN THE ELEMENT WILL BE DISPLAYED AS
*       PART OF THE MENU.  ROUTINE ZAPOUT HAS THE CAPABILITY
*       OF ERASING AN ALREADY DISPLAYED ELEMENT.  THE
*       DREL ROUTINE WILL DRAW AN ELEMENT THAT WAS PREVIOUSLY
*       INHIBITED.
*
*   BIT 5--IF THIS BIT IS ON, THEN THE ELEMENT'S TEXT FIELD
*       (IF ANY) WILL BE DRAWN INSIDE THE BODY OF THE
*       ELEMENT.  IF BIT 5 IS OFF, THEN THE TEXT WILL NOT
*       BE DISPLAYED.  ROUTINE CTEXT HANDLES THE ELEMENT
*       TEXT.
*
*   BIT 8--THIS BIT IS ONLY USED IN THE NEXT STATUS FIELD AS
*       AN INDICATOR THAT THIS ELEMENT HAS NEVER BEEN
*       DISPLAYED BEFORE.  THROUGH THIS BIT, ROUTINE DRMENU
*       KNOWS WHETHER TO USE THE DEFAULT STATUS BYTE OR
*       THE NEXT STATUS BYTE TO DRAW THE ELEMENT.
*
*
*   INPUT: RQMENU CONTAINS THE REQUESTED MENU ID.
*   OUTPUT: NONE
*   RESULT: MENU DISPLAYED ON SCREEN
*   TO CALL: BLWP @DRMENU
*
*================================================================
```

A-100

```
*================================================================
*PROC = GMADDR
*
*   PROCEDURE NAME: GMADDR
*
*   GMADDR GETS THE MENU MDT (MENU DICTIONARY TABLE) ADDRESS
*   FROM A MENU ID.
*
*   INPUT: R0 CONTAINS MENU ID NUMBER
*   OUTPUT: MENUAD CONTAINS MDT ADDRESS, OR 0 IF NOT FOUND.
*   RESULT: NONE
*   TO CALL: BLWP @GMADDR    (EXTERNALLY)
*            BL   @GMA000    (WITHIN MHRTNS)
*
*================================================================
```

A-101

```
*===============================================================
*PROC = MNEXT
*
*    PROCEDURE NAME: MNEXT
*
*    MNEXT DERIVES THE NEXT MENU NUMBER FROM FIELD MDNMM
*    (NEXT MENU MODIFIED) OR FIELD MDNM (NEXT MENU).  WHEN
*    THE MENU TABLES ARE ORIGINALLY CODED, EACH MENU IS
*    IN A CHAIN WITH A PRECEDING MENU AND A FOLLOWING MENU.
*    THE LOGICAL FOLLOWING (NEXT) MENU ID IS STORED IN MDT
*    FIELD MDNM.  THIS FIELD IS NOT CHANGED BY THE MENU
*    ROUTINES, AND AS LONG AS THE FIELD MDNMM IS ZERO, THEN
*    THE MENU MDNM WILL ALWAYS FOLLOW THIS MENU.  HOWEVER,
*    ON SOME OCCASIONS, THE MENU SOFTWARE WILL ALTER THE
*    NORMAL MENU FLOW.  WHEN THIS HAPPENS, A VALUE IS STORED
*    IN THE NEXT MENU MODIFIED (MDNMM) FIELD OF THE MDT. WHEN
*    MNEXT SEES A NON-ZERO MDNMM FIELD, THIS IS USED AS THE
*    NEXT MENU INSTEAD OF THE MDNM FIELD.  THUS ALTERING THE
*    MENU FLOW FROM ITS ORIGINAL STATE.
*
*    INPUT: NONE (CURRMA CONTAINS CURRENT MENU ADDRESS)
*    OUTPUT: PDMENU CONTAINS NEXT MENU PENDING VALUE
*    RESULT: NONE
*    TO CALL: BLWP @MNEXT
*
*===============================================================
```

A-102

```
*===========================================================
*PROC = ESTADD
*
*   PROCEDURE NAME: ESTADD
*
*   ESTADD DERIVES THE EST ENTRY ADDRESS FOR A GIVEN MENU
*   ELEMENT.
*
*   ALL MENU ELEMENTS WHICH CORRESPOND TO EQUIPMENT OR SOME
*   FUNCTION HAVE EST NUMBERS. THE ENTITY STATUS TABLE KEEPS
*   TRACK OF ELEMENTS WHOSE FUNCTION MAY BE GLOBAL OR WHOSE
*   STATUS MUST BE MAINTAINED. THE FOLLOWING TABLE DISCUSSES
*   SOME OF THE ASPECTS OF THE ENTITY STATUS TABLE.
*
*   FIELD-EXPLANATION
*   ====== ==========================================
*     ESID-THE ID NUMBER OF THE EST ENTRY
*
*   ESTYPE-EST ENTRIES CAN BE OF SEVERAL TYPES.
*          TYPE 0 = AN ELEMENT CONTROLLED BY OTHERS
*          TYPE 1 = A CONTROLLING ELEMENT
*          TYPE 2 = NEITHER CONTROLLED OR CONTROLLING
*          TYPE 3 = FRONT CAMERA PRESETS
*          TYPE 4 = LEFT CAMERA PRESETS
*          TYPE 5 = RIGHT CAMERA PRESETS
*
*     ESCB-IF ESTYPE NOT = 1 OR 2, THEN THE CONTROLLED BY
*          FIELD WILL EQUAL TO THE EST ID OF THE ELEMENT
*          WHICH IS CONTROLLING THIS ELEMENT. WHEN THE
*          ELEMENT IS OFF OR NOT CONTROLLED, THE FIELD IS 0.
*
*   ESAME-ASSOCIATED MENU ELEMENT, NOT FUNCTIONING.
*
*   ESCOLR-FOR TYPE 1 ELEMENTS, ESCOLR IS THE UNIQUE COLOR
*          ASSOCIATED WITH A CONTROLLING ELEMENT. WHEN IT
*          CONTROLS OTHERS, THEIR ESCOLR FIELD TAKES ON THE
*          VALUE OF THE CONTROLLING ESCOLR VALUE.
*
*   ESFON-ON FLAG.  WILL BE ONE (1) WHEN THE ELEMENT IS ON,
*         AND ZERO WHEN THE ELEMENT IS OFF. THIS FIELD
*         OVERRIDES THE BODY BIT FLAG IN THE NEXT STATUS
*         FIELD. IF NEXT STATUS SHOWS OFF, BUT ESFON IS ON,
*         THEN THE BODY BIT IN NEXT STATUS IS TURNED ON.
*
*   ESFPRE-PRESENT FLAG.  WHEN THIS FLAG IS ON (1) THEN THE
*          ELEMENT IS DRAWN ON THE MENU.  WHEN IT IS OFF,
*          DRAWING OF THE ELEMENT IS INHIBITED.  LIKE THE
*          ESFON FIELD, ESFPRE OVERRIDES THE INHIBIT BIT
*          FLAG IN THE NEXT STATUS FIELD.
*
*   ESDATA-DATA ASSOCIATED WITH THE ENTRY.  THIS FIELD IS
*          GENERALLY NOT USED BUT CAN BE VALUABLE ON AN
*          INDIVIDUAL BASIS.  ALL CAMERA PRESETS HAVE AN
*          ESDATA VALUE CORRESPONDING TO THEIR PRESET NUMBER.
*          AGAIN, THIS FIELD MAY HAVE VARIABLE INFORMATION
```

A-103

```
*         AND IS SPECIFIC TO AN ELEMENT.
*
*  ESCONF-CONFLICT FLAG.  ALL CONTROLLING ELEMENTS HAVE A
*         UNIQUE POWER OF 2 NUMBER ASSOCIATED WITH IT.
*         ELEMENTS WHICH MAY BE ASSOCIATED WITH A CERTAIN
*         CONTROLLING ELEMENT WILL HAVE THE BIT TURNED ON
*         IN ITS ESCONF FIELD ASSOCIATED WITH THE ELEMENTS
*         WHICH IT CAN BE CONTROLLED BY.
*
*  INPUT: R2 CONTAINS ELEMENT MCT ADDRESS
*  OUTPUT: ESADDR CONTAINS EST ADDRESS
*  RESULT: NONE
*  TO CALL: BLWP @ESTADD    (EXTERNALLY)
*           BL   @ESA000    (FROM WITHIN MHRTNS)
*
*================================================================
```

A-104

```
*===============================================================
*PROC = TOUCH
*
*    PROCEDURE NAME: TOUCH
*
*    TOUCH IS THE ROUTINE THAT FLIPS THE BORDER BIT OF THE
*    MCT ELEMENT TOUCHED.  IF THE ELEMENT'S BORDER WAS
*    ALREADY ON, THEN TOUCH TURNS IT OFF, AND VICE VERSA.
*
*    INPUT: MEADDR CONTAINS THE MCT ELEMENT ADDRESS
*    OUTPUT: NONE
*    RESULT: BORDER TURNS ON/OFF
*    TO CALL:  BLWP @TOUCH
*
*===============================================================
```

A-105

```
*================================================================
*PROC = LHERE
*
*   PROCEDURE NAME: LHERE
*
*   LHERE CREATES A LIGHT SH0,0; COMMAND AND THEN
*   PASSES IT TO LIGHT TO GIVE MENU ELEMENTS THEIR
*   OFFSETS.
*
*   INPUT: R0 CONTAINS X COORDINATE
*          R1 CONTAINS Y COORDINATE
*   RESULT: LIGHT HERE COMMAND IS ISSUED
*   TO CALL: BLWP @LHERE
*
*================================================================
*================================================================
```

```
*================================================================
*PROC = RDMENU
*
*   PROCEDURE NAME: RDMENU
*
*   RDMENU IS THE ROUTINE WHICH WILL RE-DRAW THE CURRENT
*   MENU.  REDRAWING IS SOMETIMES NECCESSARY TO MAKE MANY
*   CHANGES TO THE MENU WHERE INDIVIDUAL CALLS TO THE OTHER
*   MENU ROUTINES WOULD BE INEFFICIENT.  RDMENU LOOPS
*   THROUGH THE MCT ENTRIES CALLING EITHER DRE000 OR DREL2
*   FOR EACH ENTRY.  IF SOMETHING HAS CHANGED SINCE THE
*   LAST TIME, THE CHANGE WILL BE REFLECTED IN/ON THE MENU.
*
*   INPUT: NONE
*   OUTPUT: NONE
*   RESULT: MENU IS REDRAWN
*   TO CALL: BLWP @RDMENU     (EXTERNALLY)
*            BL   @RDM000     (FROM WITHN MHRTNS)
*
*================================================================
```

A-107

```
*===============================================================
*PROC = DREL AND DREL2
*
*    PROCEDURE NAME: DREL
*
*    DREL IS THE ROUTINE WHICH DRAWS THE INDIVIDUAL MENU
*    ELEMENTS.  I IT FIRST RETRIEVES THE EST ENTRY (IF ANY)
*    AND SETS THE BODY AND INHIBIT NEXT STATUS FLAGS TO
*    CORRESPOND TO THE ESFUN AND ESFPRE FLAGS IN THE EST.
*    NEXT, IF THE INHIBIT FLAG IS ON, JUST RETURN AFTER
*    SETTING THE CURRENT STATUS TO THE NEXT STATUS.
*    NOW, GET THE DEL ADDRESS FOR THE ELEMENT AND PASS THE
*    LIGHT STRING TO LIGHT FOR DRAWING.  NOW, SEE IF THE
*    CURRENT STATUS EQUALS THE NEXT STATUS.  IF IT DOES,
*    THEN THIS ELEMENT HAS NOT CHANGED AND NO FURTHER
*    WORK IS REQUIRED, JUST RETURN.  IF THE CURRENT AND NEXT
*    FIELDS ARE NOT EQUAL, THEN CHECK IN TURN THE BORDER
*    BIT, BODY BIT, INHIBIT BIT AND THE TEXT BIT FOR
*    EQUALITY.  WHEN A DIFFERENCE IN FOUND, CALL THE
*    APPROPRIATE ROUTINE TO MAKE THE CHANGE.
*
*    INPUT: R2 CONTAINS THE MCT ADDRESS OF THE ELEMENT
*    OUTPUT: CURRENT STATUS FIELD IS SET
*    RESULT: THE ELEMENT IS DRAWN
*    TO CALL: BLWP @DREL     (EXTERNALLY)
*             BL   @DRE000   (FROM WITHIN MHRTNS)
*
*
*    PROCEDURE NAME: DREL2
*
*    DREL2 IS CALLED WHEN THE ELEMENT IS TO BE UPDATED ONLY
*    IF THE STATUS BYTES HAVE CHANGED.  WHEN DREL IS CALLED,
*    IT ALWAYS DRAWS THE ELEMENT, DREL2 ONLY MAKES CHANGES TO
*    THE ELEMENT.
*
*    INPUT: R2 CONTAINS MCT ADDRESS
*    OUTPUT: NONE
*    RESULT: CHANGED ELEMENTS ARE UPDATED
*    TO CALL: BL @DREL2
*
*===============================================================
```

A-108

```
*================================================================
*PROC = DELEM
*
*     PROCEDURE NAME: DELEM
*
*================================================================
```

```
*================================================================
*PROC = CBORD
*
*    PROCEDURE NAME: CBORD
*
*    CBORD IS THE ROUTINE WHICH EITHER TURNS THE BORDER ON
*    OR OFF.  IT FIRST CHECKS FOR A BORDER ON THE ELEMENT.
*    IF IT IS FOUND, UPDATE THE ICB FIELD WITH THE X AND Y
*    HERE (DEXFIL, DEYFIL) VALUES.  THEN, BASED ON THE BORDER
*    BIT IN THE NEXT STATUS, IT LOADS THE ADDRESS OF THE
*    LIGHT STRING TO TURN THE BORDER ON/OFF.  LIGHT IS NOW
*    CALLED TO IMPLEMENT THE COMMAND.
*
*    INPUT: R2 CONTAINS THE MCT ELEMENT ADDRESS
*    OUTPUT: NONE
*    RESULT: BORDER GOES WHITE OR BLACK
*    TO CALL: BL @CBORD
*
*================================================================
```

A-110

```
*===============================================================
*PROC = CBODY
*
*   PROCEDURE NAME: CBODY
*
*   CBODY IS THE MENU ROUTINE WHICH CHANGES THE BODY
*   OF THE MENU ELEMENT.  WHEN THE BODY IS OFF, IT APPEARS
*   IN THE COLOR SPECIFIED IN THE MCCOFF FIELD OF THE MCT.
*   WHEN IT IS ON, THE COLOR CAN BE SPECIFIED EITHER IN THE
*   MCCON MCT FIELD, OR IF THAT FIELD IS BLACK (0), THEN
*   THE ENTITY ENTRY COLOR (ESCOLR) IS USED.  IF THIS FIELD
*   IS ZERO, THEN LOOK UP THE ESCOLR OF THE CONTROLLING
*   ELEMENT (IF ANY).  THIS WILL BE THE COLOR USED FOR
*   TURNING AN ELEMENT ON.  ONCE THE COLOR IS ASCERTAINED,
*   SIMPLY MOVE THE X AND Y HERE VALUES TO THE ICB.  THEN,
*   ADD THE DEL X AND Y FILL VALUES TO IT.  NOW LOAD THE
*   BODY CHANGE LIGHT COMMAND INTO R1 AND CALL LIGHT TO DO
*   THE WORK.
*
*   IF THERE IS TEXT INSIDE THE ELEMENT WHICH IS CURRENTLY
*   ON, THEN BEFORE THE ELEMENT BODY IS CHANGED, ERASE THE
*   TEXT.  THEN AFTER THE BODY IS CHANGED, ISSUE A LIGHT
*   DELAY COMMAND, AND THEN RE-DRAW THE TEXT.  THIS IS DONE
*   SO THAT THE INSIDE OF LETTERS SUCH AS THE "O" AND "A"
*   ARE FILLED IN WITH THE NEW COLOR.  THE DELAY IS TO GIVE
*   LIGHT TIME TO DO THE FILL BEFORE THE NEW TEXT IS DRAWN.
*
*   INPUT: R2 CONTAINS THE MCT ELEMENT ADDRESS
*   OUTPUT: NONE
*   RESULT: BODY GOES ON OR OFF
*   TO CALL: BLWP @CBODY    (EXTERNALLY)
*            BL   @CBD000   (FROM WITHIN MHRTNS)
*
*===============================================================
```

A-111

```
*=================================================================
*PROC = CTEXT
*
*    PROCEDURE NAME: CTEXT
*
*    CTEXT IS THE ROUTINE WHICH CHANGES THE TEXT IN THE MENU
*    ELEMENTS.  BASED UPON THE TEXT BIT IN THE NEXT STATUS
*    FIELD, CTEXT EITHER ERASES THE EXISTING TEXT OR DRAWS
*    THE TEXT.  TO ERASE TEXT, SIMPLY WRITE THE TEXT AGAIN
*    IN THE BACKGROUND COLOR (MCCCUR).  THIS CAUSES THE TEXT
*    TO DISAPPEAR.  TO WRITE TEXT, DISPLAY IT IN THE COLOR
*    DESIGNATED FOR TEXT (MCCTXT) FOR THIS ELEMENT.  TEXT
*    WHICH OCCURS INSIDE OF MENU ELEMENTS IS ALWAYS CENTERED
*    HORIZONTALLY WITHIN THE ELEMENT.  VERTICAL SPACING IS
*    LEFT UP TO THE USER.
*
*    INPUT: R2 CONTAINS MCT ELEMENT ADDRESS
*    OUTPUT: NONE
*    RESULT: TEXT IS EITHER ERASED OR DISPLAYED
*    TO CALL: BLWP @CTEXT    (EXTERNALLY)
*             BL   @CTE000   (FROM WITHIN MHRTNS)
*
*=================================================================
```

A-112

```
*================================================================
*PROC = ZAPOUT
*
*    PROCEDURE NAME: ZAPOUT
*
*    ZAPOUT IS THE ROUTINE WHICH IS CAPABLE OF ERASING AN
*    ELEMENT WHICH IS CURRENTLY DISPLAYED ON THE MENU.  THIS
*    IS ACCOMPLISHED BY DOING A RECTANGULAR ZAP IN THE
*    BACKGROUND COLOR OVER THE ELEMENT TO BE ZAPPED.
*    THEREFORE, ELEMENTS WHICH CANNOT BE COMPLETLY COVERED
*    BY A RECTANGULAR AREA WHICH COVERS ONLY ONE BACKGROUND
*    COLOR, CANNOT BE ZAPPED.  THE DIMENSIONS OF THE
*    RECTANGLE USED FOR ZAPPING ARE THE X AND Y TOLERANCE
*    FIELDS IN THE DEL ENTRY.
*
*    INPUT: R2 CONTAINS THE MCT ELEMENT ADDRESS
*    OUTPUT: NONE
*    RESULT: THE MENU ELEMENT IS ERASED
*    TO CALL: BLWP @ZAPOUT     (EXTERNALLY)
*             BL   @ZAP000     (FROM WITHIN MHRINS)
*
*================================================================
```

A-113

```
*================================================================
*MOD = MHSUPRTN
*
*    THIS MODULE CONTAINS SUPPORT ROUTINES WHICH ARE USED
*    BY OTHER PROCEDURES WITHIN THE MENU HANDLER SYSTEM.
*    ROUTINES WILL BE "PERMANENTLY" MAPPED IN WHENEVER THE
*    MENU HANDLER SOFTWARE IS IN.
*
*================================================================
```

A-114

```
*===========================================================
*DATA
*
*
*===========================================================
```

A-115

```
*================================================================
*PROC = SLCTME
*
*   PROCEDURE NAME: SLCTME
*
*   SLCTME IS THE SUPPORT ROUTINE WHICH IMPLEMENTS
*   A GENERAL KEY ON ANY MENU.  SLCTME RECOGNIZES THE TOUCH
*   AND CLEARS THE IMMEDIATE AND DELAYED ACTION FLAGS.
*
*   INPUT: NONE
*   OUTPUT: NONE
*   RESULT: KEY BORDER REVERSES
*   TO CALL: BL @SLCTME
*
*================================================================
```

A-116

```
*================================================================
*PROC = PREVUE
*
*    PROCEDURE NAME: PREVUE
*
*    THIS PROCEDURE IS CALLED WHENEVER A NEW TOUCH HAS
*    BEEN ADDED TO THE STACK IF THE PREVIEW FLAG HAS
*    BEEN SET.  PREVUE WILL LOOK THROUGH THE STACK FOR
*    AN ELEMENT WHICH IS EITHER A SOURCE OR IS CURRENTLY
*    CONTROLLED BY A SOURCE.
*
*    IF SUCH AN ELEMENT IS FOUND, IT IS PREVIEWED.
*
*    INPUT: NONE
*    OUTPUT: NONE
*    RESULT: KEY BORDER REVERSES
*    TO CALL: BL @PREVUE
*
*================================================================
```

A-117

```
*================================================================
*PROC = STDFLT
*
*   PROCEDURE NAME: STDFLT
*
*
*   INPUT: NONE
*   OUTPUT: NONE
*   RESULT: KEY BORDER REVERSES
*   TO CALL: BL @STDFLT
*
*================================================================
```

A-118

```
*====================================================================
*PROC = FINDIT
*
*   PROCEDURE NAME: FINDIT
*
*   FINDIT IS A UTILITY PROCEDURE FOR STDFLT.  IT SEARCHES THROUGH
*   THE CURRENT MENU'S MCT ENTRIES TO FIND THE ELEMENT WHICH HAS
*   THE ENTITY ID CONTAINED IN R1.  IF R1 = 0 THEN SEARCH FOR
*   THE GO ELEMENT.  THE MCT ADDRESS IS STORED IN R2.
*
*   INPUT: R1 CONTAINS EST ID
*   OUTPUT: R2 CONTAINS MCT ELEMENT ADDRESS
*   RESULT: NONE
*   TO CALL: BL @FINDIT
*
*====================================================================
*====================================================================
```

A-119

```
*================================================================
*PROC = EXECIT
*
*    PROCEDURE NAME: EXECIT
*
*    EXECIT IS A UTILITY PROCEDURE FOR STDFLT.  ITS PURPOSE IS
*    TO PERFORM EITHER THE IMMEDIATE OR DELAYED ACTION ROUTINE
*    ASSOCIATED WHICH EACH ELEMENT STACKED.  THIS SUB-PROCEDURE
*    IS FUNCTIONALLY EQUIVALENT TO SECTIONS WITHIN CCTSPI.
*
*    INPUT: NONE
*    OUTPUT: NONE
*    RESULT: ACTION ROUTINE EXECUTED
*    TO CALL: BL @EXECIT
*
*================================================================
*================================================================
```

A-120

```
*===============================================================
*PROC = BACK
*
*   PROCEDURE NAME: BACK
*
*   BACK IS THE SUPPORT ROUTINE WHICH IMPLEMENTS
*   THE BACK KEY ON THE MENUS.  BACK ERASES ALL CURRENT
*   TOUCHES, DELETES THE STACK, GETS THE PREVIOUS MENU
*   NUMBER FROM MDPM, AND FINALLY DRAWS THE NEW MENU.
*
*   INPUT: NONE
*   OUTPUT: NONE
*   RESULT: ERASES ALL TOUCHES, DRAWS NEW MENU
*   TO CALL: BL @BACK
*
*===============================================================
```

A-121

```
*================================================================
*PROC = HELP
*
*   PROCEDURE NAME: HELP
*
*   HELP IS THE SUPPORT ROUTINE ASSOCIATED WITH
*   ALL HELP KEYS.  IF THE HELP KEY IS TOUCHED AND THERE IS
*   AN ELEMENT ON THE SENTENCE STACK, HELP WILL GIVE HELP
*   ON THE TOUCHED ELEMENT IF THIS ELEMENT HAS A NON-ZERO
*   MCHELP FIELD IN ITS MCT ENTRY.  IF THERE ARE NO ELEMENTS
*   ON THE SENTENCE, HELP WILL GIVE GENERAL HELP ON THE
*   MENU IF THE MDHELP FIELD IN THE MDT ENTRY IS NON-ZERO.
*   IF HELP CANNOT GIVE HELP, THEN A NO HELP AVAILABLE
*   MESSAGE IS DISPLAYED.
*
*   THE HELP KEY HAS AN ADDITIONAL FUNCTION OF DISPLAYING
*   PENDING MESSAGES (INDICATED BY A RED GO KEY).
*   GENERALLY, WHEN A MESSAGE IS GENERATED, IT IS NOT
*   DISPLAYED IMMEDIATELY, INSTEAD, A FLAG IS RAISED TO TELL
*   THE USER THAT AN ERROR IS PENDING.  TO RECEIVE PENDING
*   ERRORS, THE USER HAS ONLY TO TOUCH THE HELP KEY.
*
*   THE HELP KEY DOES NOT ERASE THE PENDING ERROR AND IF
*   HELP IS RE-TOUCHED THE SAME MESSAGE WILL BE RE-DISPLAYED
*   UNLESS OTHER HELP IS AVAILABLE IN THE FORM OF MDHELP
*   OR MCHELP.
*
*   INPUT: NONE
*   OUTPUT: NONE
*   RESULT: HELP MENU DISPLAYED, ERROR GENERATED OR ERROR
*           DISPLAYED.
*   TO CALL: BL @HELP
*
*================================================================
```

A-122

```
*================================================================
*PROC = RESET
*
*   PROCEDURE NAME: RESET
*
*   RESET IS THE SUPPORT ROUTINE WHICH IMPLEMENTS
*   THE X KEY FUNCTIONS ON MANY OF THE MENUS.
*   IT PERFORMS THE FOLLOWING FUNCTIONS:
*
*       *  RE-TOUCHES ALL TOUCHED ELEMENTS
*       *  CLEARS AND RELEASES THE STACK
*       *  ERASES PENDING OR DISPLAYED ERRORS
*       *  ERASES CAMERA PRESETS, IF NECESSARY
*
*   INPUT: NONE
*   OUTPUT: NONE
*   RESULT: MENU RETURNS TO PRE-SENTENCE STATE.
*   TO CALL: BL @RESET
*
*================================================================
```

A-123

```
*==============================================================
*PROC = ZAPCAM
*
*    PROCEDURE NAME: ZAPCAM
*
*    ZAPCAM WILL ERASE ALL CAMERA PRESETS, TAKE THE CAMERA
*    OFF OF THE STACK, AND TURN THE ON CAMERA AND ON PRESET
*    OFF IS R0 IS SET TO 1.
*
*    INPUT: R0, WHEN =0, JUST ERASE TOUCHES AND PRESETS,
*               WHEN =1, TURN OFF AS WELL AS ERASE.
*           CAMTCH CONTAINS EITHER THE MCT ADDRESS OF THE
*                  CAMERA OR THE ENTITY ID OF SAME.
*    OUTPUT: NONE
*    RESULT: CAMERA AND PRESET TOUCHES ARE ERASED.
*    TO CALL: BLWP @ZAPCAM
*
*==============================================================
```

A-124

```
*===================================================================
*PROC = LSENDS
*
*   PROCEDURE NAME: LSENDS
*
*   THIS ROUTINE IS CALLED WHEN A CHANGED HAS BEEN MADE
*   IN THE CONNECTIONS OF SINKS AND SOURCES.  IT CHECKS
*   THE ENTITY STATUS TABLE FOR ANY SOURCES WITH NO
*   ACTIVE SINKS AND DEACTIVATES THE SOURCE.  IT ALSO
*   CHECKS FOR DEACTIVATED SOURCES THAT HAVE SINKS
*   STILL ACTIVE AND GENERATES SYSTEM REQUESTS TO
*   DEACTIVATE THE SINKS.
*
*   INPUT:   ENTITY STATUS TABLE
*   OUTPUT:  MODIFIED ENTITY STATUS TABLE
*            SYSTEM REQUESTS
*   RESULT:  LOOSE ENDS OF DEVICE CONNECTIONS CLEANED UP
*   TO CALL: BL @LSENDS
*
*===================================================================
*===================================================================
```

A-125

```
*================================================================
*PROC = REFSTK
*
*   PROCEDURE NAME: REFSTK
*
*   REFSTK WILL REMOVE AN ELEMENT FROM THE SENTENCE
*   STACK.  THE ELEMENT TO BE REMOVED MCT ADDRESS IS
*   STORED IN R1 BEFORE CALLING THIS ROUTINE.
*
*   INPUT: R1 CONTAINS MCT ADDRESS OR ELEMENT
*   OUTPUT: NONE
*   RESULT: ELEMENT IS REMOVED FROM STACK
*   TO CALL: BL @REFSTK
*
*================================================================
*================================================================
```

A-126

```
*================================================================
*PROC = CHELEM
*
*   PROCEDURE NAME: CHELEM
*
*   THIS PROCEDURE ALLOWS THE USER TO CHANGE (RE-DRAW,
*   RE-COLOR ETC.) A SINGLE MENU ELEMENT.  IF MORE THAN
*   ONE ELEMENT IS TO BE CHANGED, THE BEST PROCEDURE
*   TO USE IS RDMENU.
*
*   INPUT: CHELM CONTAINS ELEMENT MCT ADDRESS
*   OUTPUT: NONE
*   RESULT: ELEMENT IS RE-DRAWN
*   TO CALL: BLWP @CHELEM
*
*================================================================
*================================================================
```

A-127

```
*===============================================================
*PROC = MHRHHD
*
*    PROCEDURE NAME: MHRHHD
*
*    THIS PROCEDURE WILL INTERPRET A MESSAGE FROM THE
*    HAND HELD DEVICE. THE RECALL FROM STORAGE (NOT
*    AVAILABLE ON THE ALLSTATE TYPE SYSTEM) WILL EITHER
*    BE ADVANCED OR REVERSED BY THIS COMMAND.
*    THE MESSAGE TEXT IS AS FOLLOWS:
*
*         FC00 -- COMMAND CODE
*         0000 -- VIDEO/HI-RES CODE
*         0000 -- FORWARD/REVERSE CODE
*
*
*    INPUT: MESSAGE BUFFER IN R1
*    OUTPUT: NONE
*    RESULT: MENU IS UPDATED AND NEW IMAGE SHOWN
*    TO CALL: BLWP @MHRHHD
*
*===============================================================
*===============================================================
```

A-128

```
*================================================================
*PROC = MHRSCP
*
*   PROCEDURE NAME: MHRSCP
*
*   THIS PROCEDURE WILL INTERPRET A MESSAGE FROM THE
*   SCP APT (NOT AVAILABLE ON ALLSTATE TYPE SYSTEMS).
*   THE MESSAGE FORMAT IS:
*
*      FB00 -- COMMAND CODE
*      0000 -- ENTITY ID OF OBJECT TO MODIFY
*      0000 -- ON/OFF FLAG
*      0000 -- ENTITY ID OF SOURCE (IF ANY)
*
*   INPUT: MESSAGE BUFFER IN R1
*   OUTPUT: NONE
*   RESULT: MENU IS UPDATED
*   TO CALL: BLWP @MHRSCP
*
*================================================================
*================================================================
```

A-129

```
*================================================================
*PROC = SINIT
*
*    PROCEDURE NAME: SINIT
*
*    THIS PROCEDURE SENDS SYSTEM REQUEST MESSAGES TO
*    TURN OFF THE AUDIO AND ALL CONTROLLED BY ENTITIES.
*
*    INPUT: NONE
*    OUTPUT: SYSTEM MESSAGES
*    RESULT: ALL DEVICES ARE TURNED OFF
*    TO CALL: BL @SINIT
*
*================================================================
*================================================================
```

A-130

```
*===================================================================
*MOD = MHMAPRTN
*
*    THIS MODULE CONTAINS THE ROUTINES USED BY THE MENU
*    HANDLER SOFTWARE TO MAP MODULES/PROCEDURES IN TO
*    MEMORY.
*
*===================================================================
```

A-131

```
*================================================================
*DATA
*
*================================================================
```

A-132

```
*===============================================================
*PROC = GDELAD
*
*   PROCEDURE NAME: GDELAD
*
*   GDELAD WILL DERIVE THE ADDRESS OF THE DISPLAY ELEMENT
*   LIBRARY (DEL) ENTRY FOR A GIVEN MENU ELEMENT.
*   THIS SECTION OF THE DEL WILL THEN BE MAPPED INTO
*   MEMORY.
*
*   INPUT: R2 CONTAINS THE ELEMENTS MCT ADDRESS
*   OUTPUT: DEADDR CONTAINS THE DEL ADDRESS
*   RESULT: NONE
*   TO CALL: BLWP @GDELAD    (EXTERNALLY)
*
*===============================================================
```

A-133

```
*================================================================
*PROC = GTELAD
*
*    PROCEDURE NAME: GTELAD
*
*    GTELAD WILL DERIVE THE ADDRESS OF THE TEXT ELEMENT
*    LIBRARY (TEL) ENTRY FOR A GIVEN MENU ELEMENT.
*    THIS SECTION OF THE TEL WILL THEN BE MAPPED INTO MEMORY.
*
*    INPUT: R3 CONTAINS TEXT ID NUMBER
*    OUTPUT: TLADDR CONTAINS THE TEL ADDRESS
*    RESULT: NONE
*    TO CALL: BLWP @GTELAD    (EXTERNALLY)
*
*================================================================
```

A-134

```
*===============================================================
*PROC = GMCTAD
*
*    PROCEDURE NAME: GMCTAD
*
*    GMCTAD WILL DERIVE THE ADDRESS OF THE MCT ENTRY
*    FOR A GIVEN MENU MDT ENTRY.
*
*    INPUT: R2 CONTAINS THE ELEMENTS MCT ADDRESS
*    OUTPUT: MCADDR CONTAINS THE MCT ADDRESS
*    RESULT: NONE
*    TO CALL: BLWP @GMCTAD    (EXTERNALLY)
*
*===============================================================
```

A-135

```
*===============================================================
*PROC = MHRMAP
*
*    MHRMAP IS THE PROCEDURE WHICH IMPLEMENTS MEMORY MAPPING
*    FOR THE MENU SOFTWARE.  IT WILL ALSO RESTORE THE LAST
*    MEMORY MAPPING IF REQUESTED.
*
*    INPUT: R0 CONTAINS THE MMS
*           R1 CONTAINS THE MMR
*
*           IF R0 IS LESS THAN 0, THEN THE LAST MEMORY
*           MAPPING WILL BE RESTORED.
*
*    OUTPUT: NONE
*    RESULT: MEMORY SEGMENTS MAPPED.
*    TO CALL: BLWP @MHRMAP     (EXTERNALLY)
*
*===============================================================
```

A-136

```
*================================================================
*MOD = MHMSGS
*
*     MODULE MHMSGS MAINTAINS A LIBRARY OF ALL MESSAGES WHICH
*     ARE DISPLAYABLE BY THE TELE-CONFERENCING SYSTEM THROUGH
*     THE MENU DISPLAY SYSTEM.  IT ALSO MAINTAINS THE LIBRARY
*     OF MESSAGES WHICH ARE SENT TO OTHER ROUTINES TO
*     IMPLEMENT THE FUNCTIONS OF THE MENUS.  THIS MODULE
*     CONSISTS OF FIVE PROCEDURES. THEY ARE GRMST, ERRDSP,
*     ERRERS, GMSGAD AND MSGDSP.  THE FUNCTIONS OF EACH
*     PROCEDURE ARE DESCRIBED AT THE BEGINNING OF EACH PROC.
*
*================================================================
```

A-137

```
*===================================================================
*DATA
*
*===================================================================
```

A-138

```
*===============================================================
*DATA
*
*===============================================================
```

A-139

```
*===============================================================
*DATA
*       REQUEST MESSAGE BLOCKS
*
*
*===============================================================
```

A-140

```
*================================================================
*PROC = GRMST
*
*   PROCEDURE NAME: GRMST
*
*   GRMST SETS AND RESETS THE ERROR INDICATOR.  THE ERROR
*   INDICATOR IS INCORPORATED WITHIN THE GO KEY ELEMENT. IF
*   AN ERROR IS PENDING, THE "GO" CHARACTERS ARE DISPLAYED
*   IN RED.  IF THERE IS NOT AN ERROR PENDING, THEN THE
*   "GO" CHARACTERS ARE DISPLAYED IN GREEN.  WHEN AN ERROR
*   IS PENDING, TOUCHING THE "HELP" KEY WILL CAUSE THE ERROR
*   TO BE DISPLAYED ON THE LEFT SIDE OF THE CONTROL KEY
*   BOX.
*
*   INPUT: R0 = FLAG, FLAG = 0 FOR ERROR RESET,
*                     FLAG = 1 FOR ERROR SET.
*          R1 = MESSAGE NUMBER
*   OUTPUT: NONE
*   RESULT: GO ELEMENT TURNS RED (R0 = 1) OR
*           GREEN (R0 = 0).
*   TO CALL: BL @GRMST
*
*================================================================
```

A-141

```
*===============================================================
*PROC = ERRDSP
*
*   PROCEDURE NAME: ERRDSP
*
*   ERRDSP CONVERTS A MESSAGE NUMBER (ERRMSG) INTO A MESSAGE
*   ADDRESS AND DISPLAYS THE MESSAGE ON THE MENU.
*   IT ALSO SETS ERRFLG TO INDICATE THAT AN ERROR IS
*   CURRENTLY BEING DISPLAYED.
*
*   INPUT: ERRMSG = MESSAGE NUMBER-
*   OUTPUT: NONE
*   RESULT: MESSAGE IS DISPLAYED IN CONTROL KEY BOX
*   TO CALL: BL @ERRDSP
*
*===============================================================
```

A-142

```
*================================================================
*PROC = ERRERS
*
*   PROCEDURE NAME: ERRERS
*
*   ERRERS WILL ERASE ANY MESSAGE DISPLAYED AND WILL RESET
*   THE MESSAGE INDICATORS AS WELL AS RESET THE GO KEY
*   ELEMENT TO ITS NORMAL STATUS.  ERRERS WILL ALSO RESTORE
*   THE CONTROL KEYS WHICH MAY HAVE BEEN ERASED BY THE
*   MESSAGE WHEN IT WAS DISPLAYED.
*
*   INPUT: NONE
*   OUTPUT: NONE
*   RESULT: MESSAGE IS ERASED, CHANGE GO KEY TO GREEN AND
*           RE-DRAW ANY CONTROL KEY WHICH WAS ERASED BY THE
*           DISPLAYED MESSAGE.
*   TO CALL: BL @ERRERS
*
*================================================================
```

A-143

```
*================================================================
*PROC = GMSGAD
*
*   PROCEDURE NAME: GMSGAD
*
*   GMSGAD RETURNS THE ADDRESS OF A REQUESTED RQB MESSAGE.
*
*   INPUT: R1 = RQB MESSAGE NUMBER
*   OUTPUT: R1 = ADDRESS OF RQB MESSAGE
*   RESULT: R1 IS REPLACED WITH ADDR OF RQB MSG
*   TO CALL: BL @GMSGAD
*
*================================================================
```

A-144

```
*===============================================================
*PROC = MSGDSP
*
*    PROCEDURE NAME: MSGDSP
*
*    MSGDSP WILL EITHER CAUSE A MESSAGE TO BE DISPLAYED ON
*    THE MENU OR WILL INDICATE THAT AN ERROR IS PENDING.
*    THIS WILL BE THE GENERAL ROUTINE CALLED BY NON-MENU
*    HANDLING CODE.
*
*    INPUT: R0 = FLAG, WHEN 0 = DISPLAY MESSAGE NOW
*                      WHEN NOT 0 = INDICATE MESSAGE PENDING
*                                   AND LET THE USER ASK FOR IT.
*           R1 = MESSAGE NUMBER
*    OUTPUT: NONE
*    RESULT: BASED ON R0, MESSAGE IS DISPLAYED OR INDICATED.
*    TO CALL: BLWP @MSGDSP
*
*===============================================================
```

A-145

```
*================================================================
*MOD = MHIATBL
*
*    MODULE MHIATBL IS THE INDEX TABLE FOR THE IMMEDIATE
*    ACTION ROUTINES.
*
*================================================================
```

```
*===============================================================
*DATA
*
*     IMMEDIATE ACTION ROUTINE INDEX TABLE
*
*===============================================================
```

A-147

```
*================================================================
*MOD = MHCATBL
*
*   MODULE MHCATBL IS THE INDEX TABLE FOR THE DELAYED
*   ACTION ROUTINES.
*
*================================================================
```

A-148

```
*===================================================================
*DATA
*
*     DELAYED ACTION ROUTINE INDEX TABLE
*
*===================================================================
```

A-149

```
*================================================================
*MOD = MHCITBL
*
*    THIS MODULE CONTAINS THE CONFERENCE INITIALIZATION
*    TABLE.  IT IS USED TO SPECIFY CAMERA PRESETS, DEFINES
*    THE USER SPECIFIC LOGO AND GOVERN THE MASTER MENU
*    DEFAULT STATES.
*
*================================================================
```

A-150

```
*================================================================
*DATA
*
*   CIT DATA CONSISTS OF THE FOLLOWING INFORMATION FOR
*   EACH CAMERA (IN ORDER OF FRONT, LEFT AND RIGHT
*   CAMERAS).
*
*      * NUMBER OF PRESETS
*          (FOR EACH PRESET)
*            * X HERE COORDINATE
*            * Y HERE COORDINATE
*            * BACKGROUND COLOR
*
*
*   CIT DATA CONSISTS OF THE FOLLOWING INFORMATION FOR
*   EACH DEFAULT COMMAND FOR THE MASTER MENU.
*
*      * ENTITY ID1, ENTITY ID2, ... ENTITY IDN, 0
*
*
*   CIT DATA ALSO CONSISTS OF A DEL-LIKE ENTRY FOR THE
*   USER SPECIFIC LOGO.
*
*================================================================
```

A-151

```
*===============================================================
*MOD = MHMDTBL
*
*    MODULE MHMDTBL CONTAINS THE MENU DICTIONARY TABLE.  THIS
*    TABLE CONTAINS MENU NUMBER, MCT ADDRESS, NUMBER OF
*    ELEMENTS ETC.
*
*===============================================================
```

A-152

```
*=================================================================
*DATA
*
*    THE MENU DICTIONARY TABLE ENTRIES ARE INCLUDE BELOW.
*    THE ELEMENTS ARE:
*
*       OFFSET    DESCRIPTION
*       ======    =========================================
*          0      MENU NUMBER (ID)
*          1      PREVIOUS MENU
*          2      NEXT MENU
*          3      NEXT MENU MODIFIED
*          4      MENU LOCATION (-1 = SCP, 0 = IN MEMORY,
*                               +N = IN IMAGE MEMORY N)
*          5      NUMBER OF ELEMENTS
*          6      MENU FLAGS (NOT USED)
*          7      HELP MENU NUMBER (IF ANY)
*          8      MCT ADDRESS
*
*=================================================================
```

```
*===================================================================
*MOD = MHIMACT1
*
*    MODULE MIACT IS THE FIRST MODULE CONTAINING
*    IMMEDIATE ACTION ROUTINES.
*
*    MANY TOUCHABLE (ACTION) ELEMENTS ON THE MENUS HAVE AN
*    IMMEDIATE ACTION ROUTINE ASSOCIATED WITH IT.  THE
*    ROUTINE NUMBER IS IN POSITION MCIACT OF THE MENU CONTROL
*    TABLE.  THE CCTSPI PROCEDURE IS THE IMMEDIATE ACTION
*    ROUTINE DISPATCHER.
*
*    CCTSPI EXAMINES THE TOP ELEMENT ON THE STACK,
*    AND IF THE IMMEDIATE FLAG IS ON AND THIS ELEMENT HAS
*    AN IMMEDIATE ACTION ROUTINE ASSOCIATED WITH IT, CCTSPI
*    INVOKES THE ROUTINE.
*
*    IN THE COMMENTS ASSOCIATED WITH EACH IMMEDIATE ACTION
*    ROUTINE, INPUT AND OUTPUT IS LISTED AS "NONE" UNLESS
*    REGISTERS CONTAINS SPECIFIC VALUES (OR OTHER FIELDS).
*    ACTUALLY, THESES ACTION ROUTINES USE THE SENTENCE
*    STACK AS THEIR INPUT AND FREQUENTLY THEIR OUTPUT.
*    THE OTHER OUTPUT IS GENERALLY THE MENU SCREEN WHICH
*    IS EXPLAINED IN THE "RESULT:" SECTION.
*
*===================================================================
```

A-154

```
*===================================================================
*DATA
*
*         DATA FIELDS FOR 1AR001 - 1AR010
*
*===================================================================
```

A-155

```
*==================================================================
*PROC = IAR001
*
*    PROCEDURE NAME: IAR001
*
*    IAR001 IS THE IMMEDIATE ACTION ROUTINE WHICH IMPLEMENTS
*    THE YES KEY ON MENU C1.  IT CAUSES THE REVIEW MENUS
*    TO BE DISPLAYED.
*
*    INPUT: NONE
*    OUTPUT: NONE
*    RESULT: REVIEW MENU R1 IS DISPLAYED.
*    TO CALL: BL @IAR001
*
*==================================================================
*==================================================================
```

A-156

```
*================================================================
*PROC = IAR002
*
*   PROCEDURE NAME: IAR002
*
*   IAR002 IS THE IMMEDIATE ACTION ROUTINE WHICH IMPLEMENTS
*   THE NO KEY ON MENU C1.  IT CAUSES THE MENU C2 TO BE
*   DISPLAYED, BYPASSING THE REVIEW MENUS.
*
*   INPUT: NONE
*   OUTPUT: NONE
*   RESULT: MENU C2 IS DISPLAYED.
*   TO CALL: BL @IAR002
*
*================================================================
*================================================================
```

```
*================================================================
*PROC = IAR003
*
*    PROCEDURE NAME: IAR003
*
*    IAR003 IS THE IMMEDIATE ACTION ROUTINE WHICH IMPLEMENTS
*    THE BACK KEY FOR ALL MENUS EXCEPT C5.  IT CALLS THE
*    GENERAL BACK ROUTINE.
*
*    INPUT: NONE
*    OUTPUT: NONE
*    RESULT: RETURNS TO THE PREVIOUS MENU
*    TO CALL: BL @IAR003
*
*================================================================
*================================================================
```

A-158

```
*================================================================
*PROC = IAR004
*
*   PROCEDURE NAME: IAR004
*
*   IAR004 IS THE IMMEDIATE ACTION ROUTINE FOR THE
*   WH  GO KEY WHICH CAUSES MOVEMENT TO NEXT MENU.  ITS
*   FUNCTIONDS  S ARE TO POP ITSELF FROM THE STACK
*   AND GET THE NEXT MENU NUMBER.
*
*   INPUT: NONE
*   OUTPUT: NONE
*   RESULT: NEXT MENU IS DETERMINED
*   TO CALL: BL @IAR004
*
*================================================================
*================================================================
```

A-159

```
*==============================================================
*PROC = IAR005
*
*    PROCEDURE NAME: IAR005
*
*    IAR005 IS THE IMMEDIATE ACTION ROUTINE WHICH IMPLEMENTS
*    THE TOUCH OF A KEY WHICH IS MUTUALLY EXCLUSIVE OF
*    ANOTHER KEY.  IF THE OTHER KEY HAS BEEN SELECTED, IT
*    IS "TURNED OFF" AND THE NEW TOUCH IS RECOGNIZED.
*
*    INPUT: NONE
*    OUTPUT: NONE
*    RESULT: MUTUALLY EXCLUSIVE TOUCH
*    TO CALL: BL @IAR005
*
*==============================================================
```

A-160

```
*================================================================
*PROC = IAR006
*
*    PROCEDURE NAME: IAR006
*
*    IAR006 IS THE IMMEDIATE ACTION ROUTINE WHICH IMPLEMENTS
*    THE CANCEL KEY ON MENU C2.  IF THERE'S AN ERROR, ONLY
*    THE ERROR WILL BE RESET; OTHERWISE, THE SESSION IS
*    TERMINATED BY DRAWING MENU C6.
*
*    INPUT: NONE
*    OUTPUT: NONE
*    RESULT: ERROR RESET OR MENU C6 DRAWN
*    TO CALL: BL @IAR006
*
*================================================================
*================================================================
```

A-161

```
*================================================================
*PROC = IAR007
*
*     PROCEDURE NAME: IAR007
*
*     IAR007 IS THE IMMEDIATE ACTION ROUTINE WHICH IMPLEMENTS
*     THE HELP KEY FOR ALL MENUS EXCEPT C5.  A GENERAL HELP
*     ROUTINE IS CALLED BECAUSE THE C5 HELP ROUTINE IS IN
*     ANOTHER MODULE AND THIS AVOIDS DUPLICATE CODE.
*
*     INPUT: NONE
*     OUTPUT: NONE
*     RESULT: CALL HELP ROUTINE
*     TO CALL: BL @IAR007
*
*================================================================
*================================================================
```

```
*===============================================================
*PROC = IAR008
*
*    PROCEDURE NAME: IAR008
*
*    IAR008 IS THE IMMEDIATE ACTION ROUTINE FOR THE GO KEY
*    WHICH EXECUTES THE LEXICAL SCAN FOR THE STACK.  THE
*    DELAYED FLAG IS SET FOR THE TOP SENTENCE ELEMENT.
*
*    INPUT: NONE
*    OUTPUT: NONE
*    RESULT: LEXICAL SCAN EXECUTED, DELAYED FLAG SET
*    TO CALL: BL @IAR008
*
.ST (200,302)MHIMACT1.XAS
.PG;.INDEX PROC = IAR009
.LIT
*===============================================================
*PROC = IAR009
*
*    PROCEDURE NAME: IAR009
*
*    IAR009 IS THE IMMEDIATE ACTION ROUTINE WHICH IMPLEMENTS
*    THE CANCEL KEY FOR THE REVIEW MENUS.  THE BRANCHING IS
*    DIFFERENT DEPENDING ON THE INITIAL REVIEW OR THE
*    REVIEW DURING A CONFERENCE.
*
*    INPUT: NONE
*    OUTPUT: NONE
*    RESULT: BRANCH OUT OF REVIEW
*    TO CALL: BL @IAR009
*
*===============================================================
*===============================================================
```

A-163

```
*=-=-===============================================
*PROC = IAR010
*
*   PROCEDURE NAME: IAR010
*
*   IAR010 IS THE IMMEDIATE ACTION ROUTINE WHICH IMPLEMENTS
*   THE CANCEL KEY FOR THE MENUS C4, C5, C6, AND HELP
*   MENUS.  ANY ERROR IS RESET.
*
*   INPUT: NONE
*   OUTPUT: NONE
*   RESULT: ERROR RESET IF ANY
*   TO CALL: BL @IAR010
*
*====================================================
*====================================================
```

A-164

```
*=================================================================
*PROC = IAR028
*
*    PROCEDURE NAME: IAR028
*
*    THIS PROCEDURE DRAWS A YELLOW CIRCLE WHEREVER THE
*    SCREEN IS TOUCHED.
*
*    INPUT: XPOINT--X COORDINATE
*           YPOINT--Y COORDINATE
*    OUTPUT: NONE
*    RESULT: YELLOW CIRCLE IS DRAWN
*    TO CALL: BL @IAR028
*
*=================================================================
*=================================================================
```

A-165

```
*================================================================
*MOD = MHIMACT2
*
*   MODULE MHIMACT2 IS A CONTINUATION OF THE IMMEDIATE ACTION
*   ROUTINES.
*
*================================================================
```

```
*================================================================
*DATA
*     DATA FOR PROCEDURES IAR011 - IAR018
*
*================================================================
```

A-167

```
*================================================================
*PROC = IAR011
*
*   PROCEDURE NAME: IAR011
*
*   IAR011 IS THE IMMEDIATE ACTION ROUTINE WHICH IMPLEMENTS
*   THE CAMERA KEYS ON THE MASTER MENU.
*
*   THE MENU CONTROL TABLE ENTRIES FOR THE CAMERAS AND ITS
*   PRESETS ARE CONSTRUCTED WITH THE CAMERA MCT FIRST,
*   FOLLOWED BY ITS PRESET MCT ENTRIES.
*
*   IF THE CAMERA TOUCHED IS A RE-TOUCH, THEN TURN THE
*   CAMERA OFF AND ERASE ALL OF ITS PRESETS.  IF A
*   CAMERA WAS TOUCHED AND ANOTHER CAMERA HAS ALREADY
*   BEEN TOUCHED, THEN AN ERROR IS INDICATED AND THIS
*   TOUCH REMOVED FROM THE STACK.
*
*   IF THIS IS A NEW CAMERA TOUCH, SAVE THE MCT ADDRESS IN
*   CAMTCH AND THE ENTITY ID INTO CONTRL.  NOW, GO THROUGH
*   THE NEXT "LOOP" (EITHER 2 OR 8) MCT ELEMENTS AND
*   DISPLAY THEM.
*
*   INPUT: NONE
*   OUTPUT: NONE
*   RESULT: CAMERA PRESETS ARE EITHER DISPLAYED (1 TOUCH)
*           OR ERASED IF THIS WAS A RE-TOUCH.
*   TO CALL: BL @IAR011
*
*================================================================
```

A-168

```
*================================================================
*PROC = IAR013
*
*   PROCEDURE NAME: IAR013
*
*   IAR013 IS CALLED WHEN THE CONFERENCE CONTROL MONITOR (PREVIEW)
*   KEY IS TOUCHED.
*
*   INPUT: STACK
*   OUTPUT: NONE
*   RESULT: A CONTROLLING ELEMENT MAY BE PREVIEWED
*   TO CALL: BL @IAR013
*
*================================================================
```

A-169

```
*================================================================
*PROC = IAR014
*
*    PROCEDURE NAME: IAR014
*
*    IAR014 IS THE IMMEDIATE ACTION ROUTINE WHICH IMPLEMENTS
*    THE CAMERA "GO TO PRESET" FUNCTION.  AFTER A CAMERA HAS
*    BEEN TOUCHED, ITS PRESETS ARE DRAWN.  IAR014 IS THE
*    IMMEDIATE ACTION ROUTINE ASSOCIATED WITH EACH PRESET
*    ELEMENT.  IT ALLOWS ONLY ONE PRESET TO BE TOUCHED AT A
*    TIME.  IF A SECOND PRESET IS TOUCHED WITHIN THE SENTENCE
*    IT TURNS OFF THE FIRST.  IAR014 THEN SENDS THE GO TO
*    PRESET MESSAGE SO THAT THE CAMERA WILL BE POINTING TO
*    THE DESIRED LOCATION BY THE TIME THE GO KEY IS TOUCHED.
*
*    INPUT: NONE
*    OUTPUT: MESSAGE TO VCMAPT "GO TO PRESET"
*    RESULT: CAMERA MOVE TO PRESET
*    TO CALL: BL @IAR014
*
*================================================================
```

A-170

```
*===============================================================
*PROC = IAR015
*
*    PROCEDURE NAME: IAR015
*
*    IAR015 IS THE IMMEDIATE ACTION ROUTINE FOR THE
*    TV MONITORS.  IF ONE MONITOR (RIGHT OR LEFT) IS
*    TOUCHED, THE OTHER MONITOR ALSO HAS ITS BORDER
*    RECOGNIZE THE TOUCH.  THE TWO MONITORS ALWAYS ACT AS
*    ONE.
*
*    INPUT: NONE
*    OUTPUT: NONE
*    RESULT:   BOTH MONITORS RECOGNIZE TOUCH TO ONE OR OTHER
*    TO CALL:  BL @IAR015
*
*===============================================================
*===============================================================
```

A-171

```
*===============================================================
*PROC = IAR016
*
*    PROCEDURE NAME: IAR016
*
*    IAR016 IS THE IMMEDIATE ACTION ROUTINE WHICH IMPLEMENTS
*    THE MIKE KEY ON ALL MENUS.  TOUCHING THE MIKE KEY
*    REVERSES ITS STATUS LIKE AN ON/OFF SWITCH.
*
*    INPUT: NONE
*    OUTPUT: NONE
*    RESULT: AUDIO IS TURNED ON AND OFF
*    TO CALL: BL @IAR016
*
*===============================================================
*===============================================================
```

A-172

```
*===========================================================
*PROC = IAR017
*
*    PROCEDURE NAME: IAR017
*
*    IAR017 IMPLEMENTS THE "OTHER" KEY ON THE MASTER MENU.
*    PENDING TOUCHES ARE CLEARED AND THE SELECT MENU DISPLAY
*    NUMBER IS STORED IN PDMENU SO THAT IT WILL BE
*    DRAWN NEXT.
*
*    INPUT: NONE
*    OUTPUT: NONE
*    RESULT: SELECT MENU DISPLAY IS DRAWN
*    TO CALL: BL @IAR017
*
*===========================================================
```

A-173

```
*================================================================
*PROC = IAR018
*
*    PROCEDURE NAME: IAR018
*
*    IAR018 IS THE IMMEDIATE ACTION ROUTINE WHICH IMPLEMENTS
*    THE CANCEL KEY FOR THE MASTER MENU--C3.  IT FIRST
*    CHECKS FOR A PENDING ERROR.  IF THERE IS ONE, ONLY THE
*    ERROR IS RESET. IF THERE'S NO ERROR, THE STACK IS
*    COMPRESSED AND THEN CHECKED FOR ENTRIES.  ALL ENTRIES
*    ARE CHECKED BEFORE PROCESSING TO MAKE SURE EACH
*    DEVICE IS ACTIVE AND CAN BE DISCONNECTED.  IF EVERY-
*    THING IS OK, THE STACK IS PROCESSED AND THE MESSAGES
*    ARE SENT TO DISCONNECT.
*
*    INPUT: NONE
*    OUTPUT: NONE
*    RESULT: ERROR RESET OR SELECTIONS DEACTIVATED
*    TO CALL: BL @IAR018
*
*================================================================
*================================================================
```

A-174

```
*===============================================================
*MOD = MHIMACT3
*
*    MODULE MHIMACT3 IS A CONTINUATION OF THE IMMEDIATE ACTION
*    ROUTINES.  MHIMACT3 CONTAINS ROUTINES IAR019 - IAR027.
*
*===============================================================
```

```
*================================================================
*DATA
*
*       DATA WORDS FOR IMMEDIATE ACTION ROUTINES 19 - 27.
*
*================================================================
```

```
*===============================================================
*PROC = IAR019
*
*    PROCEDURE NAME: IAR019
*
*    IAR019 IS THE IMMEDIATE ACTION ROUTINE WHICH IMPLEMENTS
*    THE SELECT CAMERA KEYS ON THE CAMERA POSITIONING MENU
*    (MENU 12).  FIRST, TURN EVERYTHING ON THE MENU OFF AND
*    STOP ALL CAMERA MOTION (IF ANY).  THIS IS DONE BY
*    CALLING THE ROUTINE (IAR027) FOR THIS MENU.
*    NEXT, TURN THE TOUCHED CAMERA ON, GETS ITS VCM ID
*    (LEFT CAM = 1, RIGHT CAM = 2), INITIALIZE THE ZOOM/FOCUS
*    APT FUNCTION AND THEN CONNECT THE SELECTED CAMERA TO
*    THE CONFERENCE CONTROL MONITOR.  FINALLY RE-DRAW THE
*    MENU TO INDICATE WHICH CAMERA IS ON.
*
*    INPUT: NONE
*    OUTPUT: CAMERA MESSAGES
*    RESULT: CAMERA IS CONNECTED TO CCM
*    TO CALL: BL @IAR019
*
*    GLOBALS: CURRMA--USED HERE, SET IN DRMENU
*
*    PROCEDURES CALLED: IAR027, GMSGAD, SYSREQ, RDMENU
*
*    CALLED BY: CCTSPI
*
*===============================================================
```

A-177

```
*=================================================================
*PROC = I19A00
*
*    PROCEDURE NAME: 119A00
*
*    I19A00 IS AN AUXILIARY ROUTINE TO IAR019. ITS FUNCTION IS
*    TO CONNECT OR DISCONNECT A CAMERA FROM THE CONFERENCE
*    MONITOR.
*
*    INPUT: R0, WHEN =0, DISCONNECT THE CAMERA
*               WHEN =2, CONNECT THE CAMERA
*    OUTPUT: MESSAGE TO CAMERA CONTROLLER
*    RESULT: CAMERA IS CONNECTED/DISCONNECTED
*    TO CALL: BL @I19A00
*
*=================================================================
*=================================================================
```

A-178

```
*================================================================
*PROC = IAR020
*
*    PROCEDURE NAME: IAR020
*
*    IAR020 IS THE IMMEDIATE ACTION ROUTINE WHICH IMPLEMENTS
*    THE BACK KEY ON MENU 12 (CAMERA POSITIONING).  IT MUST
*    STOP ALL CAMERA MOTION AND DISCONNECT THE CAMERA FROM
*    THE CONFERENCE MONITOR.  THESE FUNCTIONS ARE HANDLED BY
*    IAR027 (MENU 12 X KEY) AND THEN IAR010 (GENERAL BACK
*    KEY) IS CALLED.
*
*    INPUT: NONE
*    OUTPUT: NONE
*    RESULT: STOP CAMERA MOTION, DISCONNECT CAMERA AND
*            RETURN TO THE MASTER MENU.
*    TO CALL: BL @IAR020
*
*================================================================
```

A-179

```
*================================================================
*PROC = IAR021
*
*     PROCEDURE NAME: IAR021
*
*     IAR021 IMPLEMENTS THE HELP KEY ON THE CAMERA POSITIONING
*     MENU (CO5MNU).  BEFORE INVOKING THE HELP FUNCTION, THIS
*     ROUTINE FIRST TURNS OFF ANY CAMERA MOTION.
*
*     INPUT: NONE
*     OUTPUT: NONE
*     RESULT: HELP MENU IS DRAWN
*     TO CALL: BL @IAR021
*
*================================================================
```

A-180

```
*================================================================
*PROC = IAR022
*
*    PROCEDURE NAME: IAR022
*
*    IAR022 IS THE IMMEDIATE ACTION ROUTINE WHICH IMPLEMENTS
*    THE CAMERA PRESET KEYS ON THE CAMERA POSITIONING MENU
*    (MENU 12).  IF A CAMERA HAS NOT BEEN TOUCHED BEFORE THIS
*    KEY, AN ERROR CONDITION ARISES AND THE PROCEDURE
*    RETURNS.
*
*    INPUT: NONE
*    OUTPUT: NONE
*    RESULT: MENU CHANGES TO REFLECT TOUCHES
*    TO CALL: BL @IAR022
*
*    GLOBALS: CURRMA--USED HERE, SET IN DRMENU
*
*    PROCEDURES CALLED: GRMST, RDMENU
*
*    CALLED BY: CCTSPI
*
*================================================================
```

A-181

```
*==================================================================
*PROC = IAR023
*
*    PROCEDURE NAME: IAR023
*
*    IAR023 IS THE IMMEDIATE ACTION ROUTINE WHICH IMPLEMENTS
*    THE ZOOM KEYS ON THE CAMERA POSITIONING MENU (MENU 12).
*    IF A CAMERA IS NOT TOUCHED BEFORE THIS KEY, AN ERROR
*    CONDITION IS FLAGGED.  OTHERWISE, GET AND CONSTRUCT THE
*    ZOOM MESSAGE.  FROM THE ZOOM KEY'S MCT ID, INDEX INTO
*    TABLE ZOOM TO GET THE ZOOM INCREMENT AND DIRECTION.
*    MOVE THESE VALUES INTO THE ZOOM MESSAGE AND THEN SEND
*    IT.  RE-DRAW THE MENU SO THAT THE ZOOM KEY WILL BE ON.
*    FINALLY, TURN THE ZOOM KEY OFF AND REDRAW THE MENU
*    AGAIN.
*
*    INPUT: NONE
*    OUTPUT: ZOOM MESSAGE
*    RESULT: ZOOM KEY FLASHES AND CAMERA ZOOMS
*    TO CALL: BL @IAR023
*
*    GLOBALS: CURRMA--USED HERE, SET IN DRMENU
*
*    PROCEDURES CALLED: GRMST, GMSGAD, SYSREQ, RDMENU
*
*    CALLED BY: CCTSPI
*
*==================================================================
```

A-182

```
*=================================================================
*PROC = IAR024
*
*    PROCEDURE NAME: IAR024
*
*    IAR024 IS THE IMMEDIATE ACTION ROUTINE WHICH IMPLEMENTS
*    THE FOCUS KEYS ON THE CAMERA POSITIONING MENU (MENU 12).
*    IF A CAMERA IS NOT TOUCHED BEFORE THIS KEY, AN ERROR
*    CONDITION IS FLAGGED.  OTHERWISE, GET AND CONSTRUCT THE
*    FOCUS MESSAGE.  FROM THE FOCUS KEY'S MCT ID, INDEX INTO
*    TABLE FOCUS TO GET THE FOCUS INCREMENT AND DIRECTION.
*    MOVE THESE VALUES INTO THE FOCUS MESSAGE AND THEN SEND
*    IT.  RE-DRAW THE MENU SO THAT THE FOCUS KEY WILL BE ON.
*    FINALLY, TURN THE FOCUS KEY OFF AND REDRAW THE MENU
*    AGAIN.
*
*    INPUT: NONE
*    OUTPUT: FOCUS MESSAGE
*    RESULT: FOCUS KEY FLASHES AND CAMERA FOCUSES
*    TO CALL: BL @IAR024
*
*    GLOBALS: CURRMA--USED HERE, SET IN DRMENU
*
*    PROCEDURES CALLED: GRMST, GMSGAD, SYSREQ, RDMENU
*
*    CALLED BY: CCTSPI
*
*=================================================================
```

A-183

```
*===================================================================
*PROC = IAR025
*
*   PROCEDURE NAME: IAR025
*
*   IAR025 IS THE IMMEDIATE ACTION ROUTINE WHICH IMPLEMENTS
*   THE EIGHT SLEW (PAN/TILT) KEYS ON THE CAMERA POSITIONING
*   MENU (MENU 12).  IF A CAMERA HAS NOT BEEN TOUCHED BEFORE
*   THE SLEW KEY, INDICATE AN ERROR AND RETURN.
*   OTHERWISE, GET THE CAMERA SLEW MESSAGE BUFFER FROM
*   GMSGAD.  NEXT, DETERMINE IF THIS IS A RE-TOUCH (I.E.
*   TURNING THE SLEW OFF).  IF IT IS, THEN MOVE THE OFF
*   VALUE INTO THE MESSAGE, SEND IT AND RETURN. NEXT,
*   CHECK TO SEE IF ANOTHER SLEW KEY IS CURRENTLY ON.  IF
*   ONE IS, TURN THE KEY OFF AND AGAIN SEND THE SLEW OFF
*   MESSAGE.  IN EITHER CASE, NOW TURN ON THE TOUCHED KEY,
*   CONSTRUCT THE SLEW MESSAGE, SEND IT AND RETURN.
*
*   INPUT: NONE
*   OUTPUT: SLEW MESSAGE
*   RESULT: SLEW KEYS ARE MAINTAINED AND CAMERA MOVES/STOPS.
*   TO CALL: BL @IAR025
*
*   GLOBALS: CURRMA--USED HERE, SET IN CRMENU
*
*   PROCEDURES CALLED: GRMST, GMSGAD, SYSREQ, RCMENU
*
*   CALLED BY: CCTSPI
*
*===================================================================
```

A-184

```
*================================================================
*PROC = RSTPST
*
*    PROCEDURE NAME: RSTPST
*
*    RSTPST WILL ERASE ACTIVE PRESETS FROM THE MASTER MENU
*    (CO3MNU) IF THEIR CAMERAS ARE RE-POSITIONED.
*
*    INPUT: NONE
*    OUTPUT: NONE
*    RESULT: CO3MNU PRESETS MAY BE ERASED
*    TO CALL: BL @RSTPST
*
*================================================================
*================================================================
```

A-185

```
*===========================================================
*PROC = IAR026
*
*   PROCEDURE NAME: IAR026
*
*   IAR026 TURNS OFF CAMERA MOTION, DISCONNECTS THE CAMERA
*   AND GOES ON TO THE NEXT MENU.
*
*   INPUT: NONE
*   OUTPUT: NONE
*   RESULT: NEXT MENU IS DRAWN
*   TO CALL: BL @IAR026
*
*===========================================================
```

A-186

```
*===============================================================
*PROC = IAR027
*
*    PROCEDURE NAME: IAR027
*
*    IAR027 IS THE IMMEDIATE ACTION ROUTINE WHICH IMPLEMENTS
*    THE SLEW OFF KEY ON THE CAMERA POSITIONING MENU (MENU 12).
*    IT TURNS OFF ALL CAMERA MOTION, AND CLEAR THE TOUCHED
*    PRESET KEYS.
*
*    INPUT: NONE
*    OUTPUT: NONE
*    RESULT: ALL CAMERA ACTIVITY ENDS, ALL KEYS TURNED OFF
*    TO CALL: BL @IAR027
*
*    GLOBALS: CURRMA--USED HERE, SET IN DRMENU
*
*    PROCEDURES CALLED: GMSGAD, SYSREQ, RDMENU
*
*    CALLED BY: CCTSPI
*
*===============================================================
```

A-187

```
*===========================================================
*MOD = MHDLACT
*
*   MODULE MHDLACT IS THE FIRST OF THE DELAYED ACTION ROUTINE
*   MODULES.  DELAYED ACTION ROUTINES ARE CALLED FROM THE
*   INTERPRETER AND SPECIFIED IN THE MENU CONTROL TABLE.
*   IF AN ELEMENT HAS AN ASSOCIATED DELAYED ACTION, FIELD
*   MCDACT OF THE MCT WILL CONTAIN A NON-ZERO VALUE.  THE
*   VALUE WILL CORRESPOND TO THE DELAYED ACTION ROUTINE
*   NUMBER.
*
*   THE DELAYED ACTION ROUTINES GENERALLY USE THE EXISTING
*   SENTENCE STACK AS ITS INPUT AND FOR OUTPUT THEY MODIFY
*   THE MENUS AND THE ENTITY STATUS TABLE.  THEY ALSO SEND
*   MESSAGES TO THE OTHER VARIOUS SYSTEM ROUTINES.
*
*===========================================================
```

A-188

```
*=================================================================
*DATA
*
*
*=================================================================
```

A-189

```
*================================================================
*PROC = DAR001
*
*    DAR001 IS THE DELAYED ACTION ROUTINE TO HANDLE ALL
*    ELEMENTS ON THE MASTER MENU.  WHEN DAR001 IS CALLED,
*    THE ELEMENT ON THE TOP OF THE STACK IS THE
*    SIGNAL SOURCE.
*
*    SET EACH OF
*    THE FOLLOWING STACKED ELEMENTS TO BE ON AND CONTROLLED
*    BY THE SOURCE.  IF THE ELEMENT WAS FORMERLY CONTROLLED,
*    FIRST TURN IT OFF AND SEND THE DISCONNECT MESSAGE.
*    OTHERWISE, JUST TURN IT ON AND SEND THE CONNECT MESSAGE.
*
*    ONCE THE STACK HAS BEEN EXHAUSTED, PROCEDURE LSENDS
*    IS CALLED TO DISCONNECT ANY REMAINING LOOSE ENDS.
*    A LOOSE END IS DEFINED AS A SOURCE WITHOUT A SINK
*    OR A SINK WITHOUT A SOURCE.
*
*
*    INPUT: NONE
*    OUTPUT: NONE
*    RESULT: MENU AND EST REFLECT TOUCHES, AND DEVICES ARE
*            CONNECTED AND DISCONNECTED AS REQUIRED.
*    TO CALL: BL @DAR001
*
*================================================================
```

A-190

```
*================================================================
*PROC = DAR002
*
*    PROCEDURE NAME: DAR002
*
*    DAR002 IS THE DELAYED ACTION ROUTINE FOR THE
*    CIRCLES ON MENU C4 TO SELECT ANOTHER FUNCTION.
*    THE NEXT MENU IS DETERMINED BY ACCESSING THE
*    EST ENTRY FOR THE SELECTED CIRCLE.  PENDING
*    MENU IS SET AND THE STACK IS CLEARED.
*
*    INPUT: NONE
*    OUTPUT: NONE
*    RESULT:  NEXT MENU IS DETERMINED
*    TO CALL: BL @DAR002
*
*================================================================
```

A-191

```
*================================================================
*PROC = DAR003
*
*   PROCEDURE NAME: DAR003
*
*   DAR003 IS CALLED WHEN THE HI-RES SCREEN ELEMENT IS
*   FOUND IN A SENTENCE.  DAR003 WILL REPORT THAT THIS
*   ELEMENT MAY NOT BE USED IN THIS MANNER.
*
*   INPUT: NONE
*   OUTPUT: ERROR MESSAGE
*   RESULT: GO TURNS RED
*   TO CALL: BL @DAR003
*
*================================================================
*================================================================
```

```
*================================================================
*PROC = DAR004
*
*    PROCEDURE NAME: DAR004
*
*    DAR004 IS CALLED WHEN THE CCM ELEMENT IS
*    FOUND IN A SENTENCE.  DAR004 WILL REPORT THAT THIS
*    ELEMENT MAY NOT BE USED IN THIS MANNER.
*
*    INPUT: NONE
*    OUTPUT: ERROR MESSAGE
*    RESULT: GO TURNS RED
*    TO CALL: BL @DAR004
*
*================================================================
*================================================================
```

A-193